(12) United States Patent
Yamashita et al.

(10) Patent No.: US 9,315,602 B2
(45) Date of Patent: Apr. 19, 2016

(54) METHOD FOR PRODUCING OLEFIN POLYMER

(71) Applicant: Mitsui Chemicals, Inc., Minato-ku, Tokyo (JP)

(72) Inventors: Masahiro Yamashita, Chiba (JP); Takashi Yukita, Chiba (JP); Hiromu Kaneyoshi, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/385,748

(22) PCT Filed: Feb. 28, 2013

(86) PCT No.: PCT/JP2013/055510
§ 371 (c)(1),
(2) Date: Sep. 16, 2014

(87) PCT Pub. No.: WO2013/140991
PCT Pub. Date: Sep. 26, 2013

(65) Prior Publication Data
US 2015/0045523 A1  Feb. 12, 2015

(30) Foreign Application Priority Data

Mar. 21, 2012 (JP) .................................. 2012-063932

(51) Int. Cl.
*C08F 4/6592* (2006.01)
*C08F 4/642* (2006.01)
*C08F 10/00* (2006.01)
*C08F 10/06* (2006.01)
*C08F 110/06* (2006.01)
*C08F 4/659* (2006.01)
*C08F 2/06* (2006.01)

(52) U.S. Cl.
CPC ........... *C08F 110/06* (2013.01); *C08F 4/65912* (2013.01); *C08F 4/65927* (2013.01); *C08F 10/00* (2013.01); *C08F 2/06* (2013.01)

(58) Field of Classification Search
CPC .. C08F 4/65912; C08F 4/65927; C08F 10/00; C08F 10/06; C08F 2/06
See application file for complete search history.

(56) References Cited

U.S. PATENT DOCUMENTS

| 5,539,066 | A | 7/1996 | Winter et al. |
| 6,559,089 | B1 | 5/2003 | Razavi et al. |
| 8,017,705 | B2 | 9/2011 | Yamaguchi et al. |
| 8,716,418 | B2 | 5/2014 | Yamamoto et al. |
| 2008/0220193 | A1 | 9/2008 | Tohi et al. |

FOREIGN PATENT DOCUMENTS

| JP | H04-069394 A | 3/1992 |
| JP | 2000-212194 A | 8/2000 |
| JP | 2001-526730 A | 12/2001 |
| JP | 2004-189666 A | 7/2004 |

(Continued)

OTHER PUBLICATIONS

Ewen, et al., "Syndiospecific Propylene Polymerizations with Group 4 Metallocenes," J. Am. Chem. Soc. 1988, 110, pp. 6255-6256.

(Continued)

*Primary Examiner* — Caixia Lu
(74) *Attorney, Agent, or Firm* — Foley & Lardner LLP

(57) ABSTRACT

[Object] There is provided a method which enables an olefin polymer having high melting point and high molecular weight to be produced even at high temperature proper in an industrial production process. [Solution] A method for producing an olefin polymer is provided, the method including polymerizing an olefin having two or more carbon atoms in the presence of a catalyst for olefin polymerization, wherein the catalyst for olefin polymerization includes (A) a bridged metallocene compound represented by Formula [1] and (B) at least one compound selected from, for example, an organoaluminum oxy-compound and an organoaluminum compound:

[1]

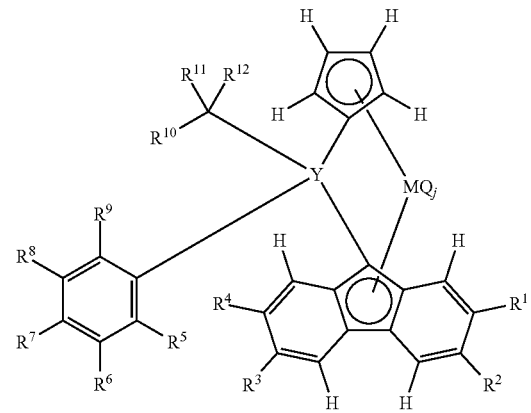

[where $R^1$ to $R^4$ each represent, for example, a hydrocarbon group; $R^5$ to $R^9$ each represent, for example, a hydrogen atom or a halogen atom; $R^{10}$ and $R^{11}$ each represent, for example, a hydrogen atom; and $R^{12}$ represents, for example, a hydrocarbon group. Y represents, for example, a carbon atom. M represents, for example, Zr; Y represents, for example, a carbon atom; and Q represents, for example, a halogen atom. j is an integer from 1 to 4].

20 Claims, No Drawings

(56) References Cited

FOREIGN PATENT DOCUMENTS

| | | |
|---|---|---|
| JP | 2004-189667 A | 7/2004 |
| JP | 2006-028449 A | 2/2006 |
| JP | 2007-302853 A | 11/2007 |
| JP | 2010-070593 A | 4/2010 |
| JP | 2011-122118 A | 6/2011 |
| WO | WO-2006/123759 A1 | 11/2006 |
| WO | WO-2008/059974 A1 | 5/2008 |
| WO | WO-2011/078054 A1 | 6/2011 |

OTHER PUBLICATIONS

International Search Report dated Apr. 16, 2013 issued in Application No. PCT/JP2013/055510.

Kaminsky, et al., "Polymerization of Propene and Butene with a Chiral Zirconocene and Methylalumoxane as Cocatalyst," Agnew. Chem. Int. Ed. Engl. 24 (1985) No. 6, pp. 507-508.

Extended European Search Report dated May 15, 2015 issued in European Patent Application No. 13763976.1.

METHOD FOR PRODUCING OLEFIN POLYMER

CROSS REFERENCE TO RELATED APPLICATIONS

This application is the National Phase of PCT/JP2013/055510, filed Feb. 28, 2013, which claims priority to Japanese Application No. 2012-063932, filed Mar. 21, 2012.

TECHNICAL FIELD

The present invention relates to a method for producing an olefin polymer with the aid of a catalyst for olefin polymerization, the catalyst containing a bridged metallocene compound having a specific structure; in particular, the present invention relates to a method for producing an olefin polymer having high melting point and high molecular weight with high productivity.

BACKGROUND ART

A well-known homogeneous catalyst for olefin polymerization is a metallocene compound. After the report on iso-tactic polymerization by W. Kaminsky et al., a technique for polymerizing an olefin by means of a metallocene compound (in particular, technique for polymerizing an α-olefin) has been variously modified and studied to further improve tacticity and polymerization activity (Non Patent Literature 1).

In the report by J. A. Ewen, which is one of such studies, polymerization of propylene in the presence of a specific catalyst enables production of polypropylene having a high tacticity in which the syndiotactic pentad content is greater than 0.7 (Non Patent Literature 2). In this case, such a specific catalyst is composed of an aluminoxane and a metallocene compound having a ligand in which a cyclopentadienyl group is cross-linked with a fluorenyl group by isopropylidene.

In an approach to modifying such a metallocene compound, a 2,7-di-tert-butylfluorenyl group replaces the fluorenyl group to improve the tacticity (Patent Literature 1). Other approaches have been reported; a 3,6-di-tert-butylfluorenyl group replaces the fluorenyl group to improve the tacticity (Patent Literature 2), and the bridging moiety at which a cyclopentadienyl group has been bonded to a fluorenyl group is modified to improve the tacticity (Patent Literatures 3 and 4).

In another report, dimethylmethylene(3-tert-butyl-5-methylcyclopentadienyl)(fluorenyl)zirconium dichloride in which a methyl group has been introduced also to the fifth position of the cyclopentadienyl ring enables production of an isotactic polypropylene having a higher molecular weight as compared with dimethylmethylene(3-tert-butylcyclopentadienyl)(fluorenyl)zirconium dichloride (Patent Literature 5).

Furthermore, di(p-chlorophenyl)methylene(cyclopentadienyl)(2,7-diphenyl-3,6-di-tert-butylfluorenyl)zirconium dichloride has been also reported as a metallocene compound which enables polymerization at high temperature and which enables production of a high-molecular-weight polymer (Patent Literature 6).

Although the modifications of a metallocene compound have enabled production of an olefin polymer having high melting point and high molecular weight, the productivity of such an olefin polymer has been still insufficient in industrial production processes. In particular, in the case where the metallocene compounds are each used in the form of a solution in a hydrocarbon solvent, the solubility thereof is not high; hence, a large amount of solvents need to be used. In addition, using a large amount of solvents decreases the concentration of the catalyst in a catalyst solution containing the metallocene compound with the result that poisoning and deactivation leads to a reduction in the productivity. Hence, efficient production of an olefin polymer having high melting point and high molecular weight has been demanded.

CITATION LIST

Patent Literature

PTL 1: JPA 1992-069394
PTL 2: JPA 2000-212194
PTL 3: JPA 2004-189666
PTL 4: JPA 2004-189667
PTL 5: JPA 2001-526730
PTL 6: JPA 2007-302853

Non Patent Literature

NPL 1: Angew. Chem. Int. Ed. Engl., 24, 507 (1985)
NPL 2: J. Am. Chem. Soc., 1988, 110, 6255

SUMMARY OF INVENTION

Technical Problem

It is an object of the present invention to provide a method for producing an olefin polymer having high melting point and high molecular weight through polymerization of an olefin such as propylene, the method being effective and giving a high productivity in industrial production processes.

Solution to Problem

The inventors have conducted intensive studies to achieve the object and found that use of a catalyst for olefin polymerization, which contains a bridged metallocene compound having a specific structure, enables the object to be achieved, thereby accomplishing the present invention.

In particular, the present invention relates to the following [1] to [12].

[1] A method for producing an olefin polymer, the method including polymerizing at least one olefin selected from olefins having two or more carbon atoms in the presence of a catalyst for olefin polymerization, wherein the catalyst for olefin polymerization contains (A) a bridged metallocene compound represented by Formula [1] and (B) at least one compound selected from (b-1) an organoaluminum oxy-compound, (b-2) a compound which reacts with the bridged metallocene compound (A) to form an ion pair, and (b-3) an organoaluminum compound:

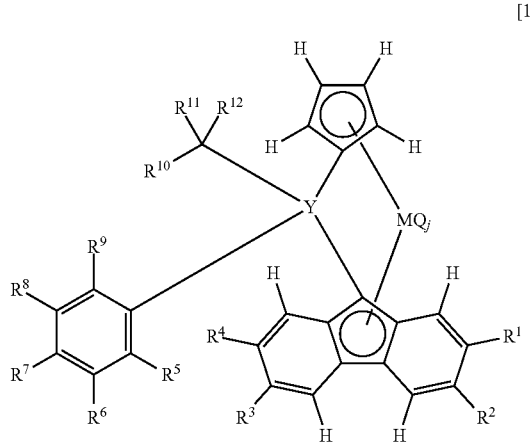

[where $R^1$ to $R^4$ each independently represent a group selected from hydrocarbon groups, halogen-containing hydrocarbon groups, nitrogen-containing groups, oxygen-containing groups, and silicon-containing groups, and two adjoining groups are optionally bonded to each other to form a ring;

$R^5$ to $R^9$ each independently represent a group selected from a hydrogen atom, halogen atoms, hydrocarbon groups, halogen-containing hydrocarbon groups, nitrogen-containing groups, oxygen-containing groups, and silicon-containing groups, and two adjoining groups are optionally bonded to each other to form a ring;

$R^{10}$ to $R^{12}$ each independently represent a group selected from a hydrogen atom, halogen atoms, hydrocarbon groups, halogen-containing hydrocarbon groups, nitrogen-containing groups, oxygen-containing groups, and silicon-containing groups;

Y represents a carbon atom or a silicon atom;

M represents Ti, Zr, or Hf;

Q is a structure selected from halogen atoms, hydrocarbon groups, neutral, conjugated or nonconjugated dienes having 10 or less carbon atoms, anion ligands, and neutral ligands capable of coordinating with a lone pair; j represents an integer from 1 to 4; and in the case where j represents an integer of 2 or more, multiple Qs are the same as or different from each other].

[2] In the method [1] for producing an olefin polymer, $R^1$ and $R^4$ in Formula [1] are each independently a group selected from hydrocarbon groups having 1 to 40 carbon atoms and halogen-containing hydrocarbon groups having 1 to 40 carbon atoms, and at least one of $R^2$ and $R^3$ in Formula [1] is a group selected from hydrocarbon groups having 1 to 40 carbon atoms and silicon-containing groups.

[3] In any one of the methods [1] and [2] for producing an olefin polymer, $R^1$ and $R^4$ in Formula [1] are each independently a group selected from aryl groups having 6 to 20 carbon atoms and halogen-containing aryl groups having 6 to 20 carbon atoms.

[4] In any one of the methods [1] to [3] for producing an olefin polymer, $R^{12}$ in Formula [1] is a group selected from a hydrogen atom, hydrocarbon groups having 1 to 40 carbon atoms, and halogen-containing hydrocarbon groups having 1 to 40 carbon atoms.

[5] In any one of the methods [1] to [4] for producing an olefin polymer, each of $R^{10}$ and $R^{11}$ in Formula [1] is a hydrogen atom, and $R^{12}$ is selected from alkyl groups having 1 to 20 carbon atoms, aryl groups having 6 to 20 carbon atoms and halogen-containing aryl groups having 6 to 20 carbon atoms, or each of $R^{10}$ to $R^{12}$ is a hydrogen atom.

[6] In any one of the methods [1] to [5] for producing an olefin polymer, $R^5$ to $R^9$ in Formula [1] are each independently a group selected from a hydrogen atom, halogen atoms, and alkyl groups having 1 to 20 carbon atoms.

[7] In any one of the methods [1] to [6] for producing an olefin polymer, the catalyst for olefin polymerization further contains a support (C).

[8] In any one of the methods [1] to [7] for producing an olefin polymer, at least propylene is used as the olefin.

[9] In any one of the methods [1] to [8] for producing an olefin polymer, the solubility of the bridged metallocene compound represented by Formula [1] in n-hexane at 25° C. is not less than 0.5 mmol/L.

[10] In any one of the methods [1] to [9] for producing an olefin polymer, a solution in which the concentration of the bridged metallocene compound represented by Formula [1] is in the range of 0.05 mmol/L to 1.0 mol/L is supplied to a polymerization system.

[11] In any one of the methods [1] to [10] for producing an olefin polymer, polymerization temperature is in the range of 50 to 150° C.

[12] In any one of the methods [1] to [11] for producing a propylene polymer, polymerization temperature is in the range of 50 to 150° C., and a propylene polymer that is to be produced has the following properties; melting point (Tm) measured by differential scanning calorimetry (in the case where multiple crystalline melting peaks are observed, the melting point (Tm) is based on the high-temperature side peak) is in the range of 145 to 170° C., intrinsic viscosity ([η]) measured in decalin at 135° C. is not less than 1.25 dl/g, weight average molecular weight (Mw) measured by gel permeation chromatography is not less than 97,000, and a proportion of weight average molecular weight (Mw) to number average molecular weight (Mn) (Mw/Mn) is in the range of 1 to 3.

Advantageous Effects of Invention

Some aspects of the present invention can provide a method for producing an olefin polymer having high melting point and high molecular weight through polymerization of an olefin such as propylene, the method being effective and giving a high productivity in industrial production processes.

DESCRIPTION OF EMBODIMENTS

The method for producing an olefin polymer according to the present invention includes polymerizing at least one olefin selected from olefins having two or more carbon atoms (preferably α-olefin) in the presence of a catalyst for olefin polymerization, the catalyst for olefin polymerization containing (A) a bridged metallocene compound which will be described later and (B) a compound which will be described below.

Preferred embodiments of the catalyst for olefin polymerization, which is used in the present invention and contains the bridged metallocene compound (A) and the compound (B), and the method for polymerizing an olefin having two or more carbon atoms in the presence of the catalyst for olefin polymerization will now be described in sequence.

[Catalyst for Olefin Polymerization]

The catalyst for olefin polymerization used in the present invention contains the bridged metallocene compound (A) and at least one compound (B) selected from (b-1) an organoaluminum oxy-compound, (b-2) a compound which reacts with the bridged metallocene compound (A) to form an ion pair, and (b-3) an organoaluminum compound as essential components. The catalyst may contain a support (C) and an organic compound component (D) as optional components.

<<Bridged Metallocene Compound (A)>>

The bridged metallocene compound (A) used in the present invention is represented by Formula [1].

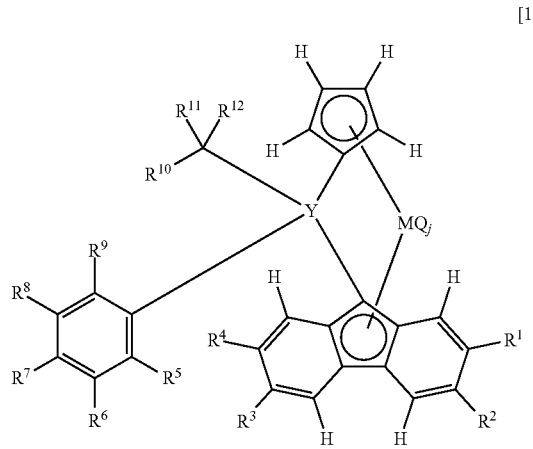

[1]

The symbols in Formula [1] have the following meanings.

$R^1$ to $R^4$ are each independently a group selected from hydrocarbon groups, halogen-containing hydrocarbon groups, nitrogen-containing groups, oxygen-containing groups, and silicon-containing groups. Among $R^1$ to $R^4$, two respective groups bonded to adjoining carbons on a ring (e.g., $R^1$ and $R^2$ or $R^3$ and $R^4$) may be bonded to each other to form a ring.

$R^5$ to $R^9$ are each independently a group selected from a hydrogen atom, halogen atoms, hydrocarbon groups, halogen-containing hydrocarbon groups, nitrogen-containing groups, oxygen-containing groups, and silicon-containing groups. Among $R^5$ to $R^9$, two respective groups bonded to adjoining carbons on a ring (e.g., $R^5$ and $R^6$, $R^6$ and $R^7$, $R^7$ and $R^8$, or $R^8$ and $R^9$) may be bonded to each other to form a ring.

$R^{10}$ to $R^{12}$ are each independently a group selected from a hydrogen atom, halogen atoms, hydrocarbon groups, halogen-containing hydrocarbon groups, nitrogen-containing groups, oxygen-containing groups, and silicon-containing groups.

Y represents a carbon atom or a silicon atom.

M represents Ti, Zr, or Hf.

Q is a structure selected from halogen atoms, hydrocarbon groups, neutral, conjugated or nonconjugated dienes having 10 or less carbon atoms, anion ligands, and neutral ligands capable of coordinating with a lone pair. j represents an integer from 1 to 4; in the case where j represents an integer of 2 or more, multiple Qs may be the same as or different from each other.

The groups contained in the bridged metallocene compound (A) will now be described.

The term "group" herein comprehends an atom in the present description.

—$R^1$ to $R^{12}$—

The hydrocarbon groups which can be employed as $R^1$ to $R^{12}$ are preferably hydrocarbon groups having 1 to 40 carbon atoms, and more preferably hydrocarbon groups having 1 to 20 carbon atoms. Examples of such hydrocarbon groups include alkyl groups having 1 to 20 carbon atoms, saturated alicyclic groups having 3 to 20 carbon atoms, aryl groups having 6 to 20 carbon atoms, and aralkyl groups having 7 to 20 carbon atoms.

Examples of the alkyl groups having 1 to 20 carbon atoms include linear alkyl groups, such as methyl group, ethyl group, n-propyl group, n-butyl group, n-pentyl group, n-hexyl group, n-heptyl group, n-octyl group, n-nonyl group, and n-decanyl group, and branched alkyl groups such as iso-propyl group, tert-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, and 1-methyl-1-isopropyl-2-methylpropyl group.

Examples of the saturated alicyclic groups having 3 to 20 carbon atoms include cycloalkyl groups, such as cyclopentyl group, cyclohexyl group, cycloheptyl group, and cyclooctyl group, and aliphatic polycyclic groups such as norbornyl group and adamantyl group.

Examples of the aryl groups having 6 to 20 carbon atoms include aryl groups in which all of the groups bonded to each aromatic carbon are hydrogen atoms, such as phenyl group, naphthyl group, phenanthryl group, anthracenyl group, and biphenyl group (hereinafter also referred to as "unsubstituted aryl groups"), and alkylaryl groups such as o-tolyl group, m-tolyl group, p-tolyl group, ethylphenyl group, n-propylphenyl group, iso-propylphenyl group, n-butylphenyl group, sec-butylphenyl group, tert-butylphenyl group, and xylyl group.

Examples of the aralkyl groups having 7 to 20 carbon atoms include aralkyl groups in which all of the groups bonded to each aromatic carbon are hydrogen atoms, such as benzyl group, cumyl group, α-phenethyl group, β-phenethyl group, diphenylmethyl group, naphthylmethyl group, and neophyl group (hereinafter also referred to as "unsubstituted aralkyl group"), and alkylaralkyl groups such as o-methylbenzyl group, m-methylbenzyl group, p-methylbenzyl group, ethylbenzyl group, n-propylbenzyl group, iso-propylbenzyl group, n-butylbenzyl group, sec-butylbenzyl group, and tert-butylbenzyl group.

Among the hydrocarbon groups, hydrocarbon groups having 1 to 10 carbon atoms are especially preferred.

Examples of the halogen-containing hydrocarbon groups which can be employed as $R^1$ to $R^{12}$ include groups formed by substituting at least one hydrogen atom contained in the hydrocarbon groups with a halogen atom. Specific examples thereof include halogen-containing alkyl groups such as fluoroalkyl groups including, e.g., trifluoromethyl group;

halogen-containing aryl groups such as groups formed by substituting at least one of the hydrogen atoms contained in the unsubstituted aryl groups with a halogen atom and groups formed by substituting part of the hydrogen atoms contained in the alkylaryl groups with a halogen atom, the groups formed by substituting at least one of the hydrogen atoms contained in the unsubstituted aryl groups with a halogen atom including, for example, fluoroaryl groups (e.g., pentafluorophenyl group), chioroaryl groups (e.g., o-chlorophenyl group, m-chlorophenyl group, p-chlorophenyl group, and chloronaphthyl group), bromoaryl groups (e.g., o-bromophenyl group, m-bromophenyl group, p-bromophenyl group, and bromonaphthyl group), and iodoaryl groups (e.g., o-iodophenyl group, m-iodophenyl group, p-iodophenyl group, and iodonaphthyl group), the groups formed by substituting part of the hydrogen atoms contained in the alkylaryl groups with a halogen atom including, for example, fluoroalkylaryl groups (e.g., trifluoromethylphenyl group), bromoalkylaryl groups (e.g., bromomethylphenyl group and dibromomethylphenyl group), and iodoalkylaryl groups (e.g., iodomethylphenyl group and diiodomethylphenyl group); and halogen-containing aralkyl groups such as groups formed by substituting part of the hydrogen atoms contained in the unsubstituted aralkyl groups with a halogen atom, such as chloroaralkyl groups (e.g., o-chlorobenzyl group, m-chlorobenzyl group, p-chlorobenzyl group, and chlorophenethyl group), bromoaralkyl groups (e.g., o-bromobenzyl group, m-bromobenzyl group, p-bromobenzyl group, and bromophenethyl group), and iodoaralkyl groups (e.g., o-iodobenzyl group, m-iodobenzyl group, p-iodobenzyl group, and iodophenethyl group).

Examples of the nitrogen-containing groups which can be employed as $R^1$ to $R^{12}$ include nitro group, cyano group, N-methylamino group, N,N-dimethylamino group, and N-phenylamino group.

Examples of the oxygen-containing groups which can be employed as $R^1$ to $R^{12}$ include methoxy group, ethoxy group, and phenoxy group.

Examples of the silicon-containing groups which can be employed as $R^1$ to $R^{12}$ include alkylsilyl groups, such as methylsilyl group, dimethylsilyl group, trimethylsilyl group, ethylsilyl group, diethylsilyl group, triethylsilyl group, and dimethyl-tert-butylsilyl group, and arylsilyl groups such as dimethylphenylsilyl group, diphenylmethylsilyl group, and triphenylsilyl group.

Examples of the halogen atoms which can be employed as $R^5$ to $R^{12}$ include fluorine atom, chlorine atom, bromine atom, and iodine atom.

At least a pair of two adjoining groups selected from $R^1$ to $R^4$ and $R^5$ to $R^9$ may be bonded to each other to form a ring. Examples of such a ring include 1-methyl-2-naphthalenyl group, 3-methyl-2-naphthalenyl group, 1-methyl-2-(5,6,7,8-tetrahydro)naphthalenyl group, 3-methyl-2-(5,6,7,8-tetrahydro)naphthalenyl group, 7-methyl-1H-6-indenyl group, 6-methyl-1H-5-indenyl group, 7-methyl-6-benzofuranyl group, 6-methyl-5-benzofuranyl group, 7-methyl-6-benzothiophenyl group, and 6-methyl-5-benzothiophenyl group.

$R^1$ and $R^4$ are preferably each independently the hydrocarbon group or the halogen-containing hydrocarbon group, more preferably the aryl group or the halogen-containing aryl group, and further preferably a phenyl group, an alkylphenyl group, or groups formed by substituting part of the hydrogen atoms contained in these groups with a halogen atom. $R^1$ and $R^4$ are preferably the same as each other.

At least one of $R^2$ and $R^3$ is preferably a group selected from the hydrocarbon groups and the silicon-containing groups. Furthermore, $R^2$ and $R^3$ are preferably each independently the hydrocarbon group or the silicon-containing group, more preferably the hydrocarbon group, and especially preferably the alkyl group. $R^2$ and $R^3$ are preferably the same as each other.

$R^5$ to $R^9$ are preferably each independently a hydrogen atom, the halogen atom, or the alkyl group having 1 to 20 carbon atoms. It is more preferred that $R^5$ to $R^9$ be each a hydrogen atom; it is also more preferred that $R^5$, $R^6$, $R^8$, and $R^9$ be each a hydrogen atom and that $R^7$ be the halogen atom or the alkyl group having 1 to 20 carbon atoms.

$R^{10}$ and $R^{11}$ are each preferably a hydrogen atom; and $R^{12}$ is preferably a hydrogen atom, the hydrocarbon group, or the halogen-containing hydrocarbon group; more preferably the alkyl group, the aryl group, or the halogen-containing aryl group; and further preferably the alkyl group having 1 to 10 carbon atoms, a phenyl group, an alkylphenyl group, or groups formed by substituting part of these groups with a halogen. It is presumed that an olefin polymer having high melting point and high molecular weight can be produced owing to either or both of the electronic effect and steric effect of $R^{10}$ to $R^{12}$.

Use of the bridged metallocene compound (A) containing the substituent groups enables production of an olefin polymer having a high melting point. This is because the bridged metallocene compound (A) catalyzes the production of a highly stereoregular olefin polymer. Accordingly, even an olefin polymer synthesized at a temperature greater than or equal to normal temperature, preferably a high temperature much greater than normal temperature can be well shaped; thus, a product made therefrom is highly useful, and industrial production of the olefin polymer becomes efficient in terms of production costs.

Use of the bridged metallocene compound (A) containing the substituent groups also enables production of an olefin polymer having a high molecular weight. This is because the bridged metallocene compound (A) catalyzes the production of a high-molecular-weight olefin polymer. Accordingly, an olefin polymer can be synthesized at a temperature greater than or equal to normal temperature, preferably a high temperature much greater than normal temperature; thus, industrial production of the olefin polymer becomes efficient in terms of production costs.

In addition, the bridged metallocene compound (A) is well soluble in hydrocarbon solvents. In particular, the solubility of the bridged metallocene compound (A) in hydrocarbon solvents with 4 to 10 carbon atoms (25° C.) is preferably not less than 0.5 mmol/L, more preferably not less than 0.7 mmol/L, and further preferably not less than 0.9 mmol/L. Further in particular, the solubility of the bridged metallocene compound (A) in n-hexane at 25° C. is preferably not less than 0.5 mmol/L, more preferably not less than 0.7 mmol/L, and further preferably not less than 0.9 mmol/L. In general, the solubility is preferably at most 10 mol/L, and more preferably at most 1 mol/L.

In general, bridged metallocene compounds in which ligands have a cross-linked structure have a rigid structure and relatively strong crystalline structure and tend to be less soluble in hydrocarbon solvents. In the bridged metallocene compound (A) used in the present invention, however, the bridging moiety has an asymmetric structure, in particular, the two substituent groups bonded to Y in Formula (1) have different structures; hence it is presumed that such a structure enables the degree of crystallization to be reduced with the result that the solubility in hydrocarbon solvents is likely to be enhanced.

Metallocene compounds generally tend to greatly enhance the polymerization activity of olefins, which is disclosed in, for example, Non Patent Literature 1. Such compounds that enhance polymerization activity are generally likely to be affected by impurities, in particular, poisoned and deactivated. The bridged metallocene compound (A) used in the present invention is, however, well soluble in hydrocarbon solvents as described above, which enables preparation of a catalyst solution with a smaller amount of a solvent. Thus, effects of poisoning and deactivation caused by a slight amount of impurities which may be contained in a solvent that is to be used can be reduced, and an enhancement in the productivity of an olefin polymer can be therefore expected. Such an advantageous effect is, particularly in industrial production of an olefin polymer, useful and expected to contribute to a reduction in possible effects brought about by, for instance, the production lot of a solvent that is to be used.

—Y, M, Q, and j-

Y represents a carbon atom or a silicon atom, and preferably a carbon atom.

M represents Ti, Zr, or Hf, preferably Zr or Hf, and especially preferably Zr. Use of the bridged metallocene compound (A) having the metal center and bridging moiety enables efficient production of an olefin polymer having high molecular weight and high melting point.

Q is a structure selected from halogen atoms, hydrocarbon groups, neutral, conjugated or nonconjugated dienes having 10 or less carbon atoms, anion ligands, and neutral ligands capable of coordinating with a lone pair.

Examples of the halogen atoms which can be employed as Q include fluorine atom, chlorine atom, bromine atom, and iodine atom.

The hydrocarbon group which can be employed as Q is preferably an alkyl group having 1 to 10 carbon atoms or a cycloalkyl group having 3 to 10 carbon atoms. Examples of the alkyl groups having 1 to 10 carbon atoms include methyl group, ethyl group, n-propyl group, iso-propyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, tert-butyl group, 1,1-dimethylbutyl group, 1,1,3-trimethylbutyl group, and neopentyl group; and examples of the cycloalkyl groups having 3 to 10 carbon atoms include cyclohexylmethyl group, cyclohexyl group, and 1-methyl-1-cyclohexyl group. Hydrocarbon groups having five or less carbon atoms are more preferred.

Examples of the neutral, conjugated or nonconjugated dienes having 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Examples of the anion ligands include alkoxy groups such as methoxy and tert-butoxy, aryloxy groups such as phenoxy, carboxylate groups such as acetate and benzoate, and sulfonate groups such as mesylate and tosylate.

Examples of the neutral ligands capable of coordinating with a lone pair include organophosphorus compounds, such as trimethylphosphine, triethylphosphine, triphenylphosphine, and diphenylmethylphosphine, and ethers such as tetrahydrofuran (THF), diethyl ether, dioxane and 1,2-dimethoxyethane.

Q is preferably the halogen atom or the alkyl group having 1 to 5 carbon atoms.

j is an integer from 1 to 4, and preferably 2.

A preferred structure of the bridged metallocene compound (A) is represented by Formula [2].

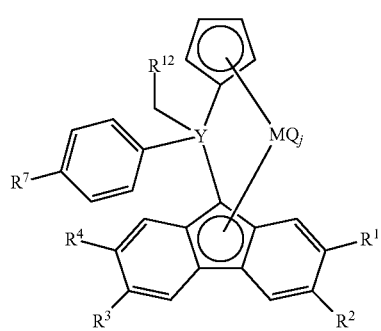

[2]

In Formula [2], the definitions of $R^1$ to $R^4$, $R^7$, $R^{12}$, Y, M, Q, and j are the same as the definitions of $R^1$ to $R^4$, $R^7$, $R^{12}$, Y, M, Q, and j in Formula [1], respectively. $R^1$ and $R^4$ are preferably each the aryl group having 6 to 20 carbon atoms or the halogen-containing aryl group having 6 to 20 carbon atoms; $R^2$ and $R^3$ are preferably each the alkyl group having 1 to 10 carbon atoms; $R^7$ is preferably a hydrogen atom, the halogen atom, or the alkyl group having 1 to 10 carbon atoms; and $R^{12}$ is preferably a hydrogen atom, the alkyl group having 1 to 10 carbon atoms, or the aryl group having 6 to 20 carbon atoms.

<Examples of Bridged Metallocene Compound>

Specific examples of the bridged metallocene compound (A) represented by Formula [1] will now be described; however, the scope of the present invention is not limited thereto. In the present invention, one type of the bridged metallocene compound (A) may be used alone or at least two types may be used in combination.

For the sake of convenience, the ligand structure which is part of the metallocene compound other than $MQ_j$ (metal part) is divided into three parts including Bridge (bridging moiety), Flu (fluorenyl moiety), and Cp (cyclopentadienyl moiety). In addition, the structure of the bridging moiety is divided into three parts for description; Table 1 shows the abbreviations of the groups contained in the bridging moiety, and Tables 2 and 3 show specific examples of the structure of the bridging moiety. α represents —$CR^{10}R^{11}R^{12}$, β represents -$PhR^5R^6R^7R^8R^9$, and γ represents Y.

TABLE 1

| | Bridge (bridging moiety) |
|---|---|
| α1 | Benzyl |
| α2 | m-chlorobenzyl |
| α3 | p-chlorobenzyl |
| α4 | p-fluorobenzyl |
| α5 | o-methylbenzyl |
| α6 | p-methylbenzyl |
| α7 | m-trifluoromethylbenzyl |
| α8 | p-trifluoromethylbenzyl |
| α9 | Biphenylmethyl |
| α10 | Naphthylmethyl |
| α11 | Cyclopentylmethyl |
| α12 | Cyclohexylmethyl |
| α13 | Cyclooctylmethyl |
| α14 | Ethyl |
| α15 | Propyl |
| α16 | n-butyl |
| α17 | iso-butyl |
| α18 | sec-butyl |
| α19 | tert-butyl |
| α20 | n-hexyl |
| α21 | n-hentriacontyl |
| α22 | 1-n-butyl-benzyl |
| α23 | 1,1,1-triphenylmethyl |
| β1 | Phenyl |
| β2 | p-chlorophenyl |
| β3 | p-tolyl |
| β4 | 2-naphthyl |
| β5 | 2-pyrenyl |
| γ1 | Carbon |
| γ2 | Silicon |

TABLE 2

| NO. | Bridge (bridging moiety) | | |
|---|---|---|---|
| B-1 | α1 | β1 | γ1 |
| B-2 | α2 | β1 | γ1 |
| B-3 | α3 | β1 | γ1 |
| B-4 | α4 | β1 | γ1 |
| B-5 | α5 | β1 | γ1 |

TABLE 2-continued

| NO. | Bridge (bridging moiety) | | |
|---|---|---|---|
| B-6 | α6 | β1 | γ1 |
| B-7 | α7 | β1 | γ1 |
| B-8 | α8 | β1 | γ1 |
| B-9 | α9 | β1 | γ1 |
| B-10 | α10 | β1 | γ1 |
| B-11 | α11 | β1 | γ1 |
| B-12 | α12 | β1 | γ1 |
| B-13 | α13 | β1 | γ1 |
| B-14 | α14 | β1 | γ1 |
| B-15 | α15 | β1 | γ1 |
| B-16 | α16 | β1 | γ1 |
| B-17 | α17 | β1 | γ1 |
| B-18 | α18 | β1 | γ1 |
| B-19 | α19 | β1 | γ1 |
| B-20 | α20 | β1 | γ1 |
| B-21 | α21 | β1 | γ1 |
| B-22 | α22 | β1 | γ1 |
| B-23 | α23 | β1 | γ1 |
| B-24 | α1 | β2 | γ1 |
| B-25 | α2 | β2 | γ1 |
| B-26 | α3 | β2 | γ1 |
| B-27 | α4 | β2 | γ1 |
| B-28 | α5 | β2 | γ1 |
| B-29 | α6 | β2 | γ1 |
| B-30 | α7 | β2 | γ1 |
| B-31 | α8 | β2 | γ1 |
| B-32 | α9 | β2 | γ1 |
| B-33 | α10 | β2 | γ1 |
| B-34 | α11 | β2 | γ1 |
| B-35 | α12 | β2 | γ1 |
| B-36 | α13 | β2 | γ1 |
| B-37 | α14 | β2 | γ1 |
| B-38 | α15 | β2 | γ1 |
| B-39 | α16 | β2 | γ1 |
| B-40 | α17 | β2 | γ1 |
| B-41 | α18 | β2 | γ1 |
| B-42 | α19 | β2 | γ1 |
| B-43 | α20 | β2 | γ1 |
| B-44 | α21 | β2 | γ1 |
| B-45 | α22 | β2 | γ1 |
| B-46 | α23 | β2 | γ1 |
| B-47 | α1 | β3 | γ1 |
| B-48 | α2 | β3 | γ1 |
| B-49 | α3 | β3 | γ1 |
| B-50 | α4 | β3 | γ1 |
| B-51 | α5 | β3 | γ1 |
| B-52 | α6 | β3 | γ1 |
| B-53 | α7 | β3 | γ1 |
| B-54 | α8 | β3 | γ1 |
| B-55 | α9 | β3 | γ1 |
| B-56 | α10 | β3 | γ1 |
| B-57 | α11 | β3 | γ1 |
| B-58 | α12 | β3 | γ1 |
| B-59 | α13 | β3 | γ1 |
| B-60 | α14 | β3 | γ1 |
| B-61 | α15 | β3 | γ1 |
| B-62 | α16 | β3 | γ1 |
| B-63 | α17 | β3 | γ1 |
| B-64 | α18 | β3 | γ1 |
| B-65 | α19 | β3 | γ1 |
| B-66 | α20 | β3 | γ1 |
| B-67 | α21 | β3 | γ1 |
| B-68 | α22 | β3 | γ1 |
| B-69 | α23 | β3 | γ1 |
| B-70 | α1 | β4 | γ1 |
| B-71 | α2 | β4 | γ1 |
| B-72 | α3 | β4 | γ1 |
| B-73 | α4 | β4 | γ1 |
| B-74 | α5 | β4 | γ1 |
| B-75 | α6 | β4 | γ1 |
| B-76 | α7 | β4 | γ1 |
| B-77 | α8 | β4 | γ1 |
| B-78 | α9 | β4 | γ1 |
| B-79 | α10 | β4 | γ1 |
| B-80 | α11 | β4 | γ1 |
| B-81 | α12 | β4 | γ1 |
| B-82 | α13 | β4 | γ1 |
| B-83 | α14 | β4 | γ1 |
| B-84 | α15 | β4 | γ1 |
| B-85 | α16 | β4 | γ1 |
| B-86 | α17 | β4 | γ1 |
| B-87 | α18 | β4 | γ1 |
| B-88 | α19 | β4 | γ1 |
| B-89 | α20 | β4 | γ1 |
| B-90 | α21 | β4 | γ1 |
| B-91 | α22 | β4 | γ1 |
| B-92 | α23 | β4 | γ1 |
| B-93 | α1 | β5 | γ1 |
| B-94 | α2 | β5 | γ1 |
| B-95 | α3 | β5 | γ1 |
| B-96 | α4 | β5 | γ1 |
| B-97 | α5 | β5 | γ1 |
| B-98 | α6 | β5 | γ1 |
| B-99 | α7 | β5 | γ1 |
| B-100 | α8 | β5 | γ1 |
| B-101 | α9 | β5 | γ1 |
| B-102 | α10 | β5 | γ1 |
| B-103 | α11 | β5 | γ1 |
| B-104 | α12 | β5 | γ1 |
| B-105 | α13 | β5 | γ1 |
| B-106 | α14 | β5 | γ1 |
| B-107 | α15 | β5 | γ1 |
| B-108 | α16 | β5 | γ1 |
| B-109 | α17 | β5 | γ1 |
| B-110 | α18 | β5 | γ1 |
| B-111 | α19 | β5 | γ1 |
| B-112 | α20 | β5 | γ1 |
| B-113 | α21 | β5 | γ1 |
| B-114 | α22 | β5 | γ1 |
| B-115 | α23 | β5 | γ1 |

TABLE 3

| NO. | Bridge (bridging moiety) | | |
|---|---|---|---|
| B-116 | α1 | β1 | γ2 |
| B-117 | α2 | β1 | γ2 |
| B-118 | α3 | β1 | γ2 |
| B-119 | α4 | β1 | γ2 |
| B-120 | α5 | β1 | γ2 |
| B-121 | α6 | β1 | γ2 |
| B-122 | α7 | β1 | γ2 |
| B-123 | α8 | β1 | γ2 |
| B-124 | α9 | β1 | γ2 |
| B-125 | α10 | β1 | γ2 |
| B-126 | α11 | β1 | γ2 |
| B-127 | α12 | β1 | γ2 |
| B-128 | α13 | β1 | γ2 |
| B-129 | α14 | β1 | γ2 |
| B-130 | α15 | β1 | γ2 |
| B-131 | α16 | β1 | γ2 |
| B-132 | α17 | β1 | γ2 |
| B-133 | α18 | β1 | γ2 |
| B-134 | α19 | β1 | γ2 |
| B-135 | α20 | β1 | γ2 |
| B-136 | α21 | β1 | γ2 |
| B-137 | α22 | β1 | γ2 |
| B-138 | α23 | β1 | γ2 |
| B-139 | α1 | β2 | γ2 |
| B-140 | α2 | β2 | γ2 |
| B-141 | α3 | β2 | γ2 |
| B-142 | α4 | β2 | γ2 |
| B-143 | α5 | β2 | γ2 |
| B-144 | α6 | β2 | γ2 |
| B-145 | α7 | β2 | γ2 |
| B-146 | α8 | β2 | γ2 |
| B-147 | α9 | β2 | γ2 |
| B-148 | α10 | β2 | γ2 |
| B-149 | α11 | β2 | γ2 |
| B-150 | α12 | β2 | γ2 |

TABLE 3-continued

| NO. | Bridge (bridging moiety) | | |
|---|---|---|---|
| B-151 | α13 | β2 | γ2 |
| B-152 | α14 | β2 | γ2 |
| B-153 | α15 | β2 | γ2 |
| B-154 | α16 | β2 | γ2 |
| B-155 | α17 | β2 | γ2 |
| B-156 | α18 | β2 | γ2 |
| B-157 | α19 | β2 | γ2 |
| B-158 | α20 | β2 | γ2 |
| B-159 | α21 | β2 | γ2 |
| B-160 | α22 | β2 | γ2 |
| B-161 | α23 | β2 | γ2 |
| B-162 | α1 | β3 | γ2 |
| B-163 | α2 | β3 | γ2 |
| B-164 | α3 | β3 | γ2 |
| B-165 | α4 | β3 | γ2 |
| B-166 | α5 | β3 | γ2 |
| B-167 | α6 | β3 | γ2 |
| B-168 | α7 | β3 | γ2 |
| B-169 | α8 | β3 | γ2 |
| B-170 | α9 | β3 | γ2 |
| B-171 | α10 | β3 | γ2 |
| B-172 | α11 | β3 | γ2 |
| B-173 | α12 | β3 | γ2 |
| B-174 | α13 | β3 | γ2 |
| B-175 | α14 | β3 | γ2 |
| B-176 | α15 | β3 | γ2 |
| B-177 | α16 | β3 | γ2 |
| B-178 | α17 | β3 | γ2 |
| B-179 | α18 | β3 | γ2 |
| B-180 | α19 | β3 | γ2 |
| B-181 | α20 | β3 | γ2 |
| B-182 | α21 | β3 | γ2 |
| B-183 | α22 | β3 | γ2 |
| B-184 | α23 | β3 | γ2 |
| B-185 | α1 | β4 | γ2 |
| B-186 | α2 | β4 | γ2 |
| B-187 | α3 | β4 | γ2 |
| B-188 | α4 | β4 | γ2 |
| B-189 | α5 | β4 | γ2 |
| B-190 | α6 | β4 | γ2 |
| B-191 | α7 | β4 | γ2 |
| B-192 | α8 | β4 | γ2 |
| B-193 | α9 | β4 | γ2 |
| B-194 | α10 | β4 | γ2 |
| B-195 | α11 | β4 | γ2 |
| B-196 | α12 | β4 | γ2 |
| B-197 | α13 | β4 | γ2 |
| B-198 | α14 | β4 | γ2 |
| B-199 | α15 | β4 | γ2 |
| B-200 | α16 | β4 | γ2 |
| B-201 | α17 | β4 | γ2 |
| B-202 | α18 | β4 | γ2 |
| B-203 | α19 | β4 | γ2 |
| B-204 | α20 | β4 | γ2 |
| B-205 | α21 | β4 | γ2 |
| B-206 | α22 | β4 | γ2 |
| B-207 | α23 | β4 | γ2 |
| B-208 | α1 | β5 | γ2 |
| B-209 | α2 | β5 | γ2 |
| B-210 | α3 | β5 | γ2 |
| B-211 | α4 | β5 | γ2 |
| B-212 | α5 | β5 | γ2 |
| B-213 | α6 | β5 | γ2 |
| B-214 | α7 | β5 | γ2 |
| B-215 | α8 | β5 | γ2 |
| B-216 | α9 | β5 | γ2 |
| B-217 | α10 | β5 | γ2 |
| B-218 | α11 | β5 | γ2 |
| B-219 | α12 | β5 | γ2 |
| B-220 | α13 | β5 | γ2 |
| B-221 | α14 | β5 | γ2 |
| B-222 | α15 | β5 | γ2 |
| B-223 | α16 | β5 | γ2 |
| B-224 | α17 | β5 | γ2 |
| B-225 | α18 | β5 | γ2 |
| B-226 | α19 | β5 | γ2 |
| B-227 | α20 | β5 | γ2 |

TABLE 3-continued

| NO. | Bridge (bridging moiety) | | |
|---|---|---|---|
| B-228 | α21 | β5 | γ2 |
| B-229 | α22 | β5 | γ2 |
| B-230 | α23 | β5 | γ2 |

According to these tables, No. B-24 indicates a combination of α1-β2-γ1, and the structure of such Bridge (bridging moiety) is represented by the following formula.

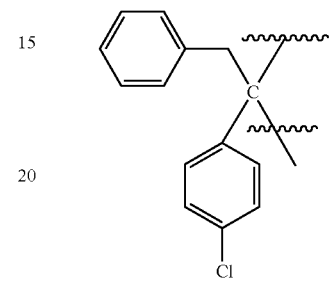

Table 4 shows specific examples of the structure of the fluorenyl moiety.

TABLE 4

| | Flu (fluorenyl moiety) |
|---|---|
| δ1 | 3,6-diphenyl-2,7-di-tert-butylfluorenyl |
| δ2 | Octamethylfluorenyl |
| δ3 | 2,3,6,7-tetraphenylfluorenyl |
| δ4 | 2,3,6,7-tetra-tert-butylfluorenyl |
| δ5 | 3,6-di-tert-butyl-2,7-diphenylfluorenyl |
| δ6 | 3,6-di-tert-butyl-2,7-di-o-tolylfluorenyl |
| δ7 | 3,6-di-tert-butyl-2,7-di-p-chlorophenylfluorenyl |
| δ8 | 3,6-di-tert-butyl-2,7-di-(2-furyl)fluorenyl |

Examples of the combination of the bridging moiety and the fluorenyl moiety in the metallocene compound will now be shown in the following tables.

TABLE 5

| NO. | Bridging moiety | Fluorenyl moiety |
|---|---|---|
| 1 | B-1 | δ1 |
| 2 | B-2 | δ1 |
| 3 | B-3 | δ1 |
| 4 | B-4 | δ1 |
| 5 | B-5 | δ1 |
| 6 | B-6 | δ1 |
| 7 | B-7 | δ1 |
| 8 | B-8 | δ1 |
| 9 | B-9 | δ1 |
| 10 | B-10 | δ1 |
| 11 | B-11 | δ1 |
| 12 | B-12 | δ1 |
| 13 | B-13 | δ1 |
| 14 | B-14 | δ1 |
| 15 | B-15 | δ1 |
| 16 | B-16 | δ1 |
| 17 | B-17 | δ1 |
| 18 | B-18 | δ1 |
| 19 | B-19 | δ1 |
| 20 | B-20 | δ1 |
| 21 | B-21 | δ1 |
| 22 | B-22 | δ1 |
| 23 | B-23 | δ1 |

TABLE 5-continued

| NO. | Bridging moiety | Fluorenyl moiety |
|---|---|---|
| 24 | B-24 | δ1 |
| 25 | B-25 | δ1 |
| 26 | B-26 | δ1 |
| 27 | B-27 | δ1 |
| 28 | B-28 | δ1 |
| 29 | B-29 | δ1 |
| 30 | B-30 | δ1 |
| 31 | B-31 | δ1 |
| 32 | B-32 | δ1 |
| 33 | B-33 | δ1 |
| 34 | B-34 | δ1 |
| 35 | B-35 | δ1 |
| 36 | B-36 | δ1 |
| 37 | B-37 | δ1 |
| 38 | B-38 | δ1 |
| 39 | B-39 | δ1 |
| 40 | B-40 | δ1 |
| 41 | B-41 | δ1 |
| 42 | B-42 | δ1 |
| 43 | B-43 | δ1 |
| 44 | B-44 | δ1 |
| 45 | B-45 | δ1 |
| 46 | B-46 | δ1 |
| 47 | B-47 | δ1 |
| 48 | B-48 | δ1 |
| 49 | B-49 | δ1 |
| 50 | B-50 | δ1 |
| 51 | B-51 | δ1 |
| 52 | B-52 | δ1 |
| 53 | B-53 | δ1 |
| 54 | B-54 | δ1 |
| 55 | B-55 | δ1 |
| 56 | B-56 | δ1 |
| 57 | B-57 | δ1 |
| 58 | B-58 | δ1 |
| 59 | B-59 | δ1 |
| 60 | B-60 | δ1 |
| 61 | B-61 | δ1 |
| 62 | B-62 | δ1 |
| 63 | B-63 | δ1 |
| 64 | B-64 | δ1 |
| 65 | B-65 | δ1 |
| 66 | B-66 | δ1 |
| 67 | B-67 | δ1 |
| 68 | B-68 | δ1 |
| 69 | B-69 | δ1 |
| 70 | B-70 | δ1 |
| 71 | B-71 | δ1 |
| 72 | B-72 | δ1 |
| 73 | B-73 | δ1 |
| 74 | B-74 | δ1 |
| 75 | B-75 | δ1 |
| 76 | B-76 | δ1 |
| 77 | B-77 | δ1 |
| 78 | B-78 | δ1 |
| 79 | B-79 | δ1 |
| 80 | B-80 | δ1 |
| 81 | B-81 | δ1 |
| 82 | B-82 | δ1 |
| 83 | B-83 | δ1 |
| 84 | B-84 | δ1 |
| 85 | B-85 | δ1 |
| 86 | B-86 | δ1 |
| 87 | B-87 | δ1 |
| 88 | B-88 | δ1 |
| 89 | B-89 | δ1 |
| 90 | B-90 | δ1 |
| 91 | B-91 | δ1 |
| 92 | B-92 | δ1 |
| 93 | B-93 | δ1 |
| 94 | B-94 | δ1 |
| 95 | B-95 | δ1 |
| 96 | B-96 | δ1 |
| 97 | B-97 | δ1 |
| 98 | B-98 | δ1 |
| 99 | B-99 | δ1 |
| 100 | B-100 | δ1 |

TABLE 5-continued

| NO. | Bridging moiety | Fluorenyl moiety |
|---|---|---|
| 101 | B-101 | δ1 |
| 102 | B-102 | δ1 |
| 103 | B-103 | δ1 |
| 104 | B-104 | δ1 |
| 105 | B-105 | δ1 |
| 106 | B-106 | δ1 |
| 107 | B-107 | δ1 |
| 108 | B-108 | δ1 |
| 109 | B-109 | δ1 |
| 110 | B-110 | δ1 |
| 111 | B-111 | δ1 |
| 112 | B-112 | δ1 |
| 113 | B-113 | δ1 |
| 114 | B-114 | δ1 |
| 115 | B-115 | δ1 |
| 116 | B-116 | δ1 |
| 117 | B-117 | δ1 |
| 118 | B-118 | δ1 |
| 119 | B-119 | δ1 |
| 120 | B-120 | δ1 |
| 121 | B-121 | δ1 |
| 122 | B-122 | δ1 |
| 123 | B-123 | δ1 |
| 124 | B-124 | δ1 |
| 125 | B-125 | δ1 |
| 126 | B-126 | δ1 |
| 127 | B-127 | δ1 |
| 128 | B-128 | δ1 |
| 129 | B-129 | δ1 |
| 130 | B-130 | δ1 |
| 131 | B-131 | δ1 |
| 132 | B-132 | δ1 |
| 133 | B-133 | δ1 |
| 134 | B-134 | δ1 |
| 135 | B-135 | δ1 |
| 136 | B-136 | δ1 |
| 137 | B-137 | δ1 |
| 138 | B-138 | δ1 |
| 139 | B-139 | δ1 |
| 140 | B-140 | δ1 |
| 141 | B-141 | δ1 |
| 142 | B-142 | δ1 |
| 143 | B-143 | δ1 |
| 144 | B-144 | δ1 |
| 145 | B-145 | δ1 |
| 146 | B-146 | δ1 |
| 147 | B-147 | δ1 |
| 148 | B-148 | δ1 |
| 149 | B-149 | δ1 |
| 150 | B-150 | δ1 |

TABLE 6

| NO. | Bridging moiety | Fluorenyl moiety |
|---|---|---|
| 151 | B-151 | δ1 |
| 152 | B-152 | δ1 |
| 153 | B-153 | δ1 |
| 154 | B-154 | δ1 |
| 155 | B-155 | δ1 |
| 156 | B-156 | δ1 |
| 157 | B-157 | δ1 |
| 158 | B-158 | δ1 |
| 159 | B-159 | δ1 |
| 160 | B-160 | δ1 |
| 161 | B-161 | δ1 |
| 162 | B-162 | δ1 |
| 163 | B-163 | δ1 |
| 164 | B-164 | δ1 |
| 165 | B-165 | δ1 |
| 166 | B-166 | δ1 |
| 167 | B-167 | δ1 |
| 168 | B-168 | δ1 |

TABLE 6-continued

| NO. | Bridging moiety | Fluorenyl moiety |
|---|---|---|
| 169 | B-169 | δ1 |
| 170 | B-170 | δ1 |
| 171 | B-171 | δ1 |
| 172 | B-172 | δ1 |
| 173 | B-173 | δ1 |
| 174 | B-174 | δ1 |
| 175 | B-175 | δ1 |
| 176 | B-176 | δ1 |
| 177 | B-177 | δ1 |
| 178 | B-178 | δ1 |
| 179 | B-179 | δ1 |
| 180 | B-180 | δ1 |
| 181 | B-181 | δ1 |
| 182 | B-182 | δ1 |
| 183 | B-183 | δ1 |
| 184 | B-184 | δ1 |
| 185 | B-185 | δ1 |
| 186 | B-186 | δ1 |
| 187 | B-187 | δ1 |
| 188 | B-188 | δ1 |
| 189 | B-189 | δ1 |
| 190 | B-190 | δ1 |
| 191 | B-191 | δ1 |
| 192 | B-192 | δ1 |
| 193 | B-193 | δ1 |
| 194 | B-194 | δ1 |
| 195 | B-195 | δ1 |
| 196 | B-196 | δ1 |
| 197 | B-197 | δ1 |
| 198 | B-198 | δ1 |
| 199 | B-199 | δ1 |
| 200 | B-200 | δ1 |
| 201 | B-201 | δ1 |
| 202 | B-202 | δ1 |
| 203 | B-203 | δ1 |
| 204 | B-204 | δ1 |
| 205 | B-205 | δ1 |
| 206 | B-206 | δ1 |
| 207 | B-207 | δ1 |
| 208 | B-208 | δ1 |
| 209 | B-209 | δ1 |
| 210 | B-210 | δ1 |
| 211 | B-211 | δ1 |
| 212 | B-212 | δ1 |
| 213 | B-213 | δ1 |
| 214 | B-214 | δ1 |
| 215 | B-215 | δ1 |
| 216 | B-216 | δ1 |
| 217 | B-217 | δ1 |
| 218 | B-218 | δ1 |
| 219 | B-219 | δ1 |
| 220 | B-220 | δ1 |
| 221 | B-221 | δ1 |
| 222 | B-222 | δ1 |
| 223 | B-223 | δ1 |
| 224 | B-224 | δ1 |
| 225 | B-225 | δ1 |
| 226 | B-226 | δ1 |
| 227 | B-227 | δ1 |
| 228 | B-228 | δ1 |
| 229 | B-229 | δ1 |
| 230 | B-230 | δ1 |
| 231 | B-1 | δ2 |
| 232 | B-2 | δ2 |
| 233 | B-3 | δ2 |
| 234 | B-4 | δ2 |
| 235 | B-5 | δ2 |
| 236 | B-6 | δ2 |
| 237 | B-7 | δ2 |
| 238 | B-8 | δ2 |
| 239 | B-9 | δ2 |
| 240 | B-10 | δ2 |
| 241 | B-11 | δ2 |
| 242 | B-12 | δ2 |
| 243 | B-13 | δ2 |
| 244 | B-14 | δ2 |
| 245 | B-15 | δ2 |
| 246 | B-16 | δ2 |
| 247 | B-17 | δ2 |
| 248 | B-18 | δ2 |
| 249 | B-19 | δ2 |
| 250 | B-20 | δ2 |
| 251 | B-21 | δ2 |
| 252 | B-22 | δ2 |
| 253 | B-23 | δ2 |
| 254 | B-24 | δ2 |
| 255 | B-25 | δ2 |
| 256 | B-26 | δ2 |
| 257 | B-27 | δ2 |
| 258 | B-28 | δ2 |
| 259 | B-29 | δ2 |
| 260 | B-30 | δ2 |
| 261 | B-31 | δ2 |
| 262 | B-32 | δ2 |
| 263 | B-33 | δ2 |
| 264 | B-34 | δ2 |
| 265 | B-35 | δ2 |
| 266 | B-36 | δ2 |
| 267 | B-37 | δ2 |
| 268 | B-38 | δ2 |
| 269 | B-39 | δ2 |
| 270 | B-40 | δ2 |
| 271 | B-41 | δ2 |
| 272 | B-42 | δ2 |
| 273 | B-43 | δ2 |
| 274 | B-44 | δ2 |
| 275 | B-45 | δ2 |
| 276 | B-46 | δ2 |
| 277 | B-47 | δ2 |
| 278 | B-48 | δ2 |
| 279 | B-49 | δ2 |
| 280 | B-50 | δ2 |
| 281 | B-51 | δ2 |
| 282 | B-52 | δ2 |
| 283 | B-53 | δ2 |
| 284 | B-54 | δ2 |
| 285 | B-55 | δ2 |
| 286 | B-56 | δ2 |
| 287 | B-57 | δ2 |
| 288 | B-58 | δ2 |
| 289 | B-59 | δ2 |
| 290 | B-60 | δ2 |
| 291 | B-61 | δ2 |
| 292 | B-62 | δ2 |
| 293 | B-63 | δ2 |
| 294 | B-64 | δ2 |
| 295 | B-65 | δ2 |
| 296 | B-66 | δ2 |
| 297 | B-67 | δ2 |
| 298 | B-68 | δ2 |
| 299 | B-69 | δ2 |
| 300 | B-70 | δ2 |

TABLE 7

| NO. | Bridging moiety | Fluorenyl moiety |
|---|---|---|
| 301 | B-71 | δ2 |
| 302 | B-72 | δ2 |
| 303 | B-73 | δ2 |
| 304 | B-74 | δ2 |
| 305 | B-75 | δ2 |
| 305 | B-76 | δ2 |
| 307 | B-77 | δ2 |
| 308 | B-78 | δ2 |
| 309 | B-79 | δ2 |
| 310 | B-80 | δ2 |
| 311 | B-81 | δ2 |
| 312 | B-82 | δ2 |
| 313 | B-83 | δ2 |

TABLE 7-continued

| NO. | Bridging moiety | Fluorenyl moiety |
|---|---|---|
| 314 | B-84 | δ2 |
| 315 | B-85 | δ2 |
| 316 | B-86 | δ2 |
| 317 | B-87 | δ2 |
| 318 | B-88 | δ2 |
| 319 | B-89 | δ2 |
| 320 | B-90 | δ2 |
| 321 | B-91 | δ2 |
| 322 | B-92 | δ2 |
| 323 | B-93 | δ2 |
| 324 | B-94 | δ2 |
| 325 | B-95 | δ2 |
| 326 | B-96 | δ2 |
| 327 | B-97 | δ2 |
| 328 | B-98 | δ2 |
| 329 | B-99 | δ2 |
| 330 | B-100 | δ2 |
| 331 | B-101 | δ2 |
| 332 | B-102 | δ2 |
| 333 | B-103 | δ2 |
| 334 | B-104 | δ2 |
| 335 | B-105 | δ2 |
| 336 | B-106 | δ2 |
| 337 | B-107 | δ2 |
| 338 | B-108 | δ2 |
| 339 | B-109 | δ2 |
| 340 | B-110 | δ2 |
| 341 | B-111 | δ2 |
| 342 | B-112 | δ2 |
| 343 | B-113 | δ2 |
| 344 | B-114 | δ2 |
| 345 | B-115 | δ2 |
| 346 | B-116 | δ2 |
| 347 | B-117 | δ2 |
| 348 | B-118 | δ2 |
| 349 | B-119 | δ2 |
| 350 | B-120 | δ2 |
| 351 | B-121 | δ2 |
| 352 | B-122 | δ2 |
| 353 | B-123 | δ2 |
| 354 | B-124 | δ2 |
| 355 | B-125 | δ2 |
| 356 | B-126 | δ2 |
| 357 | B-127 | δ2 |
| 358 | B-128 | δ2 |
| 359 | B-129 | δ2 |
| 360 | B-130 | δ2 |
| 361 | B-131 | δ2 |
| 362 | B-132 | δ2 |
| 363 | B-133 | δ2 |
| 364 | B-134 | δ2 |
| 365 | B-135 | δ2 |
| 366 | B-136 | δ2 |
| 367 | B-137 | δ2 |
| 368 | B-138 | δ2 |
| 369 | B-139 | δ2 |
| 370 | B-140 | δ2 |
| 371 | B-141 | δ2 |
| 372 | B-142 | δ2 |
| 373 | B-143 | δ2 |
| 374 | B-144 | δ2 |
| 375 | B-145 | δ2 |
| 376 | B-146 | δ2 |
| 377 | B-147 | δ2 |
| 378 | B-148 | δ2 |
| 379 | B-149 | δ2 |
| 380 | B-150 | δ2 |
| 381 | B-151 | δ2 |
| 382 | B-152 | δ2 |
| 383 | B-153 | δ2 |
| 384 | B-154 | δ2 |
| 385 | B-155 | δ2 |
| 386 | B-156 | δ2 |
| 387 | B-157 | δ2 |
| 388 | B-158 | δ2 |
| 389 | B-159 | δ2 |
| 390 | B-160 | δ2 |
| 391 | B-161 | δ2 |
| 392 | B-162 | δ2 |
| 393 | B-163 | δ2 |
| 394 | B-164 | δ2 |
| 395 | B-165 | δ2 |
| 396 | B-166 | δ2 |
| 397 | B-167 | δ2 |
| 398 | B-168 | δ2 |
| 399 | B-169 | δ2 |
| 400 | B-170 | δ2 |
| 401 | B-171 | δ2 |
| 402 | B-172 | δ2 |
| 403 | B-173 | δ2 |
| 404 | B-174 | δ2 |
| 405 | B-175 | δ2 |
| 406 | B-176 | δ2 |
| 407 | B-177 | δ2 |
| 408 | B-178 | δ2 |
| 409 | B-179 | δ2 |
| 410 | B-180 | δ2 |
| 411 | B-181 | δ2 |
| 412 | B-182 | δ2 |
| 413 | B-183 | δ2 |
| 414 | B-184 | δ2 |
| 415 | B-185 | δ2 |
| 416 | B-186 | δ2 |
| 417 | B-187 | δ2 |
| 418 | B-188 | δ2 |
| 419 | B-189 | δ2 |
| 420 | B-190 | δ2 |
| 421 | B-191 | δ2 |
| 422 | B-192 | δ2 |
| 423 | B-193 | δ2 |
| 424 | B-194 | δ2 |
| 425 | B-195 | δ2 |
| 426 | B-196 | δ2 |
| 427 | B-197 | δ2 |
| 428 | B-198 | δ2 |
| 429 | B-199 | δ2 |
| 430 | B-200 | δ2 |
| 431 | B-201 | δ2 |
| 432 | B-202 | δ2 |
| 433 | B-203 | δ2 |
| 434 | B-204 | δ2 |
| 435 | B-205 | δ2 |
| 436 | B-206 | δ2 |
| 437 | B-207 | δ2 |
| 438 | B-208 | δ2 |
| 439 | B-209 | δ2 |
| 440 | B-210 | δ2 |
| 441 | B-211 | δ2 |
| 442 | B-212 | δ2 |
| 443 | B-213 | δ2 |
| 444 | B-214 | δ2 |
| 445 | B-215 | δ2 |
| 446 | B-216 | δ2 |
| 447 | B-217 | δ2 |
| 448 | B-218 | δ2 |
| 449 | B-219 | δ2 |
| 450 | B-220 | δ2 |

TABLE 8

| NO. | Bridging moiety | Fluorenyl moiety |
|---|---|---|
| 451 | B-221 | δ2 |
| 452 | B-222 | δ2 |
| 453 | B-223 | δ2 |
| 454 | B-224 | δ2 |
| 455 | B-225 | δ2 |
| 456 | B-226 | δ2 |
| 457 | B-227 | δ2 |
| 458 | B-228 | δ2 |

TABLE 8-continued

| NO. | Bridging moiety | Fluorenyl moiety |
|---|---|---|
| 459 | B-229 | δ2 |
| 460 | B-230 | δ2 |
| 461 | B-1 | δ3 |
| 462 | B-2 | δ3 |
| 463 | B-3 | δ3 |
| 464 | B-4 | δ3 |
| 465 | B-5 | δ3 |
| 466 | B-6 | δ3 |
| 467 | B-7 | δ3 |
| 468 | B-8 | δ3 |
| 469 | B-9 | δ3 |
| 470 | B-10 | δ3 |
| 471 | B-11 | δ3 |
| 472 | B-12 | δ3 |
| 473 | B-13 | δ3 |
| 474 | B-14 | δ3 |
| 475 | B-15 | δ3 |
| 476 | B-16 | δ3 |
| 477 | B-17 | δ3 |
| 478 | B-18 | δ3 |
| 479 | B-19 | δ3 |
| 480 | B-20 | δ3 |
| 481 | B-21 | δ3 |
| 482 | B-22 | δ3 |
| 483 | B-23 | δ3 |
| 484 | B-24 | δ3 |
| 485 | B-25 | δ3 |
| 486 | B-26 | δ3 |
| 487 | B-27 | δ3 |
| 488 | B-28 | δ3 |
| 489 | B-29 | δ3 |
| 490 | B-30 | δ3 |
| 491 | B-31 | δ3 |
| 492 | B-32 | δ3 |
| 493 | B-33 | δ3 |
| 494 | B-34 | δ3 |
| 495 | B-35 | δ3 |
| 496 | B-36 | δ3 |
| 497 | B-37 | δ3 |
| 498 | B-38 | δ3 |
| 499 | B-39 | δ3 |
| 500 | B-40 | δ3 |
| 501 | B-41 | δ3 |
| 502 | B-42 | δ3 |
| 503 | B-43 | δ3 |
| 504 | B-44 | δ3 |
| 505 | B-45 | δ3 |
| 506 | B-46 | δ3 |
| 507 | B-47 | δ3 |
| 508 | B-48 | δ3 |
| 509 | B-49 | δ3 |
| 510 | B-50 | δ3 |
| 511 | B-51 | δ3 |
| 512 | B-52 | δ3 |
| 513 | B-53 | δ3 |
| 514 | B-54 | δ3 |
| 515 | B-55 | δ3 |
| 516 | B-56 | δ3 |
| 517 | B-57 | δ3 |
| 518 | B-58 | δ3 |
| 519 | B-59 | δ3 |
| 520 | B-60 | δ3 |
| 521 | B-61 | δ3 |
| 522 | B-62 | δ3 |
| 523 | B-63 | δ3 |
| 524 | B-64 | δ3 |
| 525 | B-65 | δ3 |
| 526 | B-66 | δ3 |
| 527 | B-67 | δ3 |
| 528 | B-68 | δ3 |
| 529 | B-69 | δ3 |
| 530 | B-70 | δ3 |
| 531 | B-71 | δ3 |
| 532 | B-72 | δ3 |
| 533 | B-73 | δ3 |
| 534 | B-74 | δ3 |
| 535 | B-75 | δ3 |
| 536 | B-76 | δ3 |
| 537 | B-77 | δ3 |
| 538 | B-78 | δ3 |
| 539 | B-79 | δ3 |
| 540 | B-80 | δ3 |
| 541 | B-81 | δ3 |
| 542 | B-82 | δ3 |
| 543 | B-83 | δ3 |
| 544 | B-84 | δ3 |
| 545 | B-85 | δ3 |
| 546 | B-86 | δ3 |
| 547 | B-87 | δ3 |
| 548 | B-88 | δ3 |
| 549 | B-89 | δ3 |
| 550 | B-90 | δ3 |
| 551 | B-91 | δ3 |
| 552 | B-92 | δ3 |
| 553 | B-93 | δ3 |
| 554 | B-94 | δ3 |
| 555 | B-95 | δ3 |
| 556 | B-96 | δ3 |
| 557 | B-97 | δ3 |
| 558 | B-98 | δ3 |
| 559 | B-99 | δ3 |
| 560 | B-100 | δ3 |
| 561 | B-101 | δ3 |
| 562 | B-102 | δ3 |
| 563 | B-103 | δ3 |
| 564 | B-104 | δ3 |
| 565 | B-105 | δ3 |
| 566 | B-106 | δ3 |
| 567 | B-107 | δ3 |
| 568 | B-108 | δ3 |
| 569 | B-109 | δ3 |
| 570 | B-110 | δ3 |
| 571 | B-111 | δ3 |
| 572 | B-112 | δ3 |
| 573 | B-113 | δ3 |
| 574 | B-114 | δ3 |
| 575 | B-115 | δ3 |
| 576 | B-116 | δ3 |
| 577 | B-117 | δ3 |
| 578 | B-118 | δ3 |
| 579 | B-119 | δ3 |
| 580 | B-120 | δ3 |
| 581 | B-121 | δ3 |
| 582 | B-122 | δ3 |
| 583 | B-123 | δ3 |
| 584 | B-124 | δ3 |
| 585 | B-125 | δ3 |
| 586 | B-126 | δ3 |
| 587 | B-127 | δ3 |
| 588 | B-128 | δ3 |
| 589 | B-129 | δ3 |
| 590 | B-130 | δ3 |
| 591 | B-131 | δ3 |
| 592 | B-132 | δ3 |
| 593 | B-133 | δ3 |
| 594 | B-134 | δ3 |
| 595 | B-135 | δ3 |
| 596 | B-136 | δ3 |
| 597 | B-137 | δ3 |
| 598 | B-138 | δ3 |
| 599 | B-139 | δ3 |
| 600 | B-140 | δ3 |

TABLE 9

| NO. | Bridging moiety | Fluorenyl moiety |
|---|---|---|
| 601 | B-141 | δ3 |
| 602 | B-142 | δ3 |
| 603 | B-143 | δ3 |

TABLE 9-continued

| NO. | Bridging moiety | Fluorenyl moiety |
|---|---|---|
| 604 | B-144 | δ3 |
| 605 | B-145 | δ3 |
| 606 | B-146 | δ3 |
| 607 | B-147 | δ3 |
| 608 | B-148 | δ3 |
| 609 | B-149 | δ3 |
| 610 | B-150 | δ3 |
| 611 | B-151 | δ3 |
| 612 | B-152 | δ3 |
| 613 | B-153 | δ3 |
| 614 | B-154 | δ3 |
| 615 | B-155 | δ3 |
| 616 | B-156 | δ3 |
| 617 | B-157 | δ3 |
| 618 | B-158 | δ3 |
| 619 | B-159 | δ3 |
| 620 | B-160 | δ3 |
| 621 | B-161 | δ3 |
| 622 | B-162 | δ3 |
| 623 | B-163 | δ3 |
| 624 | B-164 | δ3 |
| 625 | B-165 | δ3 |
| 626 | B-166 | δ3 |
| 627 | B-167 | δ3 |
| 628 | B-168 | δ3 |
| 629 | B-169 | δ3 |
| 630 | B-170 | δ3 |
| 631 | B-171 | δ3 |
| 632 | B-172 | δ3 |
| 633 | B-173 | δ3 |
| 634 | B-174 | δ3 |
| 635 | B-175 | δ3 |
| 636 | B-176 | δ3 |
| 637 | B-177 | δ3 |
| 638 | B-178 | δ3 |
| 639 | B-179 | δ3 |
| 640 | B-180 | δ3 |
| 641 | B-181 | δ3 |
| 642 | B-182 | δ3 |
| 643 | B-183 | δ3 |
| 644 | B-184 | δ3 |
| 645 | B-185 | δ3 |
| 646 | B-186 | δ3 |
| 647 | B-187 | δ3 |
| 648 | B-188 | δ3 |
| 649 | B-189 | δ3 |
| 650 | B-190 | δ3 |
| 651 | B-191 | δ3 |
| 652 | B-192 | δ3 |
| 653 | B-193 | δ3 |
| 654 | B-194 | δ3 |
| 655 | B-195 | δ3 |
| 656 | B-196 | δ3 |
| 657 | B-197 | δ3 |
| 658 | B-198 | δ3 |
| 659 | B-199 | δ3 |
| 660 | B-200 | δ3 |
| 661 | B-201 | δ3 |
| 662 | B-202 | δ3 |
| 663 | B-203 | δ3 |
| 664 | B-204 | δ3 |
| 665 | B-205 | δ3 |
| 666 | B-206 | δ3 |
| 667 | B-207 | δ3 |
| 668 | B-208 | δ3 |
| 669 | B-209 | δ3 |
| 670 | B-210 | δ3 |
| 671 | B-211 | δ3 |
| 672 | B-212 | δ3 |
| 673 | B-213 | δ3 |
| 674 | B-214 | δ3 |
| 675 | B-215 | δ3 |
| 676 | B-216 | δ3 |
| 677 | B-217 | δ3 |
| 678 | B-218 | δ3 |
| 679 | B-219 | δ3 |
| 680 | B-220 | δ3 |
| 681 | B-221 | δ3 |
| 682 | B-222 | δ3 |
| 683 | B-223 | δ3 |
| 684 | B-224 | δ3 |
| 685 | B-225 | δ3 |
| 686 | B-226 | δ3 |
| 687 | B-227 | δ3 |
| 688 | B-228 | δ3 |
| 689 | B-229 | δ3 |
| 690 | B-230 | δ3 |
| 691 | B-1 | δ4 |
| 692 | B-2 | δ4 |
| 693 | B-3 | δ4 |
| 694 | B-4 | δ4 |
| 695 | B-5 | δ4 |
| 696 | B-6 | δ4 |
| 697 | B-7 | δ4 |
| 698 | B-8 | δ4 |
| 699 | B-9 | δ4 |
| 700 | B-10 | δ4 |
| 701 | B-11 | δ4 |
| 702 | B-12 | δ4 |
| 703 | B-13 | δ4 |
| 704 | B-14 | δ4 |
| 705 | B-15 | δ4 |
| 706 | B-16 | δ4 |
| 707 | B-17 | δ4 |
| 708 | B-18 | δ4 |
| 709 | B-19 | δ4 |
| 710 | B-20 | δ4 |
| 711 | B-21 | δ4 |
| 712 | B-22 | δ4 |
| 713 | B-23 | δ4 |
| 714 | B-24 | δ4 |
| 715 | B-25 | δ4 |
| 716 | B-26 | δ4 |
| 717 | B-27 | δ4 |
| 718 | B-28 | δ4 |
| 719 | B-29 | δ4 |
| 720 | B-30 | δ4 |
| 721 | B-31 | δ4 |
| 722 | B-32 | δ4 |
| 723 | B-33 | δ4 |
| 724 | B-34 | δ4 |
| 725 | B-35 | δ4 |
| 726 | B-36 | δ4 |
| 727 | B-37 | δ4 |
| 728 | B-38 | δ4 |
| 729 | B-39 | δ4 |
| 730 | B-40 | δ4 |
| 731 | B-41 | δ4 |
| 732 | B-42 | δ4 |
| 733 | B-43 | δ4 |
| 734 | B-44 | δ4 |
| 735 | B-45 | δ4 |
| 736 | B-46 | δ4 |
| 737 | B-47 | δ4 |
| 738 | B-48 | δ4 |
| 739 | B-49 | δ4 |
| 740 | B-50 | δ4 |
| 741 | B-51 | δ4 |
| 742 | B-52 | δ4 |
| 743 | B-53 | δ4 |
| 744 | B-54 | δ4 |
| 745 | B-55 | δ4 |
| 746 | B-56 | δ4 |
| 747 | B-57 | δ4 |
| 748 | B-58 | δ4 |
| 749 | B-59 | δ4 |
| 750 | B-60 | δ4 |

TABLE 10

| NO. | Bridging moiety | Fluorenyl moiety |
|---|---|---|
| 751 | B-61 | δ4 |
| 752 | B-62 | δ4 |
| 753 | B-63 | δ4 |
| 754 | B-64 | δ4 |
| 755 | B-65 | δ4 |
| 756 | B-66 | δ4 |
| 757 | B-67 | δ4 |
| 758 | B-68 | δ4 |
| 759 | B-69 | δ4 |
| 760 | B-70 | δ4 |
| 761 | B-71 | δ4 |
| 762 | B-72 | δ4 |
| 763 | B-73 | δ4 |
| 764 | B-74 | δ4 |
| 765 | B-75 | δ4 |
| 766 | B-76 | δ4 |
| 767 | B-77 | δ4 |
| 768 | B-78 | δ4 |
| 769 | B-79 | δ4 |
| 770 | B-80 | δ4 |
| 771 | B-81 | δ4 |
| 772 | B-82 | δ4 |
| 773 | B-83 | δ4 |
| 774 | B-84 | δ4 |
| 775 | B-85 | δ4 |
| 776 | B-86 | δ4 |
| 777 | B-87 | δ4 |
| 778 | B-88 | δ4 |
| 779 | B-89 | δ4 |
| 780 | B-90 | δ4 |
| 781 | B-91 | δ4 |
| 782 | B-92 | δ4 |
| 783 | B-93 | δ4 |
| 784 | B-94 | δ4 |
| 785 | B-95 | δ4 |
| 786 | B-96 | δ4 |
| 787 | B-97 | δ4 |
| 788 | B-98 | δ4 |
| 789 | B-99 | δ4 |
| 790 | B-100 | δ4 |
| 791 | B-101 | δ4 |
| 792 | B-102 | δ4 |
| 793 | B-103 | δ4 |
| 794 | B-104 | δ4 |
| 795 | B-105 | δ4 |
| 796 | B-106 | δ4 |
| 797 | B-107 | δ4 |
| 798 | B-108 | δ4 |
| 799 | B-109 | δ4 |
| 800 | B-110 | δ4 |
| 801 | B-111 | δ4 |
| 802 | B-112 | δ4 |
| 803 | B-113 | δ4 |
| 804 | B-114 | δ4 |
| 805 | B-115 | δ4 |
| 806 | B-116 | δ4 |
| 807 | B-117 | δ4 |
| 808 | B-118 | δ4 |
| 809 | B-119 | δ4 |
| 810 | B-120 | δ4 |
| 811 | B-121 | δ4 |
| 812 | B-122 | δ4 |
| 813 | B-123 | δ4 |
| 814 | B-124 | δ4 |
| 815 | B-125 | δ4 |
| 816 | B-126 | δ4 |
| 817 | B-127 | δ4 |
| 818 | B-128 | δ4 |
| 819 | B-129 | δ4 |
| 820 | B-130 | δ4 |
| 821 | B-131 | δ4 |
| 822 | B-132 | δ4 |
| 823 | B-133 | δ4 |
| 824 | B-134 | δ4 |
| 825 | B-135 | δ4 |
| 826 | B-136 | δ4 |
| 827 | B-137 | δ4 |
| 828 | B-138 | δ4 |
| 829 | B-139 | δ4 |
| 830 | B-140 | δ4 |
| 831 | B-141 | δ4 |
| 832 | B-142 | δ4 |
| 833 | B-143 | δ4 |
| 834 | B-144 | δ4 |
| 835 | B-145 | δ4 |
| 836 | B-146 | δ4 |
| 837 | B-147 | δ4 |
| 838 | B-148 | δ4 |
| 839 | B-149 | δ4 |
| 840 | B-150 | δ4 |
| 841 | B-151 | δ4 |
| 842 | B-152 | δ4 |
| 843 | B-153 | δ4 |
| 844 | B-154 | δ4 |
| 845 | B-155 | δ4 |
| 846 | B-156 | δ4 |
| 847 | B-157 | δ4 |
| 848 | B-158 | δ4 |
| 849 | B-159 | δ4 |
| 850 | B-160 | δ4 |
| 851 | B-161 | δ4 |
| 852 | B-162 | δ4 |
| 853 | B-163 | δ4 |
| 854 | B-164 | δ4 |
| 855 | B-165 | δ4 |
| 856 | B-166 | δ4 |
| 857 | B-167 | δ4 |
| 858 | B-168 | δ4 |
| 859 | B-169 | δ4 |
| 860 | B-170 | δ4 |
| 861 | B-171 | δ4 |
| 862 | B-172 | δ4 |
| 863 | B-173 | δ4 |
| 864 | B-174 | δ4 |
| 865 | B-175 | δ4 |
| 866 | B-176 | δ4 |
| 867 | B-177 | δ4 |
| 868 | B-178 | δ4 |
| 869 | B-179 | δ4 |
| 870 | B-180 | δ4 |
| 871 | B-181 | δ4 |
| 872 | B-182 | δ4 |
| 873 | B-183 | δ4 |
| 874 | B-184 | δ4 |
| 875 | B-185 | δ4 |
| 876 | B-186 | δ4 |
| 877 | B-187 | δ4 |
| 878 | B-188 | δ4 |
| 879 | B-189 | δ4 |
| 880 | B-190 | δ4 |
| 881 | B-191 | δ4 |
| 882 | B-192 | δ4 |
| 883 | B-193 | δ4 |
| 884 | B-194 | δ4 |
| 885 | B-195 | δ4 |
| 886 | B-196 | δ4 |
| 887 | B-197 | δ4 |
| 888 | B-198 | δ4 |
| 889 | B-199 | δ4 |
| 890 | B-200 | δ4 |
| 891 | B-201 | δ4 |
| 892 | B-202 | δ4 |
| 893 | B-203 | δ4 |
| 894 | B-204 | δ4 |
| 895 | B-205 | δ4 |
| 896 | B-206 | δ4 |
| 897 | B-207 | δ4 |
| 898 | B-208 | δ4 |
| 899 | B-209 | δ4 |
| 900 | B-210 | δ4 |

TABLE 11

| NO. | Bridging moiety | Fluorenyl moiety |
|---|---|---|
| 901 | B-211 | δ4 |
| 902 | B-212 | δ4 |
| 903 | B-213 | δ4 |
| 904 | B-214 | δ4 |
| 905 | B-215 | δ4 |
| 906 | B-216 | δ4 |
| 907 | B-217 | δ4 |
| 903 | B-218 | δ4 |
| 909 | B-219 | δ4 |
| 910 | B-220 | δ4 |
| 911 | B-221 | δ4 |
| 912 | B-222 | δ4 |
| 913 | B-223 | δ4 |
| 914 | B-224 | δ4 |
| 915 | B-225 | δ4 |
| 916 | B-226 | δ4 |
| 917 | B-227 | δ4 |
| 918 | B-228 | δ4 |
| 919 | B-229 | δ4 |
| 920 | B-230 | δ4 |
| 921 | B-1 | δ5 |
| 922 | B-2 | δ5 |
| 923 | B-3 | δ5 |
| 924 | B-4 | δ5 |
| 925 | B-5 | δ5 |
| 926 | B-6 | δ5 |
| 927 | B-7 | δ5 |
| 928 | B-8 | δ5 |
| 929 | B-9 | δ5 |
| 930 | B-10 | δ5 |
| 931 | B-11 | δ5 |
| 932 | B-12 | δ5 |
| 933 | B-13 | δ5 |
| 934 | B-14 | δ5 |
| 935 | B-15 | δ5 |
| 936 | B-16 | δ5 |
| 937 | B-17 | δ5 |
| 938 | B-18 | δ5 |
| 939 | B-19 | δ5 |
| 940 | B-20 | δ5 |
| 941 | B-21 | δ5 |
| 942 | B-22 | δ5 |
| 943 | B-23 | δ5 |
| 944 | B-24 | δ5 |
| 945 | B-25 | δ5 |
| 946 | B-26 | δ5 |
| 947 | B-27 | δ5 |
| 948 | B-28 | δ5 |
| 949 | B-29 | δ5 |
| 950 | B-30 | δ5 |
| 951 | B-31 | δ5 |
| 952 | B-32 | δ5 |
| 953 | B-33 | δ5 |
| 954 | B-34 | δ5 |
| 955 | B-35 | δ5 |
| 956 | B-36 | δ5 |
| 957 | B-37 | δ5 |
| 958 | B-38 | δ5 |
| 959 | B-39 | δ5 |
| 960 | B-40 | δ5 |
| 961 | B-41 | δ5 |
| 962 | B-42 | δ5 |
| 963 | B-43 | δ5 |
| 964 | B-44 | δ5 |
| 965 | B-45 | δ5 |
| 966 | B-46 | δ5 |
| 967 | B-47 | δ5 |
| 968 | B-48 | δ5 |
| 969 | B-49 | δ5 |
| 970 | B-50 | δ5 |
| 971 | B-51 | δ5 |
| 972 | B-52 | δ5 |
| 973 | B-53 | δ5 |
| 974 | B-54 | δ5 |
| 975 | B-55 | δ5 |
| 976 | B-56 | δ5 |
| 977 | B-57 | δ5 |
| 978 | B-58 | δ5 |
| 979 | B-59 | δ5 |
| 980 | B-60 | δ5 |
| 981 | B-61 | δ5 |
| 982 | B-62 | δ5 |
| 983 | B-63 | δ5 |
| 984 | B-64 | δ5 |
| 985 | B-65 | δ5 |
| 986 | B-66 | δ5 |
| 987 | B-67 | δ5 |
| 988 | B-68 | δ5 |
| 989 | B-69 | δ5 |
| 990 | B-70 | δ5 |
| 991 | B-71 | δ5 |
| 992 | B-72 | δ5 |
| 993 | B-73 | δ5 |
| 994 | B-74 | δ5 |
| 995 | B-75 | δ5 |
| 996 | B-76 | δ5 |
| 997 | B-77 | δ5 |
| 998 | B-78 | δ5 |
| 999 | B-79 | δ5 |
| 1000 | B-80 | δ5 |
| 1001 | B-81 | δ5 |
| 1002 | B-82 | δ5 |
| 1003 | B-83 | δ5 |
| 1004 | B-84 | δ5 |
| 1005 | B-85 | δ5 |
| 1006 | B-86 | δ5 |
| 1007 | B-87 | δ5 |
| 1008 | B-88 | δ5 |
| 1009 | B-89 | δ5 |
| 1010 | B-90 | δ5 |
| 1011 | B-91 | δ5 |
| 1012 | B-92 | δ5 |
| 1013 | B-93 | δ5 |
| 1014 | B-94 | δ5 |
| 1015 | B-95 | δ5 |
| 1016 | B-96 | δ5 |
| 1017 | B-97 | δ5 |
| 1018 | B-98 | δ5 |
| 1019 | B-99 | δ5 |
| 1020 | B-100 | δ5 |
| 1021 | B-101 | δ5 |
| 1022 | B-102 | δ5 |
| 1023 | B-103 | δ5 |
| 1024 | B-104 | δ5 |
| 1025 | B-105 | δ5 |
| 1026 | B-106 | δ5 |
| 1027 | B-107 | δ5 |
| 1028 | B-108 | δ5 |
| 1029 | B-109 | δ5 |
| 1030 | B-110 | δ5 |
| 1031 | B-111 | δ5 |
| 1032 | B-112 | δ5 |
| 1033 | B-113 | δ5 |
| 1034 | B-114 | δ5 |
| 1035 | B-115 | δ5 |
| 1036 | B-116 | δ5 |
| 1037 | B-117 | δ5 |
| 1038 | B-118 | δ5 |
| 1039 | B-119 | δ5 |
| 1040 | B-120 | δ5 |
| 1041 | B-121 | δ5 |
| 1042 | B-122 | δ5 |
| 1043 | B-123 | δ5 |
| 1044 | B-124 | δ5 |
| 1045 | B-125 | δ5 |
| 1046 | B-126 | δ5 |
| 1047 | B-127 | δ5 |
| 1048 | B-128 | δ5 |
| 1049 | B-129 | δ5 |
| 1050 | B-130 | δ5 |

TABLE 12

| NO. | Bridging moiety | Fluorenyl moiety |
|---|---|---|
| 1051 | B-131 | δ5 |
| 1052 | B-132 | δ5 |
| 1053 | B-133 | δ5 |
| 1054 | B-134 | δ5 |
| 1055 | B-135 | δ5 |
| 1056 | B-136 | δ5 |
| 1057 | B-137 | δ5 |
| 1058 | B-138 | δ5 |
| 1059 | B-139 | δ5 |
| 1060 | B-140 | δ5 |
| 1061 | B-141 | δ5 |
| 1062 | B-142 | δ5 |
| 1063 | B-143 | δ5 |
| 1064 | B-144 | δ5 |
| 1065 | B-145 | δ5 |
| 1066 | B-146 | δ5 |
| 1067 | B-147 | δ5 |
| 1068 | B-148 | δ5 |
| 1069 | B-149 | δ5 |
| 1070 | B-150 | δ5 |
| 1071 | B-151 | δ5 |
| 1072 | B-152 | δ5 |
| 1073 | B-153 | δ5 |
| 1074 | B-154 | δ5 |
| 1075 | B-155 | δ5 |
| 1076 | B-156 | δ5 |
| 1077 | B-157 | δ5 |
| 1078 | B-158 | δ5 |
| 1079 | B-159 | δ5 |
| 1080 | B-160 | δ5 |
| 1081 | B-161 | δ5 |
| 1082 | B-162 | δ5 |
| 1083 | B-163 | δ5 |
| 1084 | B-164 | δ5 |
| 1085 | B-165 | δ5 |
| 1086 | B-166 | δ5 |
| 1087 | B-167 | δ5 |
| 1088 | B-168 | δ5 |
| 1089 | B-169 | δ5 |
| 1090 | B-170 | δ5 |
| 1091 | B-171 | δ5 |
| 1092 | B-172 | δ5 |
| 1093 | B-173 | δ5 |
| 1094 | B-174 | δ5 |
| 1095 | B-175 | δ5 |
| 1096 | B-176 | δ5 |
| 1097 | B-177 | δ5 |
| 1098 | B-178 | δ5 |
| 1099 | B-179 | δ5 |
| 1100 | B-180 | δ5 |
| 1101 | B-181 | δ5 |
| 1102 | B-182 | δ5 |
| 1103 | B-183 | δ5 |
| 1104 | B-184 | δ5 |
| 1105 | B-185 | δ5 |
| 1106 | B-186 | δ5 |
| 1107 | B-187 | δ5 |
| 1108 | B-188 | δ5 |
| 1109 | B-189 | δ5 |
| 1110 | B-190 | δ5 |
| 1111 | B-191 | δ5 |
| 1112 | B-192 | δ5 |
| 1113 | B-193 | δ5 |
| 1114 | B-194 | δ5 |
| 1115 | B-195 | δ5 |
| 1116 | B-196 | δ5 |
| 1117 | B-197 | δ5 |
| 1118 | B-198 | δ5 |
| 1119 | B-199 | δ5 |
| 1120 | B-200 | δ5 |
| 1121 | B-201 | δ5 |
| 1122 | B-202 | δ5 |
| 1123 | B-203 | δ5 |
| 1124 | B-204 | δ5 |
| 1125 | B-205 | δ5 |
| 1126 | B-206 | δ5 |
| 1127 | B-207 | δ5 |
| 1128 | B-208 | δ5 |
| 1129 | B-209 | δ5 |
| 1130 | B-210 | δ5 |
| 1131 | B-211 | δ5 |
| 1132 | B-212 | δ5 |
| 1133 | B-213 | δ5 |
| 1134 | B-214 | δ5 |
| 1135 | B-215 | δ5 |
| 1136 | B-216 | δ5 |
| 1137 | B-217 | δ5 |
| 1138 | B-218 | δ5 |
| 1139 | B-219 | δ5 |
| 1140 | B-220 | δ5 |
| 1141 | B-221 | δ5 |
| 1142 | B-222 | δ5 |
| 1143 | B-223 | δ5 |
| 1144 | B-224 | δ5 |
| 1145 | B-225 | δ5 |
| 1146 | B-226 | δ5 |
| 1147 | B-227 | δ5 |
| 1148 | B-228 | δ5 |
| 1149 | B-229 | δ5 |
| 1150 | B-230 | δ5 |
| 1151 | B-1 | δ6 |
| 1152 | B-2 | δ6 |
| 1153 | B-3 | δ6 |
| 1154 | B-4 | δ6 |
| 1155 | B-5 | δ6 |
| 1156 | B-6 | δ6 |
| 1157 | B-7 | δ6 |
| 1158 | B-8 | δ6 |
| 1159 | B-9 | δ6 |
| 1160 | B-10 | δ6 |
| 1161 | B-11 | δ6 |
| 1162 | B-12 | δ6 |
| 1163 | B-13 | δ6 |
| 1164 | B-14 | δ6 |
| 1165 | B-15 | δ6 |
| 1166 | B-16 | δ6 |
| 1167 | B-17 | δ6 |
| 1168 | B-18 | δ6 |
| 1169 | B-19 | δ6 |
| 1170 | B-20 | δ6 |
| 1171 | B-21 | δ6 |
| 1172 | B-22 | δ6 |
| 1173 | B-23 | δ6 |
| 1174 | B-24 | δ6 |
| 1175 | B-25 | δ6 |
| 1176 | B-26 | δ6 |
| 1177 | B-27 | δ6 |
| 1178 | B-28 | δ6 |
| 1179 | B-29 | δ6 |
| 1180 | B-30 | δ6 |
| 1181 | B-31 | δ6 |
| 1182 | B-32 | δ6 |
| 1183 | B-33 | δ6 |
| 1184 | B-34 | δ6 |
| 1185 | B-35 | δ6 |
| 1186 | B-36 | δ6 |
| 1187 | B-37 | δ6 |
| 1188 | B-38 | δ6 |
| 1189 | B-39 | δ6 |
| 1190 | B-40 | δ6 |
| 1191 | B-41 | δ6 |
| 1192 | B-42 | δ6 |
| 1193 | B-43 | δ6 |
| 1194 | B-44 | δ6 |
| 1195 | B-45 | δ6 |
| 1196 | B-46 | δ6 |
| 1197 | B-47 | δ6 |
| 1198 | B-48 | δ6 |
| 1199 | B-49 | δ6 |
| 1200 | B-50 | δ6 |

TABLE 13

| NO. | Bridging moiety | Fluorenyl moiety |
|---|---|---|
| 1201 | B-51 | δ6 |
| 1202 | B-52 | δ6 |
| 1203 | B-53 | δ6 |
| 1204 | B-54 | δ6 |
| 1205 | B-55 | δ6 |
| 1206 | B-56 | δ6 |
| 1207 | B-57 | δ6 |
| 1208 | B-58 | δ6 |
| 1209 | B-59 | δ6 |
| 1210 | B-60 | δ6 |
| 1211 | B-61 | δ6 |
| 1212 | B-62 | δ6 |
| 1213 | B-63 | δ6 |
| 1214 | B-64 | δ6 |
| 1215 | B-66 | δ6 |
| 1216 | B-66 | δ6 |
| 1217 | B-67 | δ6 |
| 1218 | B-68 | δ6 |
| 1219 | B-69 | δ6 |
| 1220 | B-70 | δ6 |
| 1221 | B-71 | δ6 |
| 1222 | B-72 | δ6 |
| 1223 | B-73 | δ6 |
| 1224 | B-74 | δ6 |
| 1225 | B-75 | δ6 |
| 1226 | B-76 | δ6 |
| 1227 | B-77 | δ6 |
| 1228 | B-78 | δ6 |
| 1229 | B-79 | δ6 |
| 1230 | B-80 | δ6 |
| 1231 | B-81 | δ6 |
| 1232 | B-82 | δ6 |
| 1233 | B-83 | δ6 |
| 1234 | B-84 | δ6 |
| 1235 | B-85 | δ6 |
| 1236 | B-86 | δ6 |
| 1237 | B-87 | δ6 |
| 1238 | B-88 | δ6 |
| 1239 | B-89 | δ6 |
| 1240 | B-90 | δ6 |
| 1241 | B-91 | δ6 |
| 1242 | B-92 | δ6 |
| 1243 | B-93 | δ6 |
| 1244 | B-94 | δ6 |
| 1245 | B-95 | δ6 |
| 1246 | B-96 | δ6 |
| 1247 | B-97 | δ6 |
| 1248 | B-98 | δ6 |
| 1249 | B-99 | δ6 |
| 1250 | B-100 | δ6 |
| 1251 | B-101 | δ6 |
| 1252 | B-102 | δ6 |
| 1253 | B-103 | δ6 |
| 1254 | B-104 | δ6 |
| 1255 | B-105 | δ6 |
| 1256 | B-106 | δ6 |
| 1257 | B-107 | δ6 |
| 1258 | B-108 | δ6 |
| 1259 | B-109 | δ6 |
| 1260 | B-110 | δ6 |
| 1261 | B-111 | δ6 |
| 1262 | B-112 | δ6 |
| 1263 | B-113 | δ6 |
| 1264 | B-114 | δ6 |
| 1265 | B-115 | δ6 |
| 1266 | B-116 | δ6 |
| 1267 | B-117 | δ6 |
| 1268 | B-118 | δ6 |
| 1269 | B-119 | δ6 |
| 1270 | B-120 | δ6 |
| 1271 | B-121 | δ6 |
| 1272 | B-122 | δ6 |
| 1273 | B-123 | δ6 |
| 1274 | B-124 | δ6 |
| 1275 | B-125 | δ6 |
| 1276 | B-126 | δ6 |
| 1277 | B-127 | δ6 |
| 1278 | B-128 | δ6 |
| 1279 | B-129 | δ6 |
| 1280 | B-130 | δ6 |
| 1281 | B-131 | δ6 |
| 1282 | B-132 | δ6 |
| 1283 | B-133 | δ6 |
| 1284 | B-134 | δ6 |
| 1285 | B-135 | δ6 |
| 1286 | B-136 | δ6 |
| 1287 | B-137 | δ6 |
| 1288 | B-138 | δ6 |
| 1289 | B-139 | δ6 |
| 1290 | B-140 | δ6 |
| 1291 | B-141 | δ6 |
| 1292 | B-142 | δ6 |
| 1293 | B-143 | δ6 |
| 1294 | B-144 | δ6 |
| 1295 | B-145 | δ6 |
| 1296 | B-146 | δ6 |
| 1297 | B-147 | δ6 |
| 1298 | B-148 | δ6 |
| 1299 | B-149 | δ6 |
| 1300 | B-150 | δ6 |
| 1301 | B-151 | δ6 |
| 1302 | B-152 | δ6 |
| 1303 | B-153 | δ6 |
| 1304 | B-154 | δ6 |
| 1305 | B-155 | δ6 |
| 1306 | B-156 | δ6 |
| 1307 | B-157 | δ6 |
| 1308 | B-158 | δ6 |
| 1309 | B-159 | δ6 |
| 1310 | B-160 | δ6 |
| 1311 | B-161 | δ6 |
| 1312 | B-162 | δ6 |
| 1313 | B-163 | δ6 |
| 1314 | B-164 | δ6 |
| 1315 | B-165 | δ6 |
| 1316 | B-166 | δ6 |
| 1317 | B-167 | δ6 |
| 1318 | B-168 | δ6 |
| 1319 | B-169 | δ6 |
| 1320 | B-170 | δ6 |
| 1321 | B-171 | δ6 |
| 1322 | B-172 | δ6 |
| 1323 | B-173 | δ6 |
| 1324 | B-174 | δ6 |
| 1325 | B-175 | δ6 |
| 1326 | B-176 | δ6 |
| 1327 | B-177 | δ6 |
| 1328 | B-178 | δ6 |
| 1329 | B-179 | δ6 |
| 1330 | B-180 | δ6 |
| 1331 | B-181 | δ6 |
| 1332 | B-182 | δ6 |
| 1333 | B-183 | δ6 |
| 1334 | B-184 | δ6 |
| 1335 | B-185 | δ6 |
| 1336 | B-186 | δ6 |
| 1337 | B-187 | δ6 |
| 1338 | B-188 | δ6 |
| 1339 | B-189 | δ6 |
| 1340 | B-190 | δ6 |
| 1341 | B-191 | δ6 |
| 1342 | B-192 | δ6 |
| 1343 | B-193 | δ6 |
| 1344 | B-194 | δ6 |
| 1345 | B-195 | δ6 |
| 1346 | B-196 | δ6 |
| 1347 | B-197 | δ6 |
| 1348 | B-198 | δ6 |
| 1349 | B-199 | δ6 |
| 1350 | B-200 | δ6 |

TABLE 14

| NO. | Bridging moiety | Fluorenyl moiety |
|---|---|---|
| 1351 | B-201 | δ6 |
| 1352 | B-202 | δ6 |
| 1353 | B-203 | δ6 |
| 1354 | B-204 | δ6 |
| 1355 | B-205 | δ6 |
| 1356 | B-206 | δ6 |
| 1357 | B-207 | δ6 |
| 1358 | B-208 | δ6 |
| 1359 | B-209 | δ6 |
| 1360 | B-210 | δ6 |
| 1361 | B-211 | δ6 |
| 1362 | B-212 | δ6 |
| 1363 | B-213 | δ6 |
| 1364 | B-214 | δ6 |
| 1365 | B-215 | δ6 |
| 1366 | B-216 | δ6 |
| 1367 | B-217 | δ6 |
| 1368 | B-218 | δ6 |
| 1369 | B-219 | δ6 |
| 1370 | B-220 | δ6 |
| 1371 | B-221 | δ6 |
| 1372 | B-222 | δ6 |
| 1373 | B-223 | δ6 |
| 1374 | B-224 | δ6 |
| 1375 | B-225 | δ6 |
| 1376 | B-226 | δ6 |
| 1377 | B-227 | δ6 |
| 1378 | B-228 | δ6 |
| 1379 | B-229 | δ6 |
| 1380 | B-230 | δ6 |
| 1381 | B-1 | δ7 |
| 1382 | B-2 | δ7 |
| 1383 | B-3 | δ7 |
| 1384 | B-4 | δ7 |
| 1385 | B-5 | δ7 |
| 1386 | B-6 | δ7 |
| 1387 | B-7 | δ7 |
| 1388 | B-8 | δ7 |
| 1389 | B-9 | δ7 |
| 1390 | B-10 | δ7 |
| 1391 | B-11 | δ7 |
| 1392 | B-12 | δ7 |
| 1393 | B-13 | δ7 |
| 1394 | B-14 | δ7 |
| 1395 | B-15 | δ7 |
| 1396 | B-16 | δ7 |
| 1397 | B-17 | δ7 |
| 1398 | B-18 | δ7 |
| 1399 | B-19 | δ7 |
| 1400 | B-20 | δ7 |
| 1401 | B-21 | δ7 |
| 1402 | B-22 | δ7 |
| 1403 | B-23 | δ7 |
| 1404 | B-24 | δ7 |
| 1405 | B-25 | δ7 |
| 1406 | B-26 | δ7 |
| 1407 | B-27 | δ7 |
| 1408 | B-28 | δ7 |
| 1409 | B-29 | δ7 |
| 1410 | B-30 | δ7 |
| 1411 | B-31 | δ7 |
| 1412 | B-32 | δ7 |
| 1413 | B-33 | δ7 |
| 1414 | B-34 | δ7 |
| 1415 | B-35 | δ7 |
| 1416 | B-36 | δ7 |
| 1417 | B-37 | δ7 |
| 1418 | B-38 | δ7 |
| 1419 | B-39 | δ7 |
| 1420 | B-40 | δ7 |
| 1421 | B-41 | δ7 |
| 1422 | B-42 | δ7 |
| 1423 | B-43 | δ7 |
| 1424 | B-44 | δ7 |
| 1425 | B-45 | δ7 |
| 1426 | B-46 | δ7 |
| 1427 | B-47 | δ7 |
| 1428 | B-48 | δ7 |
| 1429 | B-49 | δ7 |
| 1430 | B-50 | δ7 |
| 1431 | B-51 | δ7 |
| 1432 | B-52 | δ7 |
| 1433 | B-53 | δ7 |
| 1434 | B-54 | δ7 |
| 1435 | B-55 | δ7 |
| 1436 | B-56 | δ7 |
| 1437 | B-57 | δ7 |
| 1438 | B-58 | δ7 |
| 1439 | B-59 | δ7 |
| 1440 | B-60 | δ7 |
| 1441 | B-61 | δ7 |
| 1442 | B-62 | δ7 |
| 1443 | B-63 | δ7 |
| 1444 | B-64 | δ7 |
| 1445 | B-65 | δ7 |
| 1446 | B-66 | δ7 |
| 1447 | B-67 | δ7 |
| 1448 | B-68 | δ7 |
| 1449 | B-69 | δ7 |
| 1450 | B-70 | δ7 |
| 1451 | B-71 | δ7 |
| 1452 | B-72 | δ7 |
| 1453 | B-73 | δ7 |
| 1454 | B-74 | δ7 |
| 1455 | B-75 | δ7 |
| 1456 | B-76 | δ7 |
| 1457 | B-77 | δ7 |
| 1458 | B-78 | δ7 |
| 1459 | B-79 | δ7 |
| 1460 | B-80 | δ7 |
| 1461 | B-81 | δ7 |
| 1462 | B-82 | δ7 |
| 1463 | B-83 | δ7 |
| 1464 | B-84 | δ7 |
| 1465 | B-85 | δ7 |
| 1466 | B-86 | δ7 |
| 1467 | B-87 | δ7 |
| 1468 | B-88 | δ7 |
| 1469 | B-89 | δ7 |
| 1470 | B-90 | δ7 |
| 1471 | B-91 | δ7 |
| 1472 | B-92 | δ7 |
| 1473 | B-93 | δ7 |
| 1474 | B-94 | δ7 |
| 1475 | B-95 | δ7 |
| 1476 | B-96 | δ7 |
| 1477 | B-97 | δ7 |
| 1478 | B-98 | δ7 |
| 1479 | B-99 | δ7 |
| 1480 | B-100 | δ7 |
| 1481 | B-101 | δ7 |
| 1482 | B-102 | δ7 |
| 1483 | B-103 | δ7 |
| 1484 | B-104 | δ7 |
| 1485 | B-105 | δ7 |
| 1486 | B-106 | δ7 |
| 1487 | B-107 | δ7 |
| 1488 | B-108 | δ7 |
| 1489 | B-109 | δ7 |
| 1490 | B-110 | δ7 |
| 1491 | B-111 | δ7 |
| 1492 | B-112 | δ7 |
| 1493 | B-113 | δ7 |
| 1494 | B-114 | δ7 |
| 1495 | B-115 | δ7 |
| 1496 | B-116 | δ7 |
| 1497 | B-117 | δ7 |
| 1498 | B-118 | δ7 |
| 1499 | B-119 | δ7 |
| 1500 | B-120 | δ7 |

TABLE 15

| NO. | Bridging moiety | Fluorenyl moiety |
|---|---|---|
| 1501 | B-121 | δ7 |
| 1502 | B-122 | δ7 |
| 1503 | B-123 | δ7 |
| 1504 | B-124 | δ7 |
| 1505 | B-125 | δ7 |
| 1506 | B-126 | δ7 |
| 1507 | B-127 | δ7 |
| 1508 | B-128 | δ7 |
| 1509 | B-129 | δ7 |
| 1510 | B-130 | δ7 |
| 1511 | B-131 | δ7 |
| 1512 | B-132 | δ7 |
| 1513 | B-133 | δ7 |
| 1514 | B-134 | δ7 |
| 1515 | B-135 | δ7 |
| 1516 | B-136 | δ7 |
| 1517 | B-137 | δ7 |
| 1518 | B-138 | δ7 |
| 1519 | B-139 | δ7 |
| 1520 | B-140 | δ7 |
| 1521 | B-141 | δ7 |
| 1522 | B-142 | δ7 |
| 1523 | B-143 | δ7 |
| 1524 | B-144 | δ7 |
| 1525 | B-145 | δ7 |
| 1526 | B-146 | δ7 |
| 1527 | B-147 | δ7 |
| 1528 | B-148 | δ7 |
| 1529 | B-149 | δ7 |
| 1530 | B-150 | δ7 |
| 1531 | B-151 | δ7 |
| 1532 | B-152 | δ7 |
| 1533 | B-153 | δ7 |
| 1534 | B-154 | δ7 |
| 1535 | B-155 | δ7 |
| 1536 | B-156 | δ7 |
| 1537 | B-157 | δ7 |
| 1538 | B-158 | δ7 |
| 1539 | B-159 | δ7 |
| 1540 | B-160 | δ7 |
| 1541 | B-161 | δ7 |
| 1542 | B-162 | δ7 |
| 1543 | B-163 | δ7 |
| 1544 | B-164 | δ7 |
| 1545 | B-165 | δ7 |
| 1546 | B-166 | δ7 |
| 1547 | B-167 | δ7 |
| 1548 | B-168 | δ7 |
| 1549 | B-169 | δ7 |
| 1550 | B-170 | δ7 |
| 1551 | B-171 | δ7 |
| 1552 | B-172 | δ7 |
| 1553 | B-173 | δ7 |
| 1554 | B-174 | δ7 |
| 1555 | B-175 | δ7 |
| 1556 | B-176 | δ7 |
| 1557 | B-177 | δ7 |
| 1558 | B-178 | δ7 |
| 1559 | B-179 | δ7 |
| 1560 | B-180 | δ7 |
| 1561 | B-181 | δ7 |
| 1562 | B-182 | δ7 |
| 1563 | B-183 | δ7 |
| 1564 | B-184 | δ7 |
| 1565 | B-185 | δ7 |
| 1566 | B-186 | δ7 |
| 1567 | B-187 | δ7 |
| 1568 | B-188 | δ7 |
| 1569 | B-189 | δ7 |
| 1570 | B-190 | δ7 |
| 1571 | B-191 | δ7 |
| 1572 | B-192 | δ7 |
| 1573 | B-193 | δ7 |
| 1574 | B-194 | δ7 |
| 1575 | B-195 | δ7 |
| 1576 | B-196 | δ7 |
| 1577 | B-197 | δ7 |
| 1578 | B-198 | δ7 |
| 1579 | B-199 | δ7 |
| 1580 | B-200 | δ7 |
| 1581 | B-201 | δ7 |
| 1582 | B-202 | δ7 |
| 1583 | B-203 | δ7 |
| 1584 | B-204 | δ7 |
| 1585 | B-205 | δ7 |
| 1586 | B-206 | δ7 |
| 1587 | B-207 | δ7 |
| 1588 | B-208 | δ7 |
| 1589 | B-209 | δ7 |
| 1590 | B-210 | δ7 |
| 1591 | B-211 | δ7 |
| 1592 | B-212 | δ7 |
| 1593 | B-213 | δ7 |
| 1594 | B-214 | δ7 |
| 1595 | B-215 | δ7 |
| 1596 | B-216 | δ7 |
| 1597 | B-217 | δ7 |
| 1598 | B-218 | δ7 |
| 1599 | B-219 | δ7 |
| 1600 | B-220 | δ7 |
| 1601 | B-221 | δ7 |
| 1602 | B-222 | δ7 |
| 1603 | B-223 | δ7 |
| 1604 | B-224 | δ7 |
| 1605 | B-225 | δ7 |
| 1606 | B-226 | δ7 |
| 1607 | B-227 | δ7 |
| 1608 | B-228 | δ7 |
| 1609 | B-229 | δ7 |
| 1610 | B-230 | δ7 |
| 1611 | B-1 | δ8 |
| 1612 | B-2 | δ8 |
| 1613 | B-3 | δ8 |
| 1614 | B-4 | δ8 |
| 1615 | B-5 | δ8 |
| 1616 | B-6 | δ8 |
| 1617 | B-7 | δ8 |
| 1618 | B-8 | δ8 |
| 1619 | B-9 | δ8 |
| 1620 | B-10 | δ8 |
| 1621 | B-11 | δ8 |
| 1622 | B-12 | δ8 |
| 1623 | B-13 | δ8 |
| 1624 | B-14 | δ8 |
| 1625 | B-15 | δ8 |
| 1626 | B-16 | δ8 |
| 1627 | B-17 | δ8 |
| 1628 | B-18 | δ8 |
| 1629 | B-19 | δ8 |
| 1630 | B-20 | δ8 |
| 1631 | B-21 | δ8 |
| 1632 | B-22 | δ8 |
| 1633 | B-23 | δ8 |
| 1634 | B-24 | δ8 |
| 1635 | B-25 | δ8 |
| 1636 | B-26 | δ8 |
| 1637 | B-27 | δ8 |
| 1638 | B-28 | δ8 |
| 1639 | B-29 | δ8 |
| 1640 | B-30 | δ8 |
| 1641 | B-31 | δ8 |
| 1642 | B-32 | δ8 |
| 1643 | B-33 | δ8 |
| 1644 | B-34 | δ8 |
| 1645 | B-35 | δ8 |
| 1646 | B-36 | δ8 |
| 1647 | B-37 | δ8 |
| 1648 | B-38 | δ8 |
| 1649 | B-39 | δ8 |
| 1650 | B-40 | δ8 |

TABLE 16

| NO. | Bridging moiety | Fluorenyl moiety |
|---|---|---|
| 1651 | B-41 | δ8 |
| 1652 | B-42 | δ8 |
| 1653 | B-43 | δ8 |
| 1654 | B-44 | δ8 |
| 1655 | B-45 | δ8 |
| 1656 | B-46 | δ8 |
| 1657 | B-47 | δ8 |
| 1658 | B-48 | δ8 |
| 1659 | B-49 | δ8 |
| 1660 | B-50 | δ8 |
| 1661 | B-51 | δ8 |
| 1662 | B-52 | δ8 |
| 1663 | B-53 | δ8 |
| 1664 | B-54 | δ8 |
| 1665 | B-55 | δ8 |
| 1666 | B-56 | δ8 |
| 1667 | B-57 | δ8 |
| 1668 | B-58 | δ8 |
| 1669 | B-59 | δ8 |
| 1670 | B-60 | δ8 |
| 1671 | B-61 | δ8 |
| 1672 | B-62 | δ8 |
| 1673 | B-63 | δ8 |
| 1674 | B-64 | δ8 |
| 1675 | B-65 | δ8 |
| 1676 | B-66 | δ8 |
| 1677 | B-67 | δ8 |
| 1678 | B-68 | δ8 |
| 1679 | B-69 | δ8 |
| 1680 | B-70 | δ8 |
| 1681 | B-71 | δ8 |
| 1682 | B-72 | δ8 |
| 1683 | B-73 | δ8 |
| 1684 | B-74 | δ8 |
| 1685 | B-75 | δ8 |
| 1686 | B-76 | δ8 |
| 1687 | B-77 | δ8 |
| 1688 | B-78 | δ8 |
| 1689 | B-79 | δ8 |
| 1690 | B-80 | δ8 |
| 1691 | B-81 | δ8 |
| 1692 | B-82 | δ8 |
| 1693 | B-83 | δ8 |
| 1694 | B-84 | δ8 |
| 1695 | B-85 | δ8 |
| 1696 | B-86 | δ8 |
| 1697 | B-87 | δ8 |
| 1698 | B-88 | δ8 |
| 1699 | B-89 | δ8 |
| 1700 | B-90 | δ8 |
| 1701 | B-91 | δ8 |
| 1702 | B-92 | δ8 |
| 1703 | B-93 | δ8 |
| 1704 | B-94 | δ8 |
| 1705 | B-95 | δ8 |
| 1706 | B-96 | δ8 |
| 1707 | B-97 | δ8 |
| 1708 | B-98 | δ8 |
| 1709 | B-99 | δ8 |
| 1710 | B-100 | δ8 |
| 1711 | B-101 | δ8 |
| 1712 | B-102 | δ8 |
| 1713 | B-103 | δ8 |
| 1714 | B-104 | δ8 |
| 1715 | B-105 | δ8 |
| 1716 | B-106 | δ8 |
| 1717 | B-107 | δ8 |
| 1718 | B-108 | δ8 |
| 1719 | B-109 | δ8 |
| 1720 | B-110 | δ8 |
| 1721 | B-111 | δ8 |
| 1722 | B-112 | δ8 |
| 1723 | B-113 | δ8 |
| 1724 | B-114 | δ8 |
| 1725 | B-115 | δ8 |
| 1726 | B-116 | δ8 |
| 1727 | B-117 | δ8 |
| 1728 | B-118 | δ8 |
| 1729 | B-119 | δ8 |
| 1730 | B-120 | δ8 |
| 1731 | B-121 | δ8 |
| 1732 | B-122 | δ8 |
| 1733 | B-123 | δ8 |
| 1734 | B-124 | δ8 |
| 1735 | B-125 | δ8 |
| 1736 | B-126 | δ8 |
| 1737 | B-127 | δ8 |
| 1738 | B-128 | δ8 |
| 1739 | B-129 | δ8 |
| 1740 | B-130 | δ8 |
| 1741 | B-131 | δ8 |
| 1742 | B-132 | δ8 |
| 1743 | B-133 | δ8 |
| 1744 | B-134 | δ8 |
| 1745 | B-135 | δ8 |
| 1746 | B-136 | δ8 |
| 1747 | B-137 | δ8 |
| 1748 | B-138 | δ8 |
| 1749 | B-139 | δ8 |
| 1750 | B-140 | δ8 |
| 1751 | B-141 | δ8 |
| 1752 | B-142 | δ8 |
| 1753 | B-143 | δ8 |
| 1754 | B-144 | δ8 |
| 1755 | B-145 | δ8 |
| 1756 | B-146 | δ8 |
| 1757 | B-147 | δ8 |
| 1758 | B-148 | δ8 |
| 1759 | B-149 | δ8 |
| 1760 | B-150 | δ8 |
| 1761 | B-151 | δ8 |
| 1762 | B-152 | δ8 |
| 1763 | B-153 | δ8 |
| 1764 | B-154 | δ8 |
| 1765 | B-155 | δ8 |
| 1766 | B-156 | δ8 |
| 1767 | B-157 | δ8 |
| 1768 | B-158 | δ8 |
| 1769 | B-159 | δ8 |
| 1770 | B-160 | δ8 |
| 1771 | B-161 | δ8 |
| 1772 | B-162 | δ8 |
| 1773 | B-163 | δ8 |
| 1774 | B-164 | δ8 |
| 1775 | B-165 | δ8 |
| 1776 | B-166 | δ8 |
| 1777 | B-167 | δ8 |
| 1778 | B-168 | δ8 |
| 1779 | B-169 | δ8 |
| 1780 | B-170 | δ8 |
| 1781 | B-171 | δ8 |
| 1782 | B-172 | δ8 |
| 1783 | B-173 | δ8 |
| 1784 | B-174 | δ8 |
| 1785 | B-175 | δ6 |
| 1786 | B-176 | δ8 |
| 1787 | B-177 | δ8 |
| 1788 | B-178 | δ8 |
| 1789 | B-179 | δ8 |
| 1790 | B-180 | δ8 |
| 1791 | B-181 | δ8 |
| 1792 | B-182 | δ8 |
| 1793 | B-183 | δ8 |
| 1794 | B-184 | δ8 |
| 1795 | B-185 | δ8 |
| 1796 | B-186 | δ8 |
| 1797 | B-187 | δ8 |
| 1798 | B-188 | δ8 |
| 1799 | B-189 | δ8 |
| 1800 | B-190 | δ8 |

TABLE 17

| NO. | Bridging moiety | Fluorenyl moiety |
|---|---|---|
| 1801 | B-191 | δ8 |
| 1802 | B-192 | δ8 |
| 1803 | B-193 | δ8 |
| 1804 | B-194 | δ8 |
| 1805 | B-195 | δ8 |
| 1806 | B-196 | δ8 |
| 1807 | B-197 | δ8 |
| 1808 | B-198 | δ8 |
| 1809 | B-199 | δ8 |
| 1810 | B-200 | δ8 |
| 1811 | B-201 | δ8 |
| 1812 | B-202 | δ8 |
| 1813 | B-203 | δ8 |
| 1814 | B-204 | δ8 |
| 1815 | B-205 | δ8 |
| 1816 | B-206 | δ8 |
| 1817 | B-207 | δ8 |
| 1818 | B-208 | δ8 |
| 1819 | B-209 | δ8 |
| 1820 | B-210 | δ8 |
| 1821 | B-211 | δ8 |
| 1822 | B-212 | δ8 |
| 1823 | B-213 | δ8 |
| 1824 | B-214 | δ8 |
| 1825 | B-215 | δ8 |
| 1826 | B-216 | δ8 |
| 1827 | B-217 | δ8 |
| 1828 | B-218 | δ8 |
| 1829 | B-219 | δ8 |
| 1830 | B-220 | δ8 |
| 1831 | B-221 | δ8 |
| 1832 | B-222 | δ8 |
| 1833 | B-223 | δ8 |
| 1834 | B-224 | δ8 |
| 1835 | B-225 | δ8 |
| 1836 | B-226 | δ8 |
| 1837 | B-227 | δ8 |
| 1838 | B-228 | δ8 |
| 1839 | B-229 | δ8 |
| 1840 | B-230 | δ8 |

According to these tables, the ligand structure of No. 944 indicates a combination of B-24 and δ5; in the case where the metal part $MQ_j$ is $ZrCl_2$, this structure gives the following example of the metallocene compound.

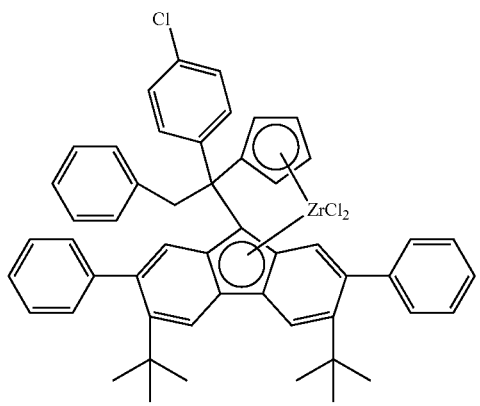

Specific examples of $MQ_j$ include $ZrCl_2$, $ZrBr_2$, $ZrMe_2$, $Zr(OTs)_2$, $Zr(OMs)_2$, $Zr(OTf)_2$, $TiCl_2$, $TiBr_2$, $TiMe_2$, $Ti(OTs)_2$, $Ti(OMs)_2$, $Ti(OTf)_2$, $HfCl_2$, $HfBr_2$, $HfMe_2$, $Hf(OTs)_2$, $Hf(OMs)_2$, and $Hf(OTf)_2$. Ts represents a p-toluenesulfonyl group, Ms represents a methanesulfonyl group, and Tf represents a trifluoromethanesulfonyl group.

The bridged metallocene compound (A) represented by Formula [1] used in the present invention can be produced by known techniques, and the production technique is not particularly limited. Examples of the known production techniques include techniques disclosed in WO 2001/027124 and WO2004/087775 which are the publications of applications made by the applicant.

<<Compound (B)>>

In the present invention, the compound (B) is used as a component of the catalyst for olefin polymerization. The compound (B) is at least one selected from (b-1) the organoaluminum oxy-compound, (b-2) the compound which reacts with the bridged metallocene compound (A) to form an ion pair, and (b-3) the organoaluminum compound. Among these, the organoaluminum oxy-compound (b-1) is preferred.

<Organoaluminum Oxy-Compound (b-1)>

Examples of the organoaluminum oxy-compound (b-1) include known aluminoxanes such as a compound represented by Formula [3] and a compound represented by Formula [4], modified methylaluminoxane having a structure represented by Formula [5], and a boron-containing organoaluminum oxy-compound represented by Formula [6].

In Formulae [3] and [4], each R represents a hydrocarbon group having 1 to 10 carbon atoms, and preferably a methyl group; and each n is an integer of 2 or more, preferably 3 or more, and more preferably 10 or more. In the present invention, methylaluminoxane in which each R in Formulae [3] and [4] represents a methyl group is suitably employed.

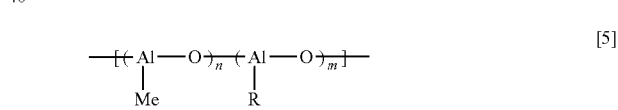

In Formula [5], R represents a hydrocarbon group having 2 to 10 carbon atoms, and m and n each independently represent an integer of 2 or more. Multiple Rs may be the same as or different from each other.

The modified methylaluminoxane [5] can be prepared from trimethylaluminum and alkylaluminium other than trimethylaluminum. Such modified methylaluminoxane [5] is generally called MMAO (modified methylaluminoxane). In particular, MMAO can be prepared by techniques disclosed in U.S. Pat. Nos. 4,960,878 and 5,041,584.

Modified methylaluminoxane prepared from trimethylaluminum and triisobutylaluminum (in particular, R in Formula [5] is an isobutyl group) is commercially available from, for example, Tosoh Finechem Corporation under the product names of MMAO and TMAO.

MMAO is an aluminoxane of which the solubility in a variety of solvents and storage stability have been enhanced. In particular, unlike to compounds insoluble or less soluble in benzene, such as the compounds represented by Formulae [3] and [4], MMAO is soluble in aliphatic hydrocarbons, alicyclic hydrocarbons, and aromatic hydrocarbons.

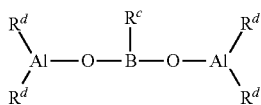

[6]

In Formula [6], $R^c$ represents a hydrocarbon group having 1 to 10 carbon atoms. Multiple $R^d$s each independently represent a group selected from a hydrogen atom, halogen atoms, and hydrocarbon groups having 1 to 10 carbon atoms.

In the present invention, an olefin polymer can be produced even at high temperature which will be described later. Hence, in the present invention, even an organoaluminum oxy-compound which is insoluble in benzene, such as disclosed in JPA 1990-78687, can be used. Furthermore, the organoaluminum oxy-compound disclosed in JPA 1990-167305 and the aluminoxane which has two or more alkyl groups and which is disclosed in JPA 1990-24701 and JPA 1991-103407 can be suitably used.

The organoaluminum oxy-compound which is "insoluble in benzene" refers to an organoaluminum oxy-compound which is insoluble or less soluble in benzene; in particular, the amount of dissolution of such a compound in benzene at 60° C. is normally not more than 10 weight %, preferably not more than 5 weight %, and especially preferably not more than 2 weight % on an Al atom basis.

In the present invention, one type of the examples of organoaluminum oxy-compound (b-1) may be used alone or at least two types may be used in combination.

<Compound Which Reacts with Bridged Metallocene Compound (A) to Form Ion Pair (b-2)>

Examples of the compound which reacts with the bridged metallocene compound (A) to form an ion pair (b-2) (hereinafter also referred tows "ionic compound (b-2)") include Lewis acids, ionic compounds, borane compounds, and carborane compounds disclosed in JPA 1989-501950, 1989-502036, 1991-179005, 1991-179006, 1991-207703, 1991-207704, and 2004-51676 and U.S. Pat. No. 5,321,106. Examples thereof further include heteropoly compounds and isopoly compounds. In particular, a compound represented by Formula [7] is preferably employed as the ionic compound (b-2).

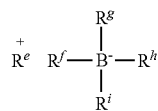

[7]

In Formula [7], examples of $R^{e+}$ include $H^+$, oxonium cations, carbenium cations, ammonium cations, phosphonium cations, cycloheptyltrienyl cations, and ferrocenium cations containing a transition metal. $R^f$, $R^g$, $R^h$, and $R^i$ each independently represent a group selected from organic groups, and preferably aryl groups and halogen-containing aryl groups.

Examples of the carbenium cations include tri-substituted carbenium cations such as triphenylcarbenium cation, tris(methylphenyl)carbenium cation, and tris(dimethylphenyl) carbenium cation.

Examples of the ammonium cations include trialkylammonium cations such as trimethylammonium cation, triethylammonium cation, tri(n-propyl)ammonium cation, triisopropylammonium cation, tri(n-butyl)ammonium cation, and triisobutylammonium cation; N,N-dialkylanilinium cations such as N,N-dimethylanilinium cation, N,N-diethylanilinium cation, and N,N,2,4,6-pentamethylanilinium cation; and dialkylammonium cations such as diisopropylammonium cation and dicyclohexylammonium cation.

Examples of the phosphonium cations include triarylphosphonium cations such as triphenylphosphonium cation, tris(methylphenyl)phosphonium cation, and tris(dimethylphenyl)phosphonium cation.

Among these examples, $R^{e+}$ is preferably a carbenium cation or an ammonium cation; especially preferably triphenylcarbenium cation, N,N-dimethylanilinium cation, or N,N-diethylanilinium cation.

1. $R^{e+}$ Being Carbenium Cation (Carbenium Salt)

Examples of the carbenium salts include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate, and tris(3,5-dimethylphenyl)carbenium tetrakis(pentafluorophenyl)borate.

2. $R^{e+}$ Being Ammonium Cation (Ammonium Salt)

Examples of the ammonium salts include trialkyl ammonium salts, N,N-dialkylanilinium salts, and dialkylammonium salts.

Specific examples of the trialkyl ammonium salts include triethylammonium tetraphenylborate, tripropylammonium tetraphenylborate, tri(n-butyl)ammonium tetraphenylborate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, and dioctadecylmethylammonium tetrakis(3,5-ditrifluoromethylphenyl)borate.

Specific examples of the N,N-dialkylanilinium salts include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, and N,N-2,4,6-pentamethylanilinium tetrakis(pentafluorophenyl)borate.

Specific examples of the dialkylammonium salts include diisopropylammonium tetrakis(pentafluorophenyl)borate and dicyclohexylammonium tetraphenylborate.

One type of the ionic compound (b-2) may be used alone or at least two types may be used in combination.

<Organoaluminum Compound (b-3)>

Examples of the organoaluminum compound (b-3) include an organoaluminum compound represented by Formula [8]

and an alkyl complex which is composed of a Group 1 metal on the periodic table and aluminum and which is represented by Formula [9].

  [8]

In Formula [8], $R^a$ and $R^b$ each independently represent a group selected from hydrocarbon groups having 1 to 15 carbon atoms, and preferably 1 to 4 carbon atoms; X represents a halogen atom; m, n, p, and q are values that satisfy the relationship of m+n+p+q=3 and that satisfy the following relationships, respectively: 0<m≤3, 0≤n<3, 0≤p<3, and 0≤q<3.

  [9]

In Formula [9], $M^2$ represents Li, Na, or K; and multiple $R^a$s each independently represent a group selected from hydrocarbon groups having 1 to 15 carbon atoms, preferably 1 to 4 carbon atoms.

Examples of the organoaluminum compound [8] include tri(n-alkyl)aluminums such as trimethylaluminum, triethylaluminum, tri(n-butyl)aluminum, trihexylaluminum, and trioctylaluminum;

branched-chain trialkylaluminums such as triisopropylaluminum, triisobutylaluminum, tri(sec-butyl)aluminum, tri(tert-butyl)aluminum, tri(2-methylbutyl)aluminum, tri(3-methylhexyl)aluminum, and tri(2-ethylhexyl)aluminum;

tricycloalkylaluminums such as tricyclohexylaluminum and tricyclooctylaluminum; triarylaluminums such as triphenylaluminum and tritolylaluminum;

dialkylaluminum hydrides such as diisopropylaluminum hydride and diisobutylaluminum hydride;

alkenylaluminums such as isoprenylaluminum represented by, for example, the general formula $(i-C_4H_9)_xAl_y(C_5H_{10})_z$ (where x, y and z are each a positive number, and z satisfies the relationship of z ≤2x);

alkylaluminum alkoxides such as isobutylaluminum methoxide and isobutylaluminum ethoxide; dialkylaluminum alkoxides such as dimethylaluminum methoxide, diethylaluminum ethoxide, and dibutylaluminum butoxide; alkylaluminum sesquialkoxides such as ethylaluminum sesquiethoxide and butylaluminum sesquibutoxide;

partially alkoxylated alkylaluminum having an average composition represented by the general formula $R^a_{2.5}Al(OR^b)_{0.5}$ (where $R^a$ and $R^b$ each represent the same group as specified for $R^a$ and $R^b$ in Formula [8]); alkylaluminum aryloxides such as diethylaluminum phenoxide and diethylaluminum(2,6-di-t-butyl-4-methylphenoxide); dialkylaluminum halides such as dimethylaluminum chloride, diethylaluminum chloride, dibutylaluminum chloride, diethylaluminum bromide, and diisobutylaluminum chloride; alkylaluminum sesquihalides such as ethylaluminum sesquichloride, butylaluminum sesquichloride, and ethylaluminum sesquibromide;

partially halogenated alkylaluminums such as alkylaluminum dihalides including, e.g., ethylaluminum dichloride; partially hydrogenated alkylaluminums such as dialkylaluminum hydrides including, e.g., diethylaluminum hydride and dibutylaluminum hydride, and alkylaluminum dihydrides including, e.g., ethylaluminum dihydride and propylaluminum dihydride; and partially alkoxylated and halogenated alkylaluminums such as ethylaluminum ethoxychloride, butylaluminum butoxychloride, and ethylaluminum ethoxybromide.

Examples of the alkyl complex [9] include $LiAl(C_2H_5)_4$ and $LiAl(C_7H_{15})_4$. Compounds analogous to the alkyl complex [9] also can be employed, and an example thereof is an organoaluminum compound in which two or more aluminum compounds are bonded to each other via a nitrogen atom. An example of such a compound is $(C_2H_5)_2AlN(C_2H_5)Al(C_2H_5)_2$.

In terms of availability, the organoaluminum compound (b-3) is preferably trimethylaluminum or triisobutylaluminum. One type of the organoaluminum compound (b-3) may be used alone or at least two types may be used in combination.

<<Support (C)>>

In the present invention, the support (C) may be used as a component of the catalyst for olefin polymerization. The support (C) is an inorganic compound or an organic compound and is a granular or particulate solid.

<Inorganic Compound>

Examples of the inorganic compounds include porous oxides, inorganic halides, clay minerals, clays (generally primarily composed of clay minerals), and ion-exchange layered compounds (most of the clay minerals are ion-exchange layered compounds).

Examples of the porous oxides include $SiO_2$, $Al_2O_3$, MgO, ZrO, $TiO_2$, $B_2O_3$, CaO, ZnO, BaO, $ThO_2$, and composites or mixtures containing these oxides. Examples of such composites or mixtures include natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO. In particular, porous oxides primarily containing either or both of $SiO_2$ and $Al_2O_3$ are preferred.

Although the characteristics of such porous oxides vary depending on the types and production processes thereof, the porous oxides preferably have the following characteristics: a particle size that is preferably in the range of 10 to 300 μm, and more preferably 20 to 200 μm; a specific surface area that is preferably in the range of 50 to 1000 $m^2/g$, and more preferably 100 to 700 $m^2/g$; and a pore volume that is preferably in the range of 0.3 to 3.0 $cm^3/g$. Such porous oxides are optionally preliminarily burned at, for example, 100 to 1000° C., and preferably 150 to 700° C.

Examples of the inorganic halides include $MgCl_2$, $MgBr_2$, $MnCl_2$, and $MnBr_2$. The inorganic halides may be used without being preliminarily processed or may be used after being ground with, for example, a ball mill or a vibration mill. The inorganic halides may be dissolved in a solvent, such as alcohol, and precipitated into fine particles with a precipitating agent, and the fine particles of the inorganic halides may be used.

The clays, the clay minerals, and the ion-exchange layered compounds are not limited to natural products, and synthetic products also can be used. The ion-exchange layered compounds have crystal structures in which planes formed by, for example, ionic bonding are stacked each other in parallel with weak bonding strength and contain exchangeable ions.

Specific examples of the clays and the clay minerals include kaolin, bentonite, kibushi clay, gairome clay, allophane, hisingerite, pyrophyllite, mica such as synthetic mica, montmorillonite, vermiculite, chlorite, palygorskite, kaolinite, nacrite, dickite, hectorite, taeniolite, and halloysite. Examples of the ion-exchange layered compounds include ionic crystalline compounds having layered crystal structures such as a hexagonal closest packing structure, an antimony structure, a $CdCl_2$ structure, and a $CdI_2$ structure. Specific examples of the ion-exchange layered compounds include crystalline acidic salts of polyvalent metals, such as α-Zr$(HAsO_4)_2 \cdot H_2O$, α-Zr$(HPO_4)_2$, α-Zr$(KPO_4)_2 \cdot 3H_2O$, α-Ti$(HPO_4)_2$, α-Ti$(HAsO_4)_2 \cdot H_2O$, α-Sn$(HPO_4)_2 \cdot H_2O$, γ-Zr$(HPO_4)_2$, γ-Ti$(HPO_4)_2$, and γ-Ti$(NH_4PO_4)_2 \cdot H_2O$.

It is preferred that the clays and the clay minerals be subjected to chemical treatments. The chemical treatments can be, for example, a surface treatment for removing impurities adhering onto the surfaces and a treatment for affecting the crystal structures of the clays, and either chemical treatment can be employed. Specific examples of such chemical treatments include an acid treatment, an alkali treatment, a salt treatment, and a treatment with an organic substance.

The ion-exchange properties of the ion-exchange layered compounds are utilized to exchange exchangeable ions between layers with other larger and bulkier ions, and the resulting layered compounds having an enlarged interlayer distance can be employed. Such bulky ions serve as a column supporting the layered structure and are generally called pillars. For example, the following metal hydroxide ions are intercalated between the layers of a layered compound, and then the resulting layered compound is heated and dehydrated to form oxide columns (pillars) between the layers. Such introduction of another substance between the layers of layered compound is called intercalation.

Examples of the guest compounds to be intercalated include cationic inorganic compounds such as $TiCl_4$ and $ZrCl_4$; metal alkoxides such as $Ti(OR)_4$, $Zr(OR)_4$, $PO(OR)_3$, and $B(OR)_3$ (R is, for instance, a hydrocarbon group); and metal hydroxide ions such as $[Al_{13}O_4(OH)_{24}]^{7+}$, $[Zr_4(OH)_{14}]^{2+}$, and $[Fe_3O(OCOCH_3)_6]^+$. One type of these guest compounds may be used alone or at least two types may be used in combination.

In the intercalation of these guest compounds, for instance, polymers obtained by hydrolysis and polycondensation of metal alkoxides such as $Si(OR)_4$, $Al(OR)_3$, and $Ge(OR)_4$ (R is, for example, a hydrocarbon group) or colloidal inorganic compounds such as $SiO_2$ may be also present.

Among the inorganic compounds, mineral clays and clays are preferred; in particular, montmorillonite, vermiculite, hectorite, taeniolite, and synthetic mica are preferred.

<Organic Compound>

Examples of the organic compounds include granular or particulate solids having a particle size ranging from 10 to 300 μm. Specific examples thereof include (co)polymers synthesized primarily from olefins having 2 to 14 carbon atoms, such as ethylene, propylene, 1-butene, and 4-methyl-1-pentene; (co)polymers synthesized primarily from vinylcyclohexane and styrene; and modifications of these (co)polymers.

<<Organic Compound Component (D)>>

In the present invention, an organic compound component (D) may be used as a component of the catalyst for olefin polymerization. The organic compound component (D) is optionally used to improve polymerization performance in a polymerization reaction of an olefin and the physical properties of an olefin polymer. Examples of the organic compound component (D) include alcohols, phenolic compounds, carboxylic acids, phosphorus compounds, and sulfonates.

<<Composition and Preparation of Catalyst for Olefin Polymerization>>

The preferred amounts of the individual components of the catalyst for olefin polymerization are as follows.

<1> In polymerization of an olefin with the aid of the catalyst for olefin polymerization, the amount of the bridged metallocene compound (A) is normally in the range of $10^{-9}$ to $10^{-1}$ mol, and preferably $10^{-8}$ to $10^{-2}$ mol per litter of the reaction volume.

<2> In the case where the organoaluminum oxy-compound (b-1) is used as a component of the catalyst for olefin polymerization, the compound (b-1) is used in such an amount that enables the molar ratio [Al/M] of the aluminum atoms (Al) contained in the compound (b-1) to all of the transition metal atoms (M) contained in the bridged metallocene compound (A) to be normally in the range of 0.01 to 5000, and preferably 0.05 to 2000.

<3> In the case where the ionic compound (b-2) is used as a component of the catalyst for olefin polymerization, the compound (b-2) is used in such an amount that enables the molar ratio [(b-2)/M] of the compound (b-2) to all of the transition metal atoms (M) contained in the bridged metallocene compound (A) to be normally in the range of 1 to 10, and preferably 1 to 5.

<4> In the case where the organoaluminum compound (b-3) is used as a component of the catalyst for olefin polymerization, the compound (b-3) is used in such an amount that enables the molar ratio [(b-3)/M] of the compound (b-3) to all of the transition metal atoms (M) contained in the bridged metallocene compound (A) to be normally in the range of 10 to 5000, and preferably 20 to 2000.

<5> In the case where the organic compound component (D) is used as a component of the catalyst for olefin polymerization, the amount thereof is as follows: when the compound (B) is the organoaluminum oxy-compound (b-1), the organic compound component (D) is used in such an amount that enables the molar ratio [(D)/(b-1)] of the organic compound component (D) to the compound (b-1) to be normally in the range of 0.01 to 10, and preferably 0.1 to 5; when the compound (B) is the ionic compound (b-2), the organic compound component (D) is used in such an amount that enables the molar ratio [(D)/(b-2)] of the organic compound component (D) to the compound (b-2) to be normally in the range of 0.01 to 10, and preferably 0.1 to 5; and when the compound (B) is the organoaluminum compound (b-3), the organic compound component (D) is used in such an amount that enables the molar ratio [(D)/(b-3)] of the organic compound component (D) to the compound (b-3) to be normally in the range of 0.005 to 2, and preferably 0.01 to 1.

In the catalyst for olefin polymerization according to the present invention, the bridged metallocene compound (A) and compound (B), which are components of the catalyst, can be dissolved in a solvent. In other words, in the present invention, the catalyst for olefin polymerization can be supplied to a polymerization system in the form of a catalyst solution.

The usable solvent can be normally a hydrocarbon solvent with 4 to 10 carbon atoms. In the present invention, a highly concentrated catalyst solution of the bridged metallocene compound (A) (solvent: hydrocarbon solvent) can be prepared as described above. In terms of polymerization activity, it is preferable to supply a catalyst solution in which the concentration of the bridged metallocene compound (A) is in the range of 0.03 mmol/L to 2.0 mol/L, to a polymerization system; the concentration being more preferably 0.04 mmol/L to 1.5 mol/L, and further preferably 0.05 mmol/L to 1.0 mol/L.

Examples of the hydrocarbon solvents with 4 to 10 carbon atoms, which can be used for preparation of the catalyst solution, include hydrocarbon solvents with four carbon atoms, such as butane, isobutane, cyclobutane, and methylcyclopropane;

hydrocarbon solvents with five carbon atoms, such as pentane, isopentane, neopentane, cyclopentane, methylcyclobutane, 1,1-dimethylcyclopropane, 1,2-dimethylcyclopropane, and ethylcyclopropane;

hydrocarbon solvents with six carbon atoms, such as hexane, 3-methylpentane, 2-methylpentane, 2,2-dimethylbutane, 2,3-dimethylbutane, cyclohexane, methylcyclopentane, 1,1-dimethylcyclobutane, 1,2-dimethylcyclobutane, 1,3-dimethylcyclobutane, ethylcyclobutane, 1,1,2-trimethylcyclopropane, 1-ethyl-1-methylcyclopropane, propylcyclopropane, and isopropylcyclopropane;

hydrocarbon solvents with seven carbon atoms, such as heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, methylcyclohexane, 1,2-dimethylpentane, 1,3-dimethylpentane, 1,2,3-trimethylbutane, cycloheptane, methylcyclohexane, 1,1-dimethylcyclopentane, 1,2-dimethylcyclopentane, 1,3-dimethylcyclopentane, ethylcyclopentane, propylcyclobutane, 1,1,2,2-tetramethylcyclopropane, 1,1,2,3-tetramethylcyclopropane, 1,1-diethylcyclopropane, 1-isopropyl-1-methylcyclopropane, 1-isopropyl-2-methylcyclopropane, 1-propyl-2-methylcyclopropane, and butylcyclopropane;

hydrocarbon solvents with eight carbon atoms, such as octane, 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane, 2-methyl-3-ethylpentane, cyclooctane, methylcycloheptane, 1,1-dimethylcyclohexane, 1,2-dimethylcyclohexane, 1,3-dimethylcyclohexane, 1,4-dimethylcyclohexane, ethylcyclohexane, 1,1,2-trimethylcyclopentane, 1,1,3-trimethylcyclopentane, 1,2,3-trimethylcyclopentane, 1,2,4-trimethylcyclopentane, 1-ethyl-1-methylcyclopentane, 1-ethyl-2-methylcyclopentane, 1-ethyl-3-methylcyclopentane, propylcyclopentane, isopropylcyclopentane, 1,2,3,4-tetramethylcyclobutane, 1,1,3,3-tetramethylcyclobutane, 2,2,3,3-tetramethylcyclobutane, 1,2-diethylcyclobutane, 1-butyl-2-methylcyclopropane, pentylcyclopropane, and isopentylcyclopropane;

hydrocarbon solvents with nine carbon atoms, such as nonane, 2-methyloctane, 3-methyloctane, 4-methyloctane, 2,2-dimethylheptane, 2,3-dimethylheptane, 2,4-dimethylheptane, 2,5-dimethylheptane, 2,6-dimethylheptane, 4,4-dimethylheptane, 2-ethylheptane, 3-ethylheptane, 4-ethylheptane, 2,2,3-trimethylhexane, 2,2,4-trimethylhexane, 2,2,5-trimethylhexane, 2,3,3-trimethylhexane, 2,3,4-trimethylhexane, 2,3,5-trimethylhexane, 2,4,4-trimethylhexane, 3,3,4-trimethylhexane, 3-ethyl-2-methylhexane, 3-ethyl-3-methylhexane, 4-ethyl-2-methylhexane, 4-ethyl-3-methylhexane, 2,2,3,3-tetramethylpentane, 2,2,3,4-tetramethylpentane, 2,2,4,4-tetramethylpentane, 2,3,3,4-tetramethylpentane, 2,2-dimethyl-3-ethylpentane, 2,2-diethylpentane, 2,3-diethylpentane, cyclononane, methylcyclooctane, ethylcycloheptane, 1,1-dimethylcycloheptane, 1,2-dimethylcycloheptane, 1,3-dimethylcycloheptane, 1,4-dimethylcycloheptane, propylcyclohexane, isopropylcyclohexane, 1-ethyl-2-methylcyclohexane, 1-ethyl-3-methylcyclohexane, 1-ethyl-4-methylcyclohexane, 1,1,2-trimethylcyclohexane, 1,1,3-trimethylcyclohexane, 1,1,4-trimethylcyclohexane, 1,2,3-trimethylcyclohexane, 1,2,4-trimethylcyclohexane, butylcyclopentane, isobutylcyclopentane, 2-cyclopentylbutane, 1,2-diethylcyclopentane, 1-isopropyl-3-methylcyclopentane, 1-methyl-2-propylcyclopentane, 2-ethyl-1,1-dimethylcyclopentane, 1,1,3,3-tetramethylcyclopentane, 1,1,3,4-tetramethylcyclopentane, 1,2,3,4-tetramethylcyclopentane, 1,1,2,3,3-pentamethylcyclobutane, 1,2-dipropylcyclopropane, 1-hexylcyclopropane, 1-pentyl-1-methylcyclopropane, and 1-pentyl-2-methylcyclopropane; and hydrocarbon solvents with ten carbon atoms, such as decane, 2-methylnonane, 3-methylnonane, 4-methylnonane, 5-methylnonane, 2,2-dimethyloctane, 2,3-dimethyloctane, 2,4-dimethyloctane, 2,5-dimethyloctane, 2,6-dimethyloctane, 2,7-dimethyloctane, 3,3-dimethyloctane, 3,4-dimethyloctane, 3,5-dimethyloctane, 3,6-dimethyloctane, 4,4-dimethyloctane, 4,5-dimethyloctane, 3-ethyloctane, 4-ethyloctane, 2,2,3-trimethylheptane, 2,2,4-trimethylheptane, 2,2,5-trimethylheptane, 2,2,5-trimethylheptane, 2,2,6-trimethylheptane, 2,3,3-trimethylheptane, 2,3,4-trimethylheptane, 2,3,5-trimethylheptane, 2,3,6-trimethylheptane, 2,4,4-trimethylheptane, 2,4,5-trimethylheptane, 2,4,6-trimethylheptane, 2,5,5-trimethylheptane, 2-methyl-3-ethylheptane, 2-methyl-4-ethylheptane, 3-ethyl-3-methylheptane, 3-ethyl-4-methylheptane, 3-ethyl-5-methylheptane, 3-methyl-4-ethylheptane, 5-ethyl-2-methylheptane, 3,3,4-trimethylheptane, 3,3,5-trimethylheptane, 3,4,4-trimethylheptane, 3,4,5-trimethylheptane, 4-propylheptane, 4-isopropylheptane, 2,2,3,3-tetramethylhexane, 2,2,3,4-tetramethylhexane, 2,2,3,5-tetramethylhexane, 2,2,4,4-tetramethylhexane, 2,2,4,5-tetramethylhexane, 2,2,5,5-tetramethylhexane, 2,3,3,4-tetramethylhexane, 2,3,3,5-tetramethylhexane, 2,3,4,4-tetramethylhexane, 2,3,4,5-tetramethylhexane, 3,3,4,4-tetramethylhexane, 2,2-dimethyl-3-ethylhexane, 2,3-dimethyl-3-ethylhexane, 2,3-dimethyl-4-ethylhexane, 2,4-dimethyl-4-ethylhexane, 2,5-dimethyl-3-ethylhexane, 3,3-dimethyl-4-ethylhexane, 3,4-dimethyl-3-ethylhexane, 3-ethyl-2,4-dimethylhexane, 4-ethyl-2,2-dimethylhexane, 3,3-diethylhexane, 3,4-diethylhexane, 2,2,3,3,4-pentamethylpentane, 2,2,3,4,4-pentamethylpentane, 2,2,3-trimethyl-3-ethylpentane, 2,2,4-trimethyl-3-ethylpentane, 2,3,4-trimethyl-3-ethylpentane, 2,4-dimethyl-3-isopropylpentane, 2-methyl-3-3-diethylpentane, 4-ethyl-4-methylpentane, cyclodecane, methylcyclononane, 1,5-dimethylcyclooctane, ethylcyclooctane, cycloheptane, 1,1,2,3-tetramethylcyclohexane, 1,1,3,3-tetramethylcyclohexane, 1,1,3,5-tetramethylcyclohexane, 1,1,4,4-tetramethylcyclohexane, 1,2,2,4-tetramethylcyclohexane, 1,2,3,4-tetramethylcyclohexane, 1,2,3,5-tetramethylcyclohexane, 1,2,4,5-tetramethylcyclohexane, butylcyclohexane, 1,3-diethylcyclohexane, 1,4-diethylcyclohexane, 1-ethyl-2-propylcyclohexane, 1,3-dimethyl-5-ethylcyclohexane, 1-ethyl-2,3-dimethylcyclohexane, 1-ethyl-2,4-dimethylcyclohexane, 1-isopropyl-1-methylcyclohexane, 1-isopropyl-2-methylcyclohexane, 1-isopropyl-3-methylcyclohexane, 1-isopropyl-4-methylcyclohexane, 1-methyl-2-propylcyclohexane, 1-methyl-3-propylcyclohexane, 2-ethyl-1,3-dimethylcyclohexane, sec-butylcyclohexane, tert-butylcyclohexane, isobutylcyclohexane, 1,2,3,4,5-pentamethylcyclopentane, 1,2,3-trimethyl-4-ethylcyclopentane, 1,2-dimethyl-3-isopropylcyclopentane, 1-ethyl-3-isopropylcyclopentane, 1-methyl-2,4-diethylcyclopentane, 1-methyl-2-butylcyclopentane, 1-methyl-3-tert-butylcyclopentane, 1-methyl-3-isobutylcyclopentane, 2-isopropyl-1,3-dimethylcyclopentane, 2-cyclopentylpentane, 2-methylbutylcyclopentane, isopentylcyclopentane, pentylcyclopentane, 2-ethyl-1-methyl-3-propylcyclobutane, 1,1,2-trimethyl-3-isobutylcyclopropane, 1,1-dimethyl-2-pentylcyclopropane, 1,2-dimethyl-1-pentylcyclopropane, 1,2-dimethyl-3-pentylcyclopropane, 1-ethyl-2-pentylcyclopropane, 1-hexyl-2-methylcyclopropane, 1-methyl-2-(1-methylpentyl)cyclopropane, and 1-methyl-2-(3-methylpentyl)cyclopropane.

Among the hydrocarbon solvents with 4 to 10 carbon atoms, hydrocarbon solvents with 5 to 8 carbon atoms are preferred from an industrial point of view. Furthermore, a mixture of these hydrocarbon solvents is also preferably used to prepare the catalyst solution for the sake of convenience in industrial applications.

[Olefin]

In the method for producing an olefin polymer according to the present invention, an olefin having two or more carbon atoms is used as a material of the olefin polymer. One type of the olefin may be used alone or at least two types may be used in combination.

The olefin is an olefin having two or more carbon atoms, preferably 3 to 20 carbon atoms, more preferably 3 to 10 carbon atoms. The olefin is preferably an α-olefin, and more preferably a linear or branched α-olefin.

Examples of such an olefin include ethylene, propylene, 1-butene, 2-butene, 1-pentene, 3-methyl-l-butene, 1-hexene, 4-methyl-l-pentene, 3-methyl-l-pentene, 1-octene, 1-decene, 1-dodecene, 1-tetradecene, 1-hexadecene, 1-octadecene, and 1-eicosene. Among these, propylene is especially preferred.

In addition to the olefins, the following substances can be used as a material of the olefin polymer in the present invention:

cycloolefins having 3 to 30 carbon atoms, and preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene;

polar monomers such as α,β-unsaturated carboxylic acids, e.g., acrylic acid, methacrylic acid, fumaric acid, maleic anhydride, itaconic acid, itaconic anhydride, and bicyclo(2,2,1)-5-heptene-2,3-dicarboxylic anhydride; metallic salts of these α,β-unsaturated carboxylic acids, such as sodium salts, potassium salts, lithium salts, zinc salts, magnesium salts, and calcium salts thereof; α,β-unsaturated carboxylic esters such as methyl acrylate, n-butyl acrylate, n-propyl acrylate, isopropyl acrylate, n-butyl acrylate, isobutyl acrylate, tert-butyl acrylate, 2-n-butylhexyl acrylate, methyl methacrylate, n-butyl methacrylate, n-propyl methacrylate, isopropyl methacrylate, n-butyl methacrylate, and isobutyl methacrylate; vinyl esters such as vinyl acetate, vinyl propionate, vinyl caproate, vinyl caprate, vinyl laurate, vinyl stearate, and vinyl trifluoroacetate; and unsaturated glycidyl esters such as glycidyl acrylate, glycidyl methacrylate, and monoglycidyl itaconate.

Furthermore, the polymerization can be carried out in the presence of the following substances in a reaction system: vinylcyclohexane, diene, and polyene; aromatic vinyl compounds, e.g., mono or polyalkylstyrenes such as styrene, o-methylstyrene, m-methylstyrene, p-methylstyrene, o,p-dimethylstyrene, o-n-butylstyrene, m-n-butylstyrene, and p-n-butylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene, and divinylbenzene; and 3-phenylpropylene, 4-phenylpropylene, and α-methylstyrene.

In a preferred embodiment of the present invention, at least propylene is used as the olefin. The amount of propylene is, for instance, preferably in the range of 60 to 100 mol %, and more preferably 70 to 100 mol % relative to 100 mol % of the olefin. In a produced polymer, the propylene-derived constitutional unit content measured by $^{13}$C-NMR spectroscopy is preferably in the range of 60 to 100 mol %, and more preferably 70 to 100 mol %.

[Conditions for Producing Olefin Polymer]

In the method for producing an olefin polymer according to the present invention, the polymerization temperature is not particularly limited and normally from −100 to 250° C., preferably 40 to 200° C., more preferably 45 to 150° C., and especially preferably 50 to 150° C. (in other words, a temperature proper in an industrial production process is especially preferred). The polymerization pressure is normally from normal pressure to 10 MPa-G (gauge pressure), and preferably from normal pressure to 5 MPa-G. In the case where at least propylene is used as the olefin, the polymerization temperature is preferably not less than 50° C., and especially preferably from 60 to 150° C. in terms of the productivity.

The polymerization reaction may be batch, semi-continuous, or continuous polymerization. Moreover, the polymerization may be carried out in two or more stages in which the reaction conditions are different from each other.

The melting point of the olefin polymer can be adjusted by changing the polymerization temperature. The molecular weight of the olefin polymer can be adjusted by allowing hydrogen to be present in a polymerization system or by changing the polymerization temperature. In addition, the molecular weight of the olefin polymer can be adjusted also by changing the amount of the compound (B) used as a component of the catalyst for olefin polymerization. In the case where hydrogen is added, the amount thereof is appropriately in the range of approximately 0.001 to 100 NL per kilogram of an olefin.

In the method for producing an olefin polymer according to the present invention, components contained in the catalyst for olefin polymerization, such as the bridged metallocene compound (A) and the compound (B), are used in an arbitrary manner and order in the polymerization, and examples of the method are as follows:

(1) a method in which the bridged metallocene compound (A) and the compound (B) are put into a polymerization vessel in any order, (2) a method in which the compound (B) and a catalyst component in which the bridged metallocene compound (A) has been supported on the support (C) are put into a polymerization vessel in any order, (3) a method in which the bridged metallocene compound (A) and a catalyst component in which the compound (B) has been supported on the support (C) are put into a polymerization vessel in any order, and (4) a method in which a catalyst component in which the bridge metallocene compound (A) and the compound (B) have been supported on the support (C) is put into a polymerization vessel.

In each of the methods (1) to (4), the catalyst components can be preliminarily dissolved in a solvent. Normally usable solvents are the above-mentioned hydrocarbon solvents with 4 to 10 carbon atoms. In the present invention, as described above, a highly concentrated catalyst solution (solvent: hydrocarbon solvent) of the bridged metallocene compound (A) can be prepared. In terms of polymerization activity, it is preferable to supply a catalyst solution in which the concentration of the bridged metallocene compound (A) is in the range of 0.03 mmol/L to 2.0 mol/L, to a polymerization system; the concentration being more preferably 0.04 mmol/L to 1.5 mol/L, and further preferably 0.05 mmol/L to 1.0 mol/L.

In the case where a highly concentrated catalyst solution of the bridged metallocene compound (A) is used, high polymerization activity is exhibited even if time from the preparation of the catalyst solution to the supply thereof to a polymerization system (hereinafter also referred to as "holding time") is long. This is because effects of poisoning and deactivation brought about by the solvent are small in the case where the catalyst solution is highly concentrated. The holding time can be, for example, normally 120 hours or less, and preferably 36 hours or less.

In the case where a catalyst solution in which the concentration of the bridged metallocene compound (A) is less than 0.03 mmol/L is supplied to a polymerization system, the holding time is preferably 24 hours or less, and more preferably 12 hours or less to reduce poisoning and deactivation by the solvent.

In the methods (1) to (3), when the bridged metallocene compound (A) is dissolved in a solvent or when a catalyst component in which the bridged metallocene compound (A) has been supported on the support (C) is dissolved in a solvent, it is preferred that the compound (B) be not simultaneously dissolved.

In each of the methods (1) to (4), at least two of the catalyst components may be preliminarily brought into contact with each other. In each of the methods (3) and (4) in which a compound (B) has been supported on the support (C), another unsupported compound (B) may be optionally put into a polymerization vessel in any order. In this case, the compound (B) supported on the support (C) and the unsupported compound (B) may be the same as or different from each other.

On a solid catalyst component in which the bridged metallocene compound (A) has been supported on the support (C) or a solid catalyst component in which both the bridged metallocene compound (A) and the compound (B) have been supported on the support (C), an olefin may be preliminarily polymerized, and another catalyst component may be supported on the solid catalyst component subjected to preliminary polymerization.

In the method for producing an olefin polymer according to the present invention, homopolymerization of one of the olefins or copolymerization of two or more thereof is carried out in the presence of the catalyst for olefin polymerization to produce an olefin polymer. In the present invention, the polymerization may be any of liquid-phase polymerization, such as solution polymerization and suspension polymerization, and vapor-phase polymerization.

Examples of an inert hydrocarbon solvent, namely a polymerization solvent, used in liquid-phase polymerization include aliphatic hydrocarbons, such as propane, butane, pentane, hexane, heptane, octane, decane, dodecane, and kerosene; alicyclic hydrocarbons, such as cyclopentane, cyclohexane, and methylcyclopentane; aromatic hydrocarbons, such as benzene, toluene, and xylene; and halogenated hydrocarbons, such as ethylene chloride, chlorobenzene, and dichloromethane. One type of these inert hydrocarbon solvents may be used alone or at least two types may be used in combination. An olefin itself used as a material of the olefin polymer may be used as a solvent.

[Olefin Polymer]

According to the present invention, in the case where an olefin such as propylene is polymerized, an olefin polymer having high melting point and high molecular weight can be efficiently produced not only at low polymerization temperature but also at high polymerization temperature with high polymerization activity.

The weight average molecular weight (Mw) of the olefin polymer, which can be measured by gel permeation chromatography (GPC), is normally not less than 90,000, preferably in the range of 97,000 to 1,000,000, and more preferably 110,000 to 1,000,000. The MWD (weight average molecular weight (Mw)/number average molecular weight (Mn)) of the propylene polymer is normally from 1 to 3, preferably from 1 to 2.9, and more preferably from 1 to 2.8.

The bridged metallocene compound (A) used in the present invention has characteristics specific to so-called a single-site catalyst and is thus effective for production of the above-mentioned polymer having a narrow molecular weight distribution. Needless to say, multistage polymerization in which polymerization reactions are sequentially carried out under different conditions can be also employed to produce a polymer having a broader molecular weight distribution.

The intrinsic viscosity $[\eta]$ of the olefin polymer is preferably not less than 1.20 dl/g, more preferably not less than 1.25 dl/g, and further preferably not less than 1.35 dl/g. The upper limit of the intrinsic viscosity $[\eta]$ is normally approximately 10 dl/g.

A propylene polymer having weight average molecular weight (Mw) and intrinsic viscosity $[\eta]$, which is an index of molecular weight, satisfying the above-mentioned range can be melt-extruded with high stability.

The physical properties of a propylene polymer will now be described on the basis of a propylene homopolymer or a copolymer of propylene and an olefin other than propylene (the case where at least propylene is used as the olefin).

The melting point (Tm) of the propylene polymer, which can be measured by differential scanning calorimetry (DSC), is normally not less than 135° C., preferably from 140 to 170° C., and more preferably 145 to 170° C. A propylene polymer having a melting point (Tm) which satisfies such a range can be well shaped.

The crystallization temperature (Tc) of the propylene polymer, which can be measured by DSC, is normally not less than 70° C., more preferably from 80 to 150° C., and further preferably from 85 to 130° C. A propylene polymer having a crystallization temperature (Tc) which satisfies such a range can be well shaped.

In the case where multiple crystalline melting peaks are observed (for example, low-temperature side peak Tm1 and high-temperature side peak Tm2) in the propylene polymer, the high-temperature side peak is defined as the melting point (Tm) of the propylene polymer.

In the present invention, the weight average molecular weight (Mw), number average molecular weight (Mn), intrinsic viscosity $[\eta]$, melting point (Tm), and crystallization temperature (Tc) of an olefin polymer are measured under conditions described in EXAMPLES.

In general, increasing the polymerization temperature in polymerization of an olefin leads to decreases in the melting point and molecular weight of the olefin polymer. The catalyst for olefin polymerization enables an olefin polymer having a melting point (Tm) of not less than 145° C. and a weight average molecular weight (Mw) of not less than 97,000 to be efficiently produced with high polymerization activity even at temperature proper in an industrial production process.

EXAMPLES

The present invention will now be further specifically described with reference to Examples; however, the present invention is not limited thereto. Methods for determining the physical properties and characteristics of an olefin polymer will be described.

[Melting Point (Tm) and Crystallization Temperature (Tc)]

The melting point (Tm) or crystallization temperature (Tc) of an olefin polymer were measured as follows with DSC Pyris1 or DSC7 manufactured by PerkinElmer Inc.

Under a nitrogen atmosphere (20 mL/min), a sample (approximately 5 mg) was (1) heated to 230° C. and held at 230° C. for 10 minutes, (2) cooled to 30° C. at 10° C./min and held at 30° C. for 1 minute, and then (3) heated to 230° C. at 10° C./min. The melting point (Tm) was determined from the top of the crystalline melting peak shown in the heating process in the step (3), and the crystallization temperature (Tc) was determined from the top of the crystallization peak shown in the cooling process in the step (2).

In the case where multiple crystalline melting peaks (for example, low-temperature side peak Tm1 and high-temperature side peak Tm2) were observed in an olefin polymer in each of Examples and Comparative Examples, the high-temperature side peak was defined as the melting point (Tm) of the olefin polymer.

[Intrinsic Viscosity [η]]

The intrinsic viscosity [η] of an olefin polymer was measured at 135° C. with the use of a decalin solvent. In particular, pellets (approximately 20 mg) into which an olefin polymer had been granulated were dissolved in a decalin solvent (15 mL), and the specific viscosity lisp thereof was measured in an oil bath at 135° C. A decalin solvent (5 mL) was further added to the decalin solution for dilution, and then the specific viscosity lisp of the resulting solution was similarly measured. The addition of decalin solvent (5 ml) for dilution was further repeated twice, and the value of ηsp/C obtained by extrapolating the concentration (C) of the olefin polymer to zero was defined as the intrinsic viscosity [η] of the olefin polymer.

Intrinsic viscosity [η]=lim(ηsp/C) (C→0)

[Weight Average Molecular Weight (Mw), Number Average Molecular Weight (Mn), and Molecular Weight Distribution (Mw/Mn)]

Weight average molecular weight (Mw), number average molecular weight (Mn), and molecular weight distribution (Mw/Mn: MWD) were measured as follows with a gel permeation chromatograph "Alliance GPC-2000" manufactured by Waters Corp. The separation columns were two columns of TSKgel GNH6-HT and two columns of TSKgel GNH6-HTL, each column had a diameter of 7.5 mm and a length of 300 mm, and the column temperature was 140° C. The mobile phase was o-dichlorobenzene (manufactured by Wako Pure Chemical Industries, Ltd.), and 0.025 weight % of BHT (Takeda Pharmaceutical Company Limited.) was used as an antioxidant. The mobile phase was allowed to follow at 1.0 mL/min, the concentration of a sample was 15 mg/10 mL, the amount of a sample to be fed was 500 µL, and a differential refractometer was used as a detector. As for a standard polystyrene, when a molecular weight satisfied the relationship of Mw<1000 or Mw>4×10$^6$, a product manufactured by TOSOH CORPORATION was used, and when a molecular weight satisfied the relationship of 1000≤Mw≤4×10$^6$, a product manufactured by Pressure Chemical Company was used. The molecular weight distribution and the average molecular weights were calculated by a general calibration procedure in terms of the molecular weight of polypropylene.

[Identification of Objective]

The structure of a compound produced in each of Synthetic Examples was identified by 270-MHz $^1$H-NMR spectroscopy (using GSH-270 manufactured by JEOL Ltd.) and FD-MS (using SX-102A manufactured by JEOL Ltd.).

[Bridged Metallocene Compounds Used in Comparative Examples]

Bridged metallocene compounds used in Comparative Examples were synthesized by techniques disclosed in the following Patent Literature: JPA 2000-212194, 2004-168744, 2004-189666, 2004-161957, 2007-302854, and 2007-302853 and WO 01/027124.

Synthetic Example 1

Synthesis of Catalyst (a): Benzyl(phenyl)methylene (cyclopentadienyl)(2,7-diphenyl-3,6-di-tert-butylfluorenyl)zirconium Dichloride

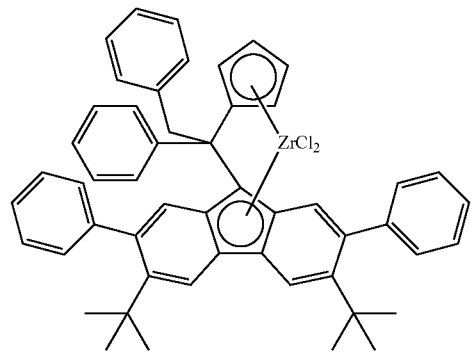

(i) Synthesis of 2,7-dibromo-3,6-di-tert-butylfluorene

Under nitrogen flow, 170 mL of propylene carbonate was added to 15.22 g (54.7 mmol) of 3,6-di-tert-butylfluorene, and they were stirred. Then, 20.52 g (115 mmol) of N-bromosuccinimide was added to the solution. The resulting solution was heated and stirred at 80° C. for 5 hours. The reaction solution was left to stand to cool and then added to 800 mL of water. The product was stirred at room temperature for 15 minutes and filtered with a Hirsch funnel. The obtained whitish yellow powder was washed five times with 10 mL of ethanol. A mixed solution of hexane and a slight amount of dichloromethane was added to the powder, and the product was heated to 60° C. to thoroughly dissolve the powder. The solution was left to stand overnight at −20° C. The precipitated crystal was washed three times with 5 mL of hexane to obtain an objective that was whitish yellow powder (amount: 21.16 g and yield: 76%).

$^1$H-NMR (270 MHz, CDCl$_3$, TMS): δ (ppm) 1.60 (18H), 3.75 (2H), 7.73 (2H), 7.81 (2H).

MS (FD): M/z 436 (M$^+$).

(ii) Synthesis of 2,7-diphenyl-3,6-di-tert-butylfluorene

Under a nitrogen atmosphere, 8.15 g (18.7 mmol) of 2,7-dibromo-3,6-di-tert-butylfluorene, 1.08 g (0.93 mmol) of Pd(PPh$_3$), and 120 mL of dry 1,2-dimethoxyethane were put into a 300-mL three-necked flask and then stirred at room temperature for 20 minutes. To this solution, 20 mL of a solution of 5.01 g (41.1 mmol) of phenylboronic acid in ethanol was added, the resulting solution was stirred at room temperature for 20 minutes, and then 37.4 mL (74.8 mmol) of an aqueous solution of 2.0-M sodium carbonate was added thereto. Then, the product was heated for 18 hours under reflux, left to stand to cool, and quenched with dilute hydrochloric acid in an ice bath. Ether was added thereto, the soluble part in ether was extracted, and the organic layer was washed twice with an aqueous solution of saturated sodium hydrogen carbonate, further twice with water, and further twice with a saturated salt solution and then dehydrated with magnesium sulfate. The solvent was distilled off, and then the obtained solid was separated by column chromatography to obtain an objective (amount: 4.36 g and yield: 54%).

$^1$H-NMR (270 MHz, CDCl$_3$, TMS): δ (ppm) 1.29 (18H), 3.78 (2H), 7.16 (2H), 7.34 (10H), 7.97 (2H).

MS (FD): M/z 430 (M$^+$).

(iii) Synthesis of 6-benzyl-6-phenylfulvene

Under a nitrogen atmosphere, 2.45 g (25.7 mmol) of anhydrous magnesium chloride and 20 mL of dry THF were put into a 100-mL Schlenk flask and then stirred. To this mixed solution, 10.6 mL (21.2 mmol) of a solution of 2.0-M sodium cyclopentadienide in THF was added. Then, the product was heated for an hour under reflux, the obtained pink slurry was cooled in an ice bath, and a solution in which 3.5 g (17.8 mmol) of benzyl phenyl ketone had been dissolved in 15 mL of dry THF was subsequently added thereto. Then, the product was stirred at room temperature for 18 hours, and the obtained orange solution was quenched with dilute aqueous hydrochloric acid. Then, 30 mL of diethyl ether was added thereto, the soluble part in diethyl ether was extracted, and the organic layer was neutralized and washed with an aqueous solution of saturated sodium hydrogen carbonate, water, and a saturated salt solution and then dehydrated with anhydrous magnesium sulfate. The solvent was distilled off, and then the residue was purified by silica gel column chromatography to obtain an objective that was a reddish orange solid (amount: 2.7 g and yield: 62%).

$^1$H-NMR (270 MHz, CDCl$_3$, TMS): δ (ppm) 4.2 (2H), 6.15-6.75 (4H), 7.08-7.30 (10H).

MS (GC): M/z 244 (M$^+$).

(iv) Synthesis of Benzyl(phenyl)methylene(cyclopentadienyl) (2,7-diphenyl-3,6-di-tert-butylfluorene)

Under nitrogen flow, 40 mL of anhydrous THF was added to 4.02 g (9.3 mmol) of 2,7-diphenyl-3,6-di-tert-butylfluorene, they were stirred for dissolution and cooled in an ice bath, and then 6.2 mL (10.1 mmol) of a solution of 1.63-M n-butyllithium in hexane was added thereto. The product was stirred at room temperature for 2.5 hours, the obtained deep red solution was subsequently cooled in a dry ice-methanol bath, and a solution (15 mL) of 2.7 g (11.1 mmol) of 6-benzyl-6-phenylfulvene in THF was added thereto. The product was stirred for 16 hours while the temperature was gradually increased to room temperature, and dilute hydrochloric acid was added to the resulting deep red solution in an ice bath to terminate the reaction. Diethyl ether was added thereto to separate the organic layer from the water layer, the water layer was subjected to extraction twice with diethyl ether, and then the extract was combined with the organic layer. The resulting organic layer was washed twice with an aqueous solution of saturated sodium hydrogen carbonate, further twice with water, and further once with a saturated salt solution and then dehydrated with anhydrous magnesium sulfate. The solvent was distilled off, and the residue was purified by silica gel column chromatography to obtain an objective that was pale yellow powder (amount: 2.3 g and yield: 36.9%).

$^1$H-NMR (270 MHz, CDCl$_3$): δ (ppm) 1.21-1.31 (18H), 2.53-2.82 (2H), 3.42-3.78 (2H), 4.83 (1H), 5.84-6.10 (3H), 6.75-7.31 (22H), 7.63-7.70 (2H).

(v) Synthesis of Benzyl(phenyl)methylene(cyclopentadienyl)(2,7-diphenyl-3,6-di-tert-butylfluorenyl) zirconium Dichloride Under a nitrogen atmosphere, 0.81 g (1.20 mmol) of benzyl (phenyl)methylene(cyclopentadienyl)(2,7-diphenyl-3,6-di-tert-butylfluorene) and 40 mL of anhydrous diethyl ether were put into a 100-mL Schlenk flask and then stirred for dissolution. This solution was cooled in an ice bath, 1.60 mL (2.61 mmol) of a solution of 1.63-M n-butyllithium in hexane was added thereto, and the product was stirred at ice temperature for 4 hours. The obtained orange slurry was cooled in a dry ice-methanol bath, and then 0.30 g (1.29 mmol) of anhydrous zirconium tetrachloride was added thereto. Then, the product was stirred for 17 hours while the temperature was gradually increased to room temperature, thereby producing a reddish brown suspension.

The solvent was removed under reduced pressure, the product was subsequently subjected to extraction with dichloromethane in a glove box, dichloromethane was distilled off, and then the product was further subjected to extraction with pentane. Pentane was distilled off under reduced pressure, and the product was further dried under reduced pressure to produce an objective that was orange powder (amount: 0.49 g and yield: 48.9%).

$^1$H-NMR (270 MHz, CDCl$_3$): δ (ppm) 1.19-1.25 (18H), 3.74-4.39 (2H), 5.37-6.45 (4H), 6.65-7.53 (22H), 8.22-8.29 (2H).

MS (FD) : M/Z 834 (M$^+$)

Under a nitrogen atmosphere, 10 mg of this catalyst (a) was collected in a sample bottle, n-hexane was added thereto at 25° C. under stirring to dissolve the catalyst (a), and the solubility determined from the amount of n-hexane necessary for the dissolution was 1.005 mmol/L.

Synthetic Example 2

Catalyst (b): Benzyl(phenyl)methylene(cyclopentadienyl)(2,7-di-p-chlorophenyl-3,6-di tert-butylfluorenyl)zirconium Dichloride

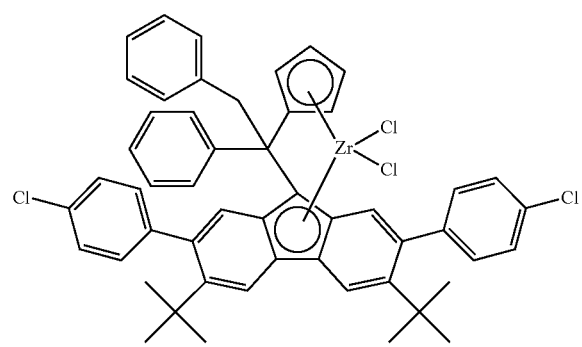

(i) Synthesis of Benzyl(phenyl)methylene(cyclopentadienyl)(2,7-di-p-chlorophenyl-3,6-di-tert-butylfluorene)

Under nitrogen flow, 200 mL of anhydrous THF was added to 2.15 g (4.3 mmol) of 3,6-di-tert-butyl-2,7-di-p-chlorophenylfluorene, they were stirred for dissolution, the solution was cooled in an ice bath, and 2.96 mL (4.7 mmol) of a solution of 1.63-M n-butyllithium in hexane was added thereto. The product was stirred at room temperature for 1.5 hours, the obtained deep red solution was subsequently cooled in a dry ice-methanol bath, and a solution of 1.26 g (5.2 mmol) of 6-benzyl-6-phenylfulvene in THF (50 mL) was added thereto. The product was stirred for four hours while the temperature was gradually increased to room temperature, and dilute hydrochloric acid was added to the resulting solution in an ice bath to terminate the reaction. Diethyl ether was added thereto for separation, the water layer was subjected to extraction twice with diethyl ether, and then the extract was combined with the organic layer. The resulting organic layer was washed twice with an aqueous solution of saturated sodium hydrogen carbonate, further twice with water, and further once with a saturated salt solution and then dehydrated with anhydrous magnesium sulfate. The solvent was distilled off, and the residue was purified by silica gel column chromatography to obtain an objective that was pale yellow powder (amount: 1.8 g and yield: 56%).

$^1$H-NMR (270 MHz, CDCl$_3$): δ (ppm) 1.21-1.31 (18H), 2.53-2.82 (2H), 3.42-3.78 (2H), 4.83 (1H), 5.84-6.10 (3H), 6.75-7.31 (20H), 7.63-7.70 (2H).

(ii) Synthesis of Benzyl(phenyl)methylene(cyclopentadienyl)(2,7-di-p-chlorophenyl-3,6-di-tert-butylfluorenyl)zirconium Dichloride Under a nitrogen atmosphere, 0.99 g (1.33 mmol) of benzyl(phenyl)methylene(cyclopentadienyl)(2,7-di-p-chlorophenyl-3,6-di-tert-butylfluorene) and 50 mL of anhydrous diethyl ether were put into a 100-mL Schlenk flask and then stirred for dissolution. This solution was cooled in an ice bath, 1.71 mL (2.79 mmol) of a solution of n-butyllithium having a concentration of 1.63 M in hexane was added thereto, and the product was stirred at ice temperature for 4 hours. The obtained orange slurry was cooled in a dry ice-methanol bath, and then 0.31 g (1.33 mmol)) of anhydrous zirconium tetrachloride was added thereto. Then, the product was stirred for 17 hours while the temperature was gradually increased to room temperature, thereby producing a reddish brown suspension.

The solvent was removed under reduced pressure, the product was subsequently subjected to extraction with dichloromethane in a glove box, dichloromethane was distilled off, and then the product was washed with pentane and dried under reduced pressure to produce an objective (amount: 0.90 g and yield: 69.3%).

$^1$H-NMR (270 MHz, CDCl$_3$): δ (ppm) 1.19-1.25 (18H), 3.74-4.39 (2H), 5.37-6.45 (4H), 6.65-7.53 (20H), 8.22-8.29 (2H).

MS (FD): M/Z 834 (M$^+$)

Under a nitrogen atmosphere, 10 mg of this catalyst (b) was collected in a sample bottle, n-hexane was added thereto at 25° C. under stirring to dissolve the catalyst (b), and the solubility determined from the amount of n-hexane necessary for the dissolution was 4.098 mmol/L.

Synthetic Example 3

Catalyst (c): Benzyl(p-chlorophenyl)methylene(cyclopentadienyl)(2,7-diphenyl-3,6-di-tert-butylfluorenyl)zirconium Dichloride

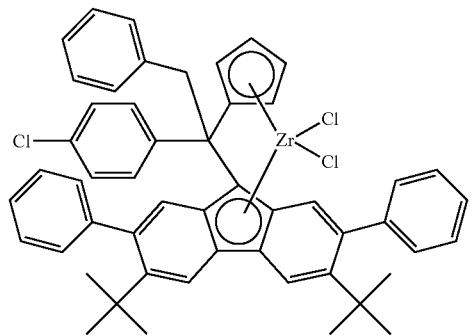

(i) Synthesis of 6-benzyl-6-(p-chlorophenyl)fulvene

Under a nitrogen atmosphere, 2.45 g (25.7 mmol) of anhydrous magnesium chloride and 20 mL of dry THF were put into a 100-mL Schlenk flask and then stirred. To this mixed solution, 10.6 mL (21.2 mmol) of a solution of sodium cyclopentadienide having a concentration of 2.0 mol/L in THF was added. Then, the product was heated and refluxed for an hour, the obtained pink slurry was cooled in an ice bath, and a solution in which 3.5 g (17.8 mmol) of benzyl(p-chlorophenyl)ketone had been dissolved in 15 mL of dry THF was subsequently added thereto. Then, the product was stirred at room temperature for 18 hours, and the obtained orange solution was quenched with dilute aqueous hydrochloric acid. Then, 30 mL of diethyl ether was added thereto, the soluble part in diethyl ether was extracted, and the organic phase was neutralized and washed with an aqueous solution of saturated sodium hydrogen carbonate, water, and a saturated salt solution and then dehydrated with anhydrous magnesium sulfate. The solvent was distilled off, the residue was subsequently purified by silica gel column chromatography to obtain an objective that was a reddish orange solid (amount: 2.7 g), and the objective was directly used in the subsequent process.

(ii) Synthesis of Benzyl(p-chlorophenyl)methylene(cyclopentadienyl)(2,7-diphenyl-3,6-di-tert-butylfluorene)

Under nitrogen flow, 200 mL of anhydrous THF was added to 4.3 g (10 mmol) of 3,6-di-tert-butyl-2,7-diphenylfluorene, they were stirred for dissolution and cooled in an ice bath, and then 11 mL (6.74 mmol) of a solution of 1.63-M n-butyllithium in hexane was added thereto. The product was stirred at room temperature for 1.5 hours, the obtained deep red solution was subsequently cooled in a dry ice-methanol bath, and a solution of 3.34 g (12 mmol) of 6-benzyl-6-(p-chlorophenyl)fulvene in THF (50 mL) was added thereto. The product was stirred for four hours while the temperature was gradually increased to room temperature, and then dilute hydrochloric acid was added to the resulting solution in an ice bath to terminate the reaction. Diethyl ether was added thereto for separation, the water layer was subjected to extraction twice with diethyl ether, and then the extract was combined with the organic layer. The resulting organic layer was washed twice with an aqueous solution of saturated sodium hydrogen carbonate, further twice with water, and further once with a saturated salt solution and then dehydrated with anhydrous magnesium sulfate. The solvent was distilled off, and the residue was purified by silica gel column chromatography to produce an objective (amount: 5.2 g and yield: 73%).

$^1$H-NMR (270 MHz, CDCl$_3$): δ (ppm) 1.21-1.31 (18H), 2.53-2.82 (2H), 3.42-3.78 (2H), 4.83 (1H), 5.84-6.10 (3H), 6.75-7.31 (19H), 7.63-7.70 (2H).

(iii) Synthesis of Benzyl(p-chlorophenyl)methylene (cyclopentadienyl)(2,7-diphenyl-3,6-di-tert-butylfluorenyl)zirconium Dichloride Under a nitrogen atmosphere, 2.7 g (3.81 mmol) of benzyl (p-chlorophenyl)methylene(cyclopentadienyl)(2,7-diphenyl-3,6-di-tert-butylfluorene) and 50 mL of anhydrous diethyl ether were put into a 100-mL Schlenk flask and then stirred for dissolution. This solution was cooled in an ice bath, 5.12 mL (7.99 mmol) of a solution of n-butyllithium having a concentration of 1.63 M in hexane was added thereto, and the product was stirred at ice temperature for 4 hours. The obtained orange slurry was cooled in a dry ice-methanol bath, and then 0.85 g (3.64 mmol) of anhydrous zirconium tetrachloride was added thereto. Then, the product was stirred for 17 hours while the temperature was gradually increased to room temperature, thereby producing a reddish brown suspension.

The solvent was removed under reduced pressure, the product was subsequently subjected to extraction with dichloromethane in a glove box, dichloromethane was distilled off, and then the product was washed with pentane and dried under reduced pressure to produce an objective (amount: 1.2 g and yield: 36%).

$^1$H-NMR (270 MHz, CDCl$_3$): δ (ppm) 1.19-1.25 (18H), 3.74-4.39 (2H), 5.37-6.45 (4H), 6.65-7.53 (20H), 8.22-8.29 (2H).

MS (FD): M/Z 834 (M$^+$)

Under a nitrogen atmosphere, 10 mg of this catalyst (c) was collected in a sample bottle, n-hexane was added thereto at 25° C. under stirring to dissolve the catalyst (c), and the solubility determined from the amount of n-hexane necessary for the dissolution was 1.585 mmol/L.

Synthetic Example 4

Catalyst (d): Benzyl(p-chlorophenyl)methylene(cyclopentadienyl)(2,7-di-p-chlorophenyl-3,6-di-tert-butylfluorenyl)zirconium Dichloride

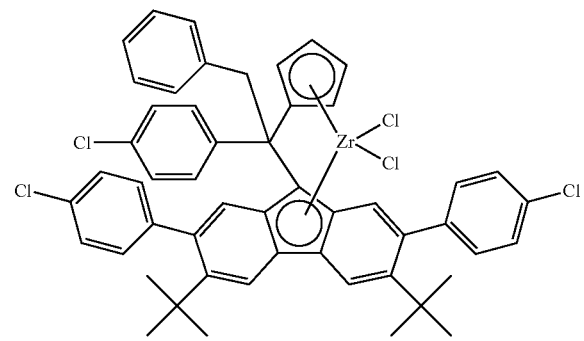

(i) Synthesis of Benzyl(p-chlorophenyl)methylene (cyclopentadienyl)(2,7-di-p-chlorophenyl-3,6-di-tert-butylfluorene)

Under nitrogen flow, 40 mL of toluene and 3.5 g of THF were added to 1.53 g (3.06 mmol) of 3,6-di-tert-butyl-2,7-di-p-chlorophenylfluorene, they were stirred for dissolution and cooled in an ice bath, and then 2 mL (3.3 mmol) of a solution of 1.67-M n-butyllithium in hexane was added thereto. The product was stirred at room temperature for 1.5 hours, the obtained deep red solution was subsequently cooled in a dry ice-methanol bath, and 1.1 g (3.95 mmol) of 6-benzyl-6-(p-chlorophenyl)fulvene was added thereto. The product was stirred for 19 hours while the temperature was gradually increased to room temperature, and dilute hydrochloric acid was added to the resulting solution in an ice bath to terminate the reaction. Diethyl ether was added thereto for separation, the water layer was subjected to extraction twice with diethyl ether, and then the extract was combined with the organic layer. The resulting organic layer was washed twice with an aqueous solution of saturated sodium hydrogen carbonate, further twice with water, and further once with a saturated salt solution and then dehydrated with anhydrous magnesium sulfate. The solvent was distilled off, and the residue was purified by silica gel column chromatography to obtain an objective (amount: 1.0 g).

(ii) Synthesis of Benzyl(p-chlorophenyl)methylene (cyclopentadienyl)(2,7-di-p-chlorophenyl-3,6-di-tert-butylfluorenyl)zirconium Dichloride Under a nitrogen atmosphere, 600 mg (0.77 mmol) of benzyl(p-chlorophenyl)methylene(cyclopentadienyl)(2,7-di-p-chlorophenyl-3,6-di-tert-butylfluorene) and 40 mL of anhydrous diethyl ether were mixed and stirred for dissolution. This solution was cooled in an ice bath, 0.96 mL (1.62 mmol) of a solution of n-butyllithium having a concentration of 1.67 M in hexane was added thereto, and the product was stirred at ice temperature for 4 hours. The obtained orange slurry was cooled in a dry ice-methanol bath, and then 170 mg (0.73 mmol) of anhydrous zirconium tetrachloride was added thereto. Then, the product was stirred for 17 hours while the temperature was gradually increased to room temperature, thereby producing a reddish brown suspension.

The solvent was removed under reduced pressure, the product was subsequently subjected to extraction with hexane in a glove box, hexane was distilled off, and then the product was washed with pentane and dried under reduced pressure to produce an objective (amount: 350 mg).

$^1$H-NMR (270 MHz, CDCl$_3$): δ (ppm) 1.19-1.25 (18H), 3.74-4.39 (2H), 5.37-6.45 (4H), 6.65-7.53 (19H), 8.22-8.29 (2H).

Under a nitrogen atmosphere, 10 mg of this catalyst (d) was collected in a sample bottle, n-hexane was added thereto at 25° C. under stirring to dissolve the catalyst (d), and the solubility determined from the amount of n-hexane necessary for the dissolution was 0.901 mmol/L.

Synthetic Example 5

Catalyst (e): Methyl(p-tolyl)methylene(cyclopentadienyl)(2,7-diphenyl-3,6-di-tert-butylfluorenyl)zirconium Dichloride

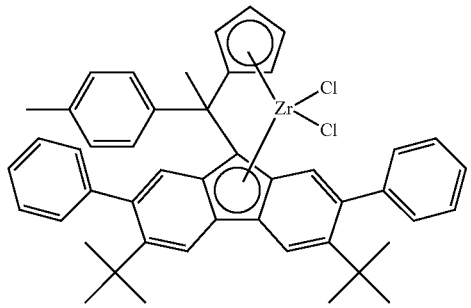

(i) 6-methyl-6-(p-tolyl)fulvene

Under a nitrogen atmosphere, a solution of a cyclopentadienyllithium salt (5.9 g, 81.9 mmol) in dry diethyl ether (100 mL) was cooled in an ice bath, and 4'-methylacetophenone (10.0 g, 74.5 mmol) was dropped thereinto. Then, the product was stirred at room temperature for 20 hours to induce a reaction. After the reaction was terminated, dilute aqueous hydrochloric acid was added thereto, the product was subjected to extraction with hexane, the organic layer was subsequently washed with water and then dehydrated with anhydrous magnesium sulfate, and then the solvent was distilled off to produce a red liquid. The red liquid was purified by column chromatography (silica gel, solvent: hexane) to produce 9.8 g of 6-methyl-6-(p-tolyl)fulvene. The analytical values were as follows.

$^1$H-NMR (270 MHz, in CDCl$_3$, TMS internal standard substance): δ (ppm) 7.25 (2H), 7.12 (2H), 6.55 (1H), 6.51 (1H), 6.40 (1H), 6.15 (1H), 2.43 (3H), 2.30 (3H)

(ii) Methyl(p-tolyl)cyclopentadienyl(2,7-diphenyl-3,6-di-tert-butylfluorenyl)methane Under a nitrogen atmosphere, a solution of n-butyllithium in hexane (6.3 ml, 10.2 mmol) was dropped into a solution of 2,7-diphenyl-3,6-di-tert-butylfluorene (4.0 g, 9.3 mmol) in dry tetrahydrofuran (50 ml) at −10° C., and then the product was stirred at room temperature for 20 hours. Then, 6-methyl-6-(p-tolyl)fulvene (1.9 g, 10.2 mmol) was dropped into this solution at −10° C., and the product was stirred at room temperature for 2 hours to induce a reaction. After the reaction was terminated, dilute aqueous hydrochloric acid was added thereto, the product was subjected to extraction with hexane, the organic layer was subsequently washed with water and then dehydrated with anhydrous magnesium sulfate, and then the solvent was distilled off to produce a light brown solid. The produced solid was recrystallized with methanol to obtain 5.1 g of an objective. The analytical values were as follows.

$^1$H-NMR (270 MHz, in CDCl$_3$, TMS internal standard substance): δ (ppm) 7.8 (2H), 6.90 to 7.35 (15H), 6.70, 6.6, 6.5, 6.3, 6.15 (4H), 5.45, 5.3, 4.7 (2H), 2.95 to 2.7 (1H), 2.18 (3H), 1.3 to 1.21 (18H), 1.01 to 1.00 (3H)

FD-MS: m/z 612 (M$^+$)

(iii) Methyl(p-tolyl)methylene(cyclopentadienyl)(2,7-diphenyl-3,6-di-tert-butyl-fluorenyl)zirconium Dichloride Under a nitrogen atmosphere, a solution of n-butyllithium in hexane (2.1 ml, 3.3 mmol) was slowly dropped into a solution of methyl(p-tolyl)cyclopentadienyl(2,7-diphenyl-3,6-di-tert-butylfluorenyl)methane (1.0 g, 1.63 mmol) in dry diethyl ether (40 ml), and then the product was stirred at room temperature for 24 hours. Then, the product was cooled to −60° C., zirconium tetrachloride (0.38 g, 1.63 mmol) was added thereto, and the product was stirred for 24 hours while the temperature was gradually returned to room temperature. The obtained red suspension was filtered with celite to remove lithium chloride. Then, the filtrate was concentrated, washed with diethyl ether, and cooled with a hexane solution. The precipitate was collected to yield 150 mg of methyl(p-tolyl)methylene(cyclopentadienyl)(2,7-diphenyl-3,6-di-tert-butylfluorenyl)zirconium dichloride (red solid). The analytical values were as follows.

$^1$H-NMR (270 MHz, in CDCl$_3$, TMS internal standard substance): δ (ppm) 8.2 (2H), 6.9 to 7.5 (16H), 6.4 (1H), 6.23 (1H), 5.68 (1H), 5.55 (1H), 5.38 (1H), 2.25 (3H), 1.20, 1.25 (21H)

FD-MS: m/z 772 (M$^+$)

Under a nitrogen atmosphere, 10 mg of this catalyst (e) was collected in a sample bottle, n-hexane was added thereto at 25° C. under stirring to dissolve the catalyst (e), and the solubility determined from the amount of n-hexane necessary for the dissolution was 6.221 mmol/L.

Synthetic Example 6

Catalyst (f): n-octyl(phenyl)methylene(cyclopentadienyl)(2,7-diphenyl-3,6-di-tert-butylfluorenyl)zirconium Dichloride

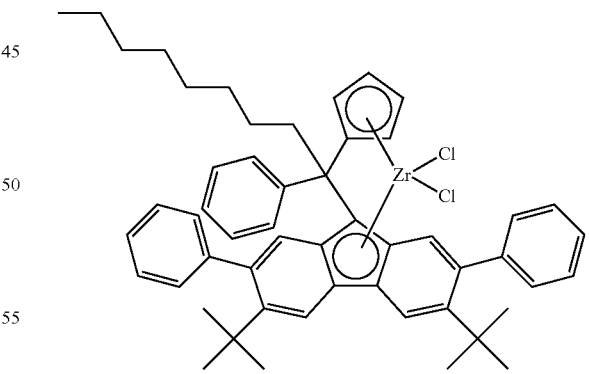

(i) Synthesis of 6-(n-octyl)-6-phenylfulvene

Under a nitrogen atmosphere, 2.0 g (9.2 mmol) of n-nonanophenone and 30 mL of dry THF were put into a 100-mL Schlenk flask to produce a solution. To this solution, 5.6 mL (11.2 mmol) of a solution of 2.0-M sodium cyclopentadienide in THF was added under cooling with ice, and the product was stirred at room temperature for 19 hours. Then, the obtained deep red solution was quenched with dilute aqueous hydrochloric acid under cooling with ice. Then, 30 mL of diethyl ether was added thereto, and the soluble part in diethyl ether was extracted, and the organic layer was neutralized and washed with an aqueous solution of saturated sodium hydrogen carbonate, water, and a saturated salt solution and then dehydrated with anhydrous magnesium sulfate. The solvent was distilled off, and then the residue was purified by silica gel column chromatography to obtain an objective that was a red liquid (amount: 1.77 g and yield: 72.5%).

(ii) Synthesis of n-octyl(phenyl)methylene(cyclopentadienyl)(2,7-diphenyl-3,6-di-tert-butylfluorene)

Under nitrogen flow, 40 mL of anhydrous THF was added to 1.71 (3.97 mmol) of 2,7-diphenyl-3,6-di-tert-butylfluorene, they were stirred for dissolution and cooled in an ice bath, and then 2.8 mL (4.68 mmol) of a solution of 1.67-M n-butyllithium in hexane was added thereto. The product was stirred for 2 hours under cooling with ice; then, to the obtained deep reddish brown solution, a solution (30 mL) of 1.6 g (6.0 mmol) of 6-(n-octyl)-6-phenylfulvene in THF was added while the deep reddish brown solution was cooled with iced water. The product was stirred for 16 hours while the temperature was gradually increased to room temperature, and then dilute hydrochloric acid was added to the obtained dark brown solution in an ice bath to terminate the reaction. Diethyl ether was added thereto to separate the organic layer from the water layer, the water layer was subjected to extraction twice with diethyl ether, and then the extract was combined with the organic layer. The resulting organic layer was washed twice with an aqueous solution of saturated sodium hydrogen carbonate, further twice with water, and further once with a saturated salt solution and then dehydrated with anhydrous magnesium sulfate. The solvent was distilled off, and then the residue was purified by silica gel column chromatography to produce an objective that was an ocher viscous liquid (amount: 1.49 g and yield: 53.9%).

(iii) Synthesis of n-octyl(phenyl)methylene(cyclopentadienyl)(2,7-diphenyl-3,6-di-tert-butylfluorenyl)zirconium Dichloride Under a nitrogen atmosphere, 0.70 g (1.00 mmol) of n-octyl(phenyl)methylene(cyclopentadienyl)(2,7-diphenyl-3,6-di-tert-butylfluorene) and 40 mL of anhydrous diethyl ether were put into a 100-mL Schlenk flask and then stirred for dissolution. This solution was cooled in an ice bath, 1.35 mL (2.25 mmol) of a solution of 1.67-M n-butyllithium in hexane was added thereto, and the resulting solution was stirred at ice temperature for 3 hours and subsequently at room temperature for 1.5 hours. The obtained orange slurry was cooled in a dry ice-methanol bath, and then 0.26 g (1.12 mmol) of anhydrous zirconium tetrachloride was added thereto. Then, the product was stirred for three hours while the temperature was gradually increased to room temperature, thereby producing an orange scarlet suspension.

The solvent was removed under reduced pressure, the product was subsequently subjected to extraction with dichloromethane in a glove box, dichloromethane was distilled off, and then the product was further subjected to extraction with hexane. Hexane was distilled off under reduced pressure, and then the product was dried under reduced pressure to produce an objective that was red powder (amount: 0.79 g and yield: 91.6%).

$^1$H-NMR (270 MHz, CDCl$_3$): δ (ppm) 1.19-1.3.5 (33H), 2.34-2.78 (2H), 5.37-6.45 (4H), 6.84-6.99 (5H), 7.02-7.47 (10H), 7.50 (2H) , 8.22-8.27 (2H).

Under a nitrogen atmosphere, 10 mg of this catalyst (f) was collected in a sample bottle, n-hexane was added thereto at 25° C. under stirring to dissolve the catalyst (f), and the solubility determined from the amount of n-hexane necessary for the dissolution was 7.683 mmol/L.

Catalyst (g): Diphenylmethylene(cyclopentadienyl)(2,7-diphenyl-3,6-di-tert-butylfluorenyl)zirconium Dichloride

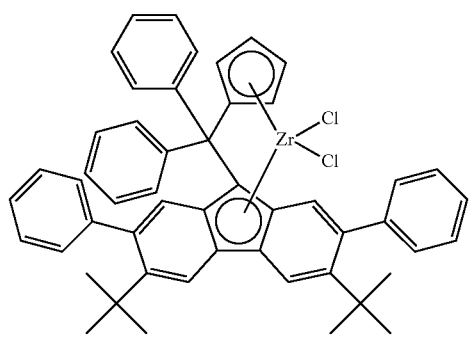

Under a nitrogen atmosphere, 10 mg of this catalyst (g) was collected in a sample bottle, and n-hexane was added thereto at 25° C. under stirring to dissolve the catalyst (g); however, in spite of addition of 30 mL of n-hexane, part of the catalyst remained undissolved, and thus the solubility was not more than 0.211 mmol/L.

Catalyst (h): Dibenzylmethylene(cyclopentadienyl)(2,7-diphenyl-3,6-di-tert-butylfluorenyl)zirconium Dichloride

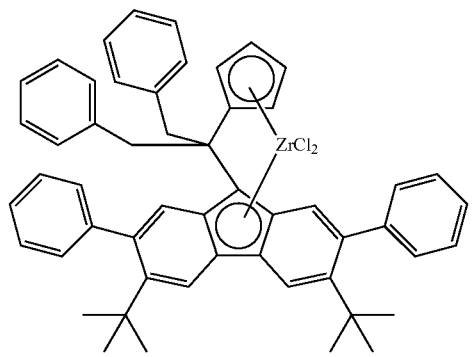

Under a nitrogen atmosphere, 10 mg of this catalyst (h) was collected in a sample bottle, and n-hexane was added thereto at 25° C. under stirring to dissolve the catalyst (h); however, in spite of addition of 30 mL of n-hexane, part of the catalyst remained undissolved, and thus the solubility was not more than 0.278 mmol/L.

Example 1

An autoclave made of SUS and having an inner volume of 15 mL was thoroughly purged with nitrogen, and 0.4 mL (0.05 M, 20 µmol) of triisobutylaluminum and 2.7 mL of a solvent which served as a polymerization solvent and in which cyclohexane and hexane had been mixed with each other at a mixing ratio of cyclohexane:hexane=9:1 (volume ratio) were put into the autoclave. The content was stirred at 600-times rotation per minute. The resulting solution was heated to 50° C. and then pressurized with propylene to a total pressure of 7 bar.

Under a nitrogen atmosphere, 2.5 mg (molecular weight: 835.07 g/mol) of the catalyst (a) which served as a bridged metallocene compound was put into a Schlenk flask and dissolved in 5.5 mL of hexane. Then, 0.36 mL of a suspension of modified methylaluminoxane (n-hexane solvent, 4.15 M and 1.49 mmol on an aluminum atom basis) was added thereto at room temperature under stirring to prepare a catalyst solution in which the concentration of the catalyst (a) was 0.00051 M.

The catalyst solution was held at room temperature under a nitrogen atmosphere for 30 minutes, 0.2 mL (0.00051 M, 0.10 µmol) of the catalyst solution and 0.7 mL of a solvent which served as a polymerization solvent and in which cyclohexane and hexane had been mixed with each other at a mixing ratio of cyclohexane:hexane=9:1 (volume ratio) were subsequently put into the autoclave, and then the temperature was increased to 65° C. to initiate polymerization. The polymerization was continued at 65° C. for 9 minutes, and then a slight amount of isobutyl alcohol was added thereto to terminate the polymerization. Then, 50 mL of methanol and a slight amount of aqueous hydrochloric acid were added to the obtained polymer, and the product was stirred at room temperature for an hour. Then, the resulting polymer was filtered and dried under reduced pressure to produce 0.60 g of syndiotactic polypropylene.

The polymerization activity was 39.90 kg-PP/mmol-Zr·hr. The produced polymer had the following properties: [η] of 1.48 dl/g, weight average molecular weight (Mw) of 127,000, number average molecular weight (Mn) of 65,000, molecular weight distribution (Mw/Mn) of 1.96, crystallization temperature (Tc) of 96.5° C., and melting points (Tm1, Tm2) of 140.0° C. and 147.9° C., respectively.

Examples 2 to 9

The bridged metallocene compound used, the amount thereof, the time for which the catalyst solution was held after the preparation thereof, the polymerization temperature, and the polymerization time in Example 1 were changed as shown in Table 18. Except for these changes, the process was carried out as in Example 1. Table 18 shows results. In Table 18, the term "mixture" refers to a solvent in which cyclohexane and hexane have been mixed with each other at a mixing ratio of cyclohexane:hexane=9:1 (volume ratio).

As is clear from each of Examples 5 and 6, in the case where the concentration of the catalyst in the prepared catalyst solution was at a high level of 0.500 mmol/L, the polymerization activity was high regardless of the holding time after the preparation of the catalyst. As is clear from Example 7, in the case where the concentration of the catalyst in the prepared catalyst solution was at a low level of 0.020 mmol/L, employing a short holding time after the preparation of the catalyst enabled practically proper polymerization activity.

As described above, since the bridged metallocene compound (A) used in the present invention is highly soluble in hydrocarbon solvents, a catalyst solution is able to be prepared with the aid of a smaller amount of solvent. Such an advantageous effect is, particularly in industrial production of an olefin polymer, useful and expected to contribute to a reduction in possible effects brought about by, for instance, the production lot of a solvent that is to be used.

Comparative Example 1

An autoclave made of SUS and having an inner volume of 15 mL was thoroughly purged with nitrogen, and 0.4 mL (0.05 M, 20 µmol) of triisobutylaluminum and 2.7 mL of a solvent which served as a polymerization solvent and in which cyclohexane and hexane had been mixed with each other at a mixing ratio of cyclohexane:hexane=9:1 (volume ratio) were put into the autoclave. The content was stirred at 600-times rotation per minute. The resulting solution was heated to 50° C. and then pressurized with propylene to a total pressure of 7 bar.

Under a nitrogen atmosphere, 3.0 mg (molecular weight: 821.04 g/mol) of the catalyst (g) which served as a bridge metallocene compound was put into a Schlenk flask, 4.55 mL of dry hexane was added thereto, and the content was stirred for 5 minutes. Then, to 2.0 mL of the supernatant liquid thereof, 0.95 mL of dry hexane and 0.27 mL of a suspension of modified methylaluminoxane (n-hexane solvent; 2.96 M, 0.80 mmol on an aluminum atom basis) were added, and the product was stirred at room temperature for 15 minutes to prepare a catalyst solution.

The catalyst solution was held at room temperature under a nitrogen atmosphere for 30 minutes, 0.2 mL of the catalyst solution and 0.7 mL of a solvent which served as a polymerization solvent and in which cyclohexane and hexane had been mixed with each other at a mixing ratio of 9:1 (volume ratio) were subsequently put into the autoclave, and then the temperature was increased to 65° C. to initiate polymerization. The polymerization was continued at 65° C. for 10 minutes, and then a slight amount of isobutyl alcohol was added thereto to terminate the polymerization. Then, 50 mL of methanol and a slight amount of aqueous hydrochloric acid were added to the obtained polymer, and the product was stirred at room temperature for an hour. Then, the resulting polymer was filtered and dried under reduced pressure to produce 0.06 g of syndiotactic polypropylene.

Assuming that the concentration of the catalyst in the catalyst solution was 0.00050 M, the polymerization activity was 3.00 kg-PP/mmol-Zr·hr. The produced polymer had the following properties: [η] of 2.81 dl/g, weight average molecular weight (Mw) of 293,000, number average molecular weight (Mn) of 134,000, molecular weight distribution (Mw/Mn) of 2.18, crystallization temperature (Tc) of 96.9° C., and melting points (Tm1, Tm2) of 137.6° C. and 144.1° C., respectively.

Comparative Example 2

The bridged metallocene compound used, the amount thereof, the polymerization temperature, and the polymerization time in Comparative Example 1 were changed as shown in Table 18. Except for these changes, the process was carried out as in Comparative Example 1. Table 18 shows results. In Table 18, the term "mixture" refers to a solvent in which cyclohexane and hexane have been mixed with each other at a mixing ratio of cyclohexane:hexane=9:1 (volume ratio).

TABLE 18

| | Catalyst | Solubility of catalyst mmol/L | Concentration of catalyst in prepared solution mmol/L | Holding time after preparation of catalyst | Amount μmol | Polymerization solvent | Polymerization temperature °C | Time min | Yield g | Polymerization activity kg/mmol-Zr-hr | Tc °C | Tm1 °C | Tm2 °C | [η] dl/g | Mw | Mn | MWD |
|---|---|---|---|---|---|---|---|---|---|---|---|---|---|---|---|---|---|
| Example 1 | (a) | 1.005 | 0.510 | 30 min | 0.10 | Mixture | 65 | 9 | 0.60 | 39.90 | 96.5 | 140.0 | 147.9 | 1.48 | 127,000 | 65,000 | 1.96 |
| Example 2 | (b) | 4.098 | 0.500 | 30 min | 0.20 | Mixture | 65 | 10 | 0.81 | 24.30 | 97.8 | 141.5 | 149.7 | 1.40 | 117,000 | 56,400 | 2.08 |
| Example 3 | (c) | 1.585 | 0.500 | 30 min | 0.20 | Mixture | 65 | 10 | 1.04 | 31.10 | 91.8 | 134.4 | 145.3 | 1.36 | 112,000 | 54,700 | 2.05 |
| Example 4 | (c) | 1.585 | 0.500 | 30 min | 0.20 | Mixture | 50 | 10 | 1.50 | 45.10 | 92.2 | 136.4 | 147.1 | 1.47 | 125,000 | 61,800 | 2.02 |
| Example 5 | (d) | 0.901 | 0.500 | 30 min | 0.10 | Mixture | 65 | 10 | 0.32 | 18.90 | 102.3 | 149.5 | 155.3 | 1.59 | 140,000 | 68,800 | 2.04 |
| Example 6 | (d) | 0.901 | 0.500 | 48 hr | 0.10 | Mixture | 65 | 10 | 0.24 | 14.10 | 107.4 | 150.7 | 155.6 | 1.57 | 138,000 | 72,000 | 1.91 |
| Example 7 | (d) | 0.901 | 0.020 | 30 min | 0.10 | Mixture | 65 | 10 | 0.15 | 8.90 | 105.4 | 149.4 | 155.0 | 1.51 | 130,000 | 67,800 | 1.92 |
| Example 8 | (e) | 6.221 | 0.500 | 30 min | 0.10 | Mixture | 50 | 10 | 1.31 | 78.50 | 95.1 | 139.7 | 148.7 | 1.40 | 117,000 | 58,200 | 2.01 |
| Example 9 | (f) | 7.683 | 0.500 | 30 min | 0.10 | Mixture | 50 | 10 | 1.07 | 64.10 | 121.4 | — | 151.6 | 1.61 | 143,000 | 70,300 | 2.03 |
| Comparative Example 1 | (g) | <0.211 (partially insoluble) | <0.500 (partially insoluble) | 30 min | <0.10 | Mixture | 65 | 10 | 0.06 | 3.00 | 96.9 | 137.6 | 144.1 | 2.81 | 293,000 | 134,000 | 2.18 |
| Comparative Example 2 | (h) | <0.278 (partially insoluble) | <0.500 (partially insoluble) | 30 min | <0.10 | Mixture | 65 | 10 | 0.11 | 6.70 | 110.0 | 151.7 | 157.0 | 1.23 | 94,800 | 49,000 | 1.94 |

Catalyst (a)

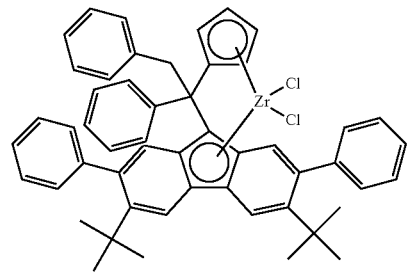

Catalyst (b)

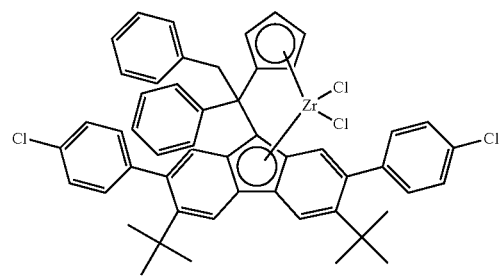

Catalyst (c)

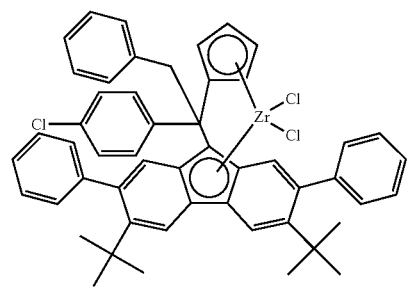

TABLE 18-continued

| Catalyst | Solubility of catalyst mmol/ L | Concentration of catalyst in prepared solution of catalyst mmol/L | Holding time after preparation of catalyst | Amount μmol | Polymerization solvent | Polymerization temperature °C. | Time min | Yield g | Polymerization activity kg/ mmol-Zr-hr | Tc °C. | Tm1 °C. | Tm2 °C. | [η] dl/g | Mw | Mn | MWD |
|---|---|---|---|---|---|---|---|---|---|---|---|---|---|---|---|---|

Catalyst (d)

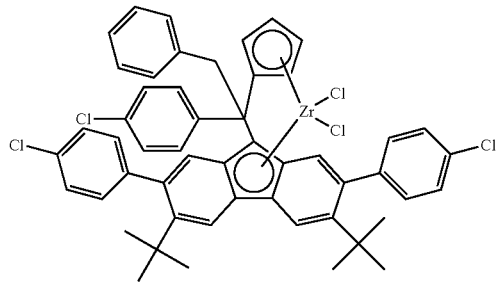

Catalyst (e)

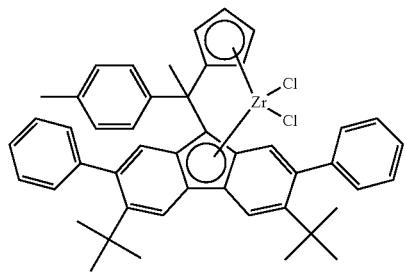

Catalyst (f)

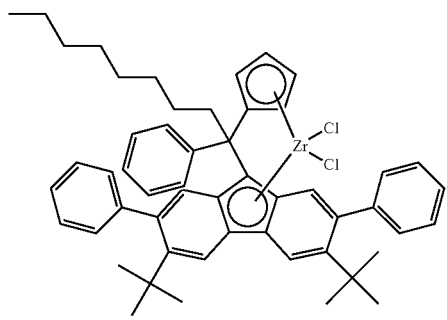

Catalyst (g)

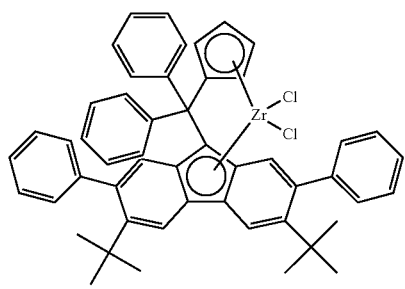

TABLE 18-continued

| Catalyst | Solubility of catalyst mmol/L | Concentration of catalyst in prepared solution mmol/L | Holding time after preparation of catalyst | Amount μmol | Polymerization solvent | Polymerization temperature °C. | Time min | Yield g | Polymerization activity kg/mmol-Zr-hr | Tc °C. | Tm1 °C. | Tm2 °C. | [η] dl/g | Mw | Mn | MWD |
| --- | --- | --- | --- | --- | --- | --- | --- | --- | --- | --- | --- | --- | --- | --- | --- | --- |

Catalyst (h)

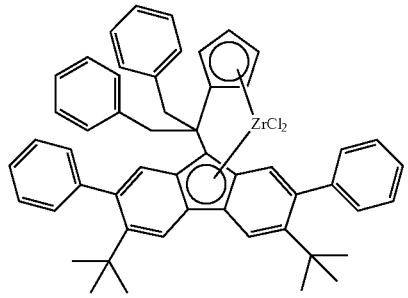

The invention claimed is:

1. A method for producing an olefin polymer, the method comprising polymerizing at least one olefin selected from olefins having two or more carbon atoms in the presence of a catalyst for olefin polymerization, wherein the catalyst for olefin polymerization comprises (A) a bridged metallocene compound represented by Formula [1] and (B) at least one compound selected from (b-1) an organoaluminum oxy-compound, (b-2) a compound which reacts with the bridged metallocene compound (A) to form an ion pair, and (b-3) an organoaluminum compound, wherein a solution in which the bridged metallocene compound (A) is dissolved in a hydrocarbon solvent is supplied to a polymerization system, wherein the hydrocarbon solvent is at least one selected from butane, isobutane, cyclobutane, methylcyclopropane, pentane, isopentane, neopentane, cyclopentane, methylcyclobutane, 1,1-dimethylcyclopropane, 1,2-dimethylcyclopropane, ethylcyclopropane, hexane, 3-methylpentane, 2-methylpentane, 2,2-dimethylbutane, 2,3-dimethylbutane, cyclohexane methlcyclopentane 1,1-dimethylcyclobutane, 1,2-dimethylcyclobutane, 1,3-dimethlcyclobutane, ethylcyclobutane, 1,1,2-trimethylcyclopropane 1-ethyl-1-methylcyclopropane, propylcyclopropane, isopropylcyclopropane, heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane, methylcyclohexane, 1,2-dimethylpentane, 1,3-dimethylpentane, 1,2,3-trimethylbutane, cycloheptane, methylcyclohexane, 1,1-dimethylcyclopentane, 1,2-dimethylcyclopentane, 1,3-dimethylcyclopentane, ethylcyclopentane, propylcyclobutane, 1,1,2,2-tetramethylcyclopropane, 1,1,2,3-tetramethylcyclopropane, 1,1-diethylcyclopropane, 1-isopropyl-1-methylcyclopropane, 1-isopropyl-2-methylcyclopropane, 1-propyl-2-methylcyclopropane, butylcyclopropane, octane 2-methylheptane, 3-methylheptane 4-methylheptane, 2,2-dimethylhexane, 2,3-dimethylhexane, 2,4-dimethylhexane, 2,5-dimethylhexane, 3,3-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane 2-methyl-3-ethylpentane, cyclooctane, methylcycloheptane, 1,1-dimethylcyclohexane, 1,2-dimethylcyclohexane, 1,3-dimethylcyclohexane, 1,4-dimethylcyclohexane, ethylcyclohexane, 1,1,2-trimethylcyclopentane, 1,1,3-trimethylcyclopentane, 1,2,3-trimethylcyclopentane, 1,2,4-trimethylcyclopentane, 1-ethyl-1-methylcyclopentane, 1-ethyl-2-methylcyclopentane, 1-ethyl-3-methylcyclopentane, propylcyclopentane, isopropylcyclopentane 1,2,3,4-tetramethylcyclobutane, 1,1,3,3-tetramethylcyclobutane, 2,2,3,3-tetramethylcyclobutane, 1,2-diethylcyclobutane, 1-butyl-2-methylcyclopropane, pentylcyclopropane isopentylcyclopropane, nonane 2-methyloctane, 3-methyloctane, 4-methyloctane, 2,2-dimethylheptane, 2,3-dimethylheptane, 2,4-dimethylheptane, 2,5-dimethylheptane, 2,6-dimethylheptane, 4,4-dimethylheptane, 2-ethylheptane, 3-ethylheptane, 4-ethylheptane, 2,2,3-trimethylhexane, 2,2,4-trimethylhexane, 2,2,5-trimethylhexane, 2,3,3-trimethylhexane, 2,3,4-trimethylhexane, 2,3,5-trimethylhexane, 2,4,4-trimethylhexane, 3,3,4-trimethylhexane, 3-ethyl-2-methylhexane, 3-ethyl-3-methylhexane, 4-ethyl-2-methylhexane, 4-ethyl-3-methylhexane, 2,2,3,3-tetramethylpentane, 2,2,3,4-tetramethylpentane, 2,2,4,4-tetramethylpentane, 2,3,3,4-tetramethylpentane, 2,2-dimethyl-3-ethylpentane, 2,2-diethylpentane, 2,3-diethylpentane, cyclononane, methylcyclooctane, ethylcycloheptane, 1,1-dimethylcycloheptane, 1,2-dimethylcycloheptane, 1,3-dimethylcycloheptane, 1,4-dimethylcycloheptane, propylcyclohexane, isopropylcyclohexane, 1-ethyl-2-methylcyclohexane, 1-ethyl-3-methylcyclohexane, 1-ethyl-4-methylcyclohexane, 1,1,2-trimethylcyclohexane, 1,1,3-trimethylcyclohexane, 1,1,4-trimethylcyclohexane, 1,2,3-trimethylcyclohexane, 1,2,4-trimethylcyclohexane, butylcyclopentane, isobutylcyclopentane, 2-cyclopentylbutane, 1,2-diethylcyclopentane, 1-isopropyl-3-methylcyclopentane, 1-methyl-2-propylcyclopentane, 2-ethyl-1,1-dimethylcyclopentane, 1,1,3,3-tetramethylcyclopentane, 1,1,3,4-tetramethylcyclopentane, 1,2,3,4-tetramethylcyclopentane, 1,1,2,3,3-pentamethylcyclobutane, 1,2-dipropylcyclopropane, 1-hexylcyclopropane, 1-pentyl- 1-methylcyclopropane, 1-pentyl-2-methylcyclopropane, decane, 2-methylnonane, 3-methylnonane, 4-methylnonane, 5-methylnonane, 2,2-dimethyloctane, 2,3-dimethyloctane, 2,4-dimethyloctane, 2,5-dimethyloctane, 2,6-dimethyloctane, 2,7-dimethyloctane, 3,3-dimethyloctane, 3,4-dimethyloctane, 3,5-dimethyloctane, 3,6-dimethyloctane, 4,4-dimethyloctane, 4,5-dimethyloctane, 3-ethyloctane, 4-ethyloctane, 2,2,3-trimethylheptane, 2,2,4-trimethylheptane, 2,2,5-trimethylheptane, 2,2,5-trimethylheptane, 2,2,6-trimethylheptane, 2,3,3-trimethylheptane, 2,3,4-trimethylheptane, 2,3,5-trimethylheptane, 2,3,6-trimethylheptane, 2,4,4-trimethylheptane, 2,4,5-trimethylheptane, 2,4,6-trimethylheptane, 2,5,5-trimethylheptane, 2-methyl-3-ethylheptane, 2-methyl-4-ethylheptane, 3-ethyl-3-methylheptane, 3-ethyl-4-methylheptane, 3-ethyl-5-methylheptane, 3-methyl-4-ethylheptane, 5-ethyl-2-methylheptane, 3,3,4-trimethylheptane, 3,3,5-trimethylheptane, 3,4,4-trimethylheptane 3,4,5-trimethylheptane, 4-propylheptane, 4-isopropylheptane, 2,2,3,3-tetramethylhexane, 2,2,3,4-tetramethylhexane, 2,2,3,5-tetramethylhexane, 2,2,4,4-tetramethylhexane, 2,2,4,5-tetramethylhexane, 2,2,5,5-tetramethylhexane, 2,3,3,4-tetramethylhexane, 2,3,3,5-tetramethylhexane, 2,3,4,4-tetramethylhexane, 2,3,4,5-tetramethylhexane, 3,3,4,4-tetramethylhexane, 2,2-dimethyl-3-ethylhexane, 2,3-dimethyl-3-ethylhexane, 2,3-dimethyl-4-ethylhexane, 2,4-dimethyl-4-ethylhexane, 2,5-dimethyl-3-ethylhexane, 3,3-dimethyl-4-ethylhexane, 3,4-dimethyl-3-ethylhexane, 3-ethyl-2,4-dimethylhexane, 4-ethyl-2,2-dimethylhexane, 3,3-diethylhexane, 3,4-diethylhexane, 2,2,3,3,4-pentamethylpentane, 2,2,3,4,4-pentamethylpentane, 2,2,3-trimethyl-3-ethylpentane, 2,2,4-trimethyl-3-ethylpentane, 2,3,4-trimethyl-3-ethylpentane, 2,4-dimethyl-3-isopropylpentane, 2-methyl-3-3-diethylpentane, 4-ethyl-4-methylpentane, cyclodecane, methylcyclononane, 1,5-dimethylcyclooctane, ethylcyclooctane, cycloheptane, 1,1,2,3-tetramethylcyclohexane, 1,1,3,3-tetramethylcyclohexane, 1,1,3,5-tetramethylcyclohexane, 1,1,4,4-tetramethylcyclohexane, 1,2,2,4-tetramethylcyclohexane, 1,2,3,4-tetramethylcyclohexane, 1,2,3,5-tetramethylcyclohexane, 1,2,4,5-tetramethylcyclohexane, butylcyclohexane, 1,3-diethylcyclohexane, 1,4-diethylcyclohexane, 1-ethyl-2-propylcyclohexane, 1,3-dimethyl-5-ethylcyclohexane, 1-ethyl-2,3-dimethylcyclohexane, 1-ethyl-2,4-dimethylcyclohexane, 1-isopropyl-1-methylcyclohexane, 1-isopropyl-2-methylcyclohexane, 1-isopropyl-3-methylcyclohexane, 1-isopropyl-4-methylcyclohexane, 1-methyl-2-propylcyclohexane, 1-methyl-3-propylcyclohexane, 2-ethyl-1,3-dimethylcyclohexane, sec-butylcyclohexane, tert-butylcyclohexane, isobutylcyclohexane, 1,2,3,4,5-pentamethylcyclopentane, 1,2,3-trimethyl-4-ethylcyclopentane, 1,2-dimethyl-3-isopropylcyclopentane, 1-ethyl-3-isopropylcyclopentane, 1-methyl-2,4-diethylcyclopentane, 1-methyl-2-butylcyclopentane, 1-methyl-3-tert-butylcyclopentane, 1-methyl-3-isobutylcyclopentane, 2-isopropyl-1,3-dimethylcyclopentane 2-cyclopentylpentane 2-methylbutylcyclopentane, isopentylcyclopentane, pentylcyclopentane, 2-ethyl-1-methyl-3-propylcyclobutane, 1,1,2-trimethyl-3-isobutylcyclopropane, 1,1-dimethyl-2-pentylcyclopropane, 1,2-dimethyl-1-pentylcyclopropane, 1,2-dimethyl-3-pentylcyclopropane, 1-ethyl-2-pentylcyclopropane, 1-hexyl-2-methylcyclopropane, 1-methyl-2-(1-methylpentyl)cyclopropane, and 1-methyl-2-(3-methylpentyl)cyclopropane;

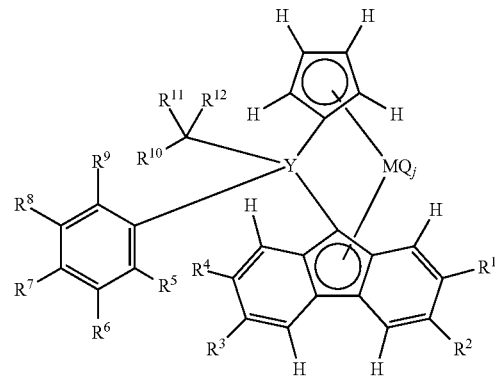

[1]

where
R$^1$ to R$^4$ each independently represent a group selected from hydrocarbon groups, halogen-containing hydrocarbon groups, nitrogen-containing groups, oxygen-containing groups, and silicon-containing groups, and two adjoining groups are optionally bonded to each other to form a ring;

R$^5$ to R$^9$ each independently represent a group selected from a hydrogen atom, halogen atoms, hydrocarbon groups, halogen-containing hydrocarbon groups, nitrogen-containing groups, oxygen-containing groups, and silicon-containing groups, and two adjoining groups are optionally bonded to each other to form a ring;

R$^{10}$ to R$^{12}$ each independently represent a group selected from a hydrogen atom, halogen atoms, hydrocarbon groups, halogen-containing hydrocarbon groups, nitrogen-containing groups, oxygen-containing groups, and silicon-containing groups;

Y represents a carbon atom or a silicon atom;

M represents Ti, Zr, or Hf;

Q is a structure selected from halogen atoms, hydrocarbon groups, neutral, conjugated or nonconjugated dienes having 10 or less carbon atoms, anion ligands, and neutral ligands capable of coordinating with a lone pair; j represents an integer from 1 to 4; and in the case where j represents an integer of 2 or more, multiple Qs are the same as or different from each other.

2. The method for producing an olefin polymer according to claim 1, wherein in Formula [1], R$^1$ and R$^4$ are each independently a group selected from hydrocarbon groups having 1 to 40 carbon atoms and halogen-containing hydrocarbon groups having 1 to 40 carbon atoms, and at least one of R$^2$ and R$^3$ is a group selected from hydrocarbon groups having 1 to 40 carbon atoms and silicon-containing groups.

3. The method for producing an olefin polymer according to claim 1, wherein in Formula [1], R$^1$ and R$^4$ are each independently a group selected from aryl groups having 6 to 20 carbon atoms and halogen-containing aryl groups having 6 to 20 carbon atoms.

4. The method for producing an olefin polymer according to claim 1, wherein in Formula [1], R$^{12}$ is a group selected from a hydrogen atom, hydrocarbon groups having 1 to 40 carbon atoms, and halogen-containing hydrocarbon groups having 1 to 40 carbon atoms.

5. The method for producing an olefin polymer according to claim 1, wherein in Formula [1], each of $R^{10}$ and $R^{11}$ is a hydrogen atom, and $R^{12}$ is a group selected from alkyl groups having 1 to 20 carbon atoms, aryl groups having 6 to 20 carbon atoms and halogen-containing aryl groups having 6 to 20 carbon atoms, or each of $R^{10}$ to $R^{12}$ is a hydrogen atom.

6. The method for producing an olefin polymer according to claim 1, wherein in Formula [1], $R^5$ to $R^9$ are each independently a group selected from a hydrogen atom, halogen atoms, and alkyl groups having 1 to 20 carbon atoms.

7. The method for producing an olefin polymer according to claim 1, wherein the catalyst for olefin polymerization further comprises a support (C).

8. The method for producing an olefin polymer according to claim 1, wherein at least propylene is used as the olefin.

9. The method for producing an olefin polymer according to claim 1, wherein the solubility of the bridged metallocene compound represented by Formula [1] in n-hexane at 25° C. is not less than 0.5 mmol/L.

10. The method for producing an olefin polymer according to claim 1, wherein a solution in which the concentration of the bridged metallocene compound represented by Formula [1] is in the range of 0.05 mmol/L to 1.0 mol/L is supplied to a polymerization system.

11. The method for producing an olefin polymer according to claim 1, wherein polymerization temperature is in the range of 50 to 150° C.

12. The method for producing a propylene polymer according to claim 1, wherein polymerization temperature is in the range of 50 to 150° C., and a propylene polymer that is to be produced has the following properties; melting point (Tm) measured by differential scanning calorimetry (in the case where multiple crystalline melting peaks are observed, the melting point (Tm) is based on the high-temperature side peak) is in the range of 145 to 170° C., intrinsic viscosity ([η]) measured in decalin at 135° C. is not less than 1.25 dl/g, weight average molecular weight (Mw) measured by gel permeation chromatography is not less than 97,000, and a proportion of weight average molecular weight (Mw) to number average molecular weight (Mn) (Mw/Mn) is in the range of 1 to 3.

13. The method for producing an olefin polymer according to claim 2, wherein in Formula [1], $R^1$ and $R^4$ are each independently a group selected from aryl groups having 6 to 20 carbon atoms and halogen-containing aryl groups having 6 to 20 carbon atoms.

14. The method for producing an olefin polymer according to claim 2, wherein in Formula [1], $R^{12}$ is a group selected from a hydrogen atom, hydrocarbon groups having 1 to 40 carbon atoms, and halogen-containing hydrocarbon groups having 1 to 40 carbon atoms.

15. The method for producing an olefin polymer according to claim 2, wherein in Formula [1], each of $R^{10}$ and $R^{11}$ is a hydrogen atom, and $R^{12}$ is a group selected from alkyl groups having 1 to 20 carbon atoms, aryl groups having 6 to 20 carbon atoms and halogen-containing aryl groups having 6 to 20 carbon atoms, or each of $R^{10}$ to $R^{12}$ is a hydrogen atom.

16. The method for producing an olefin polymer according to claim 2, wherein in Formula [1], $R^5$ to $R^9$ are each independently a group selected from a hydrogen atom, halogen atoms, and alkyl groups having 1 to 20 carbon atoms.

17. The method for producing an olefin polymer according to claim 2, wherein the catalyst for olefin polymerization further comprises a support (C).

18. The method for producing an olefin polymer according to claim 2, wherein at least propylene is used as the olefin.

19. The method for producing an olefin polymer according to claim 2, wherein the solubility of the bridged metallocene compound represented by Formula [1] in n-hexane at 25° C. is not less than 0.5 mmol/L.

20. The method for producing an olefin polymer according to claim 2. wherein a solution in which the concentration of the bridged metallocene compound represented by Formula [1] is in the range of 0.05 mmol/L to 1.0 mol/L is supplied to a polymerization system.

* * * * *